US011282174B1

(12) United States Patent
DeMaio

(10) Patent No.: US 11,282,174 B1
(45) Date of Patent: Mar. 22, 2022

(54) SYSTEM AND METHOD OF PROVIDING PRIVACY BY BLURRING IMAGES OF PEOPLE IN UNAUTHORIZED PHOTOS AND VIDEOS

(71) Applicant: Phinge Corporation, Incline Village, NV (US)

(72) Inventor: Robert Charles DeMaio, Incline Village, NV (US)

(73) Assignee: Phinge Corporation, Incline Village, NV (US)

( * ) Notice: Subject to any disclaimer, the term of this patent is extended or adjusted under 35 U.S.C. 154(b) by 4 days.

(21) Appl. No.: 17/370,380

(22) Filed: Jul. 8, 2021

Related U.S. Application Data

(63) Continuation-in-part of application No. 17/355,648, filed on Jun. 23, 2021.

(51) Int. Cl.
| | | |
|---|---|---|
| *G06K 9/40* | (2006.01) | |
| *G06T 5/00* | (2006.01) | |
| *H04L 67/306* | (2022.01) | |
| *G06F 21/84* | (2013.01) | |
| *G06F 21/62* | (2013.01) | |

(52) U.S. Cl.
CPC .......... *G06T 5/002* (2013.01); *G06F 21/6245* (2013.01); *G06F 21/84* (2013.01); *G06T 5/003* (2013.01); *H04L 67/306* (2013.01); *G06T 2207/20092* (2013.01)

(58) Field of Classification Search
CPC ..................... G06T 5/002; G06T 5/003; G06T 2207/20092; H04L 67/306; G06F 21/84; G06F 21/6245; G06Q 10/10; G06Q 20/367; G06Q 20/384; G06Q 20/401; G06Q 30/0641

USPC .......................................................... 382/255
See application file for complete search history.

(56) References Cited

U.S. PATENT DOCUMENTS

| | | | |
|---|---|---|---|
| 6,854,010 | B1 | 2/2005 | Christian |
| 8,934,880 | B2 | 1/2015 | Harris |
| 9,898,706 | B1 | 2/2018 | Cook |
| 9,940,653 | B1 | 4/2018 | Rygaard |
| 10,157,400 | B1 | 12/2018 | Georgi |
| 10,510,055 | B2 * | 12/2019 | Desai ..................... G06Q 20/32 |

(Continued)

OTHER PUBLICATIONS

Moyer, Melinda Wenner, Go Ahead, Heap Rewards on Your Kid, 2017 (Year: 2017).

(Continued)

*Primary Examiner* — Mahendra R Patel

(57) ABSTRACT

Disclosed is a method for maintaining user privacy of a user when others take a picture of the user. The method can include receiving, from a first user device operated by a first user, an image of a second user having a second user device, wherein the second user has a user profile with a privacy setting indicating that pictures or video taken of the second user by the first device should be blurred. Based on the user profile, the method includes blurring the image of the second user taken by the first user device and transmitting a request to the second user device to unblur the image. When the second user authorizes, via interacting with the request, that the image can be unblurred, the method includes unblurring the image. When the second user declines to authorize that the image can be unblurred, the method includes maintaining the blurring of the image.

21 Claims, 23 Drawing Sheets

(56) References Cited

U.S. PATENT DOCUMENTS

| | | | |
|---|---|---|---|
| 11,023,886 B2* | 6/2021 | Katzin | G06Q 20/367 |
| 2002/0107947 A1 | 8/2002 | Moragne | |
| 2002/0111904 A1 | 8/2002 | Gruber | |
| 2004/0093281 A1 | 5/2004 | Silverstein | |
| 2005/0240477 A1 | 10/2005 | Friday | |
| 2006/0165040 A1 | 7/2006 | Rathod | |
| 2007/0087756 A1* | 4/2007 | Hoffberg | G06Q 20/40 455/450 |
| 2007/0219863 A1* | 9/2007 | Park | G06Q 30/0208 705/14.11 |
| 2008/0141117 A1* | 6/2008 | King | G06F 16/335 715/238 |
| 2009/0044235 A1 | 2/2009 | Davidson | |
| 2011/0131567 A1 | 6/2011 | Tirk | |
| 2012/0047057 A1* | 2/2012 | Frankel | H04M 15/88 705/35 |
| 2012/0166261 A1 | 6/2012 | Velusamy | |
| 2013/0036377 A1 | 2/2013 | Colley | |
| 2013/0138486 A1 | 5/2013 | Gao | |
| 2013/0282465 A1 | 10/2013 | Fitzhugh | |
| 2013/0290464 A1 | 10/2013 | Barrall | |
| 2014/0058815 A1 | 2/2014 | Hiremath | |
| 2014/0059443 A1 | 2/2014 | Tabe | |
| 2014/0068706 A1* | 3/2014 | Aissi | G06F 21/6254 726/1 |
| 2014/0081861 A1 | 3/2014 | Berland | |
| 2014/0094154 A1 | 4/2014 | Harris | |
| 2014/0207575 A1* | 7/2014 | Freed-Finnegan | G06Q 30/0641 705/14.58 |
| 2014/0229347 A1 | 8/2014 | Chan | |
| 2014/0337148 A1 | 11/2014 | Kannan | |
| 2015/0081734 A1 | 3/2015 | Mason | |
| 2015/0215383 A1 | 7/2015 | Sun | |
| 2015/0271557 A1 | 9/2015 | Tabe | |
| 2016/0012465 A1* | 1/2016 | Sharp | G06Q 20/386 705/14.17 |
| 2016/0012514 A1 | 1/2016 | Brown | |
| 2016/0041998 A1 | 2/2016 | Hall | |
| 2016/0226836 A1 | 8/2016 | Garcia | |
| 2016/0260116 A1 | 9/2016 | Xie | |
| 2017/0024100 A1 | 1/2017 | Pieper | |
| 2017/0083930 A1* | 3/2017 | Nagaraj | G06Q 20/227 |
| 2017/0148046 A1 | 5/2017 | Akbarpour Mashadi | |
| 2017/0186055 A1 | 6/2017 | Silkey | |
| 2018/0139507 A1 | 5/2018 | Toksoz | |
| 2018/0188938 A1 | 7/2018 | Deselaers | |
| 2018/0293573 A1* | 10/2018 | Ortiz | G06Q 20/20 |
| 2018/0348967 A1 | 12/2018 | Kondrk | |
| 2018/0350144 A1 | 12/2018 | Rathod | |
| 2019/0073666 A1 | 3/2019 | Ortiz | |
| 2019/0123892 A1 | 4/2019 | Basu | |
| 2019/0174208 A1 | 6/2019 | Speicher | |
| 2020/0098027 A1 | 3/2020 | Serrano | |
| 2020/0184545 A1* | 6/2020 | Barkan | G06K 7/1417 |
| 2020/0250176 A1 | 8/2020 | Padmanabhan | |
| 2020/0382480 A1 | 12/2020 | Isaacson | |
| 2020/0387923 A1* | 12/2020 | Mitchell | G06Q 20/26 |
| 2020/0410542 A1 | 12/2020 | Demsey | |
| 2021/0035086 A1* | 2/2021 | Khan | G06Q 20/384 |
| 2021/0174426 A1* | 6/2021 | Isaacson | G06Q 30/0635 |

OTHER PUBLICATIONS

What is WordPress—WordPress 101 Tutorials, Apr. 5, 2020, https://web.archive.org/web/20200405202813/https://ithemes.com/tutorials/what-is-wordpress (Year: 2021).

Myers, Erin, How to Create a WooCommerce Loyalty Program in WordPress, Nov. 30, 2020, http://wpengine.com/resources/wordpress-woocommerce-loyalty-program/ (Year: 2020).

Myers, Erin, How to Create a WooCommerce Loyalty Program in WordPress | WP Engine, Nov. 30, 2020, https://wpengine.com/resources/wordpress-woocommerce-loyalty-program/, 10 pages, (Year: 2020).

About AmazonSmile: Program details and FAQ, 2 pages, https://web.archive.org/web/20190507205304/https://smile.amazon.com/gp/chpf/about/ (Year:2019).

Phreeviews by Phinge Rewards-Based Rating & Review Platform Revolutionizing Online Ratings & Reviews, (https://www.youtube.com/watch?v=8-c6o6uuV40), Sep. 5, 2019, 26 pages, (Year: 2019).

* cited by examiner

US 11,282,174 B1

SYSTEM AND METHOD OF PROVIDING PRIVACY BY BLURRING IMAGES OF PEOPLE IN UNAUTHORIZED PHOTOS AND VIDEOS

RELATED CASES

This application is a continuation-in-part of U.S. patent application Ser. No. 17/355,648, filed Jun. 23, 2021, for SYSTEM AND METHOD OF PROVIDING A REWARDS-BASED, UNIVERSAL, INTEGRATED CODE BASE, which is incorporated herein by reference. The subject matter of this disclosure relates to U.S. patent application Ser. No. 17/355,542; U.S. patent application Ser. No. 17/355,464; U.S. patent application Ser. No. 17/355,437; U.S. patent application Ser. No. 17/355,388; and U.S. patent application Ser. No. 17/355,343, all of which are filed on Jun. 23, 2021, the content of each of these applications is incorporated herein by reference.

TECHNICAL FIELD

The subject matter of this disclosure relates to a new framework that can replace the Internet, websites, cloud computing infrastructure, operating systems and applications. The new framework involves coding applications (called "platforms" herein), websites, operating systems, operational modules and so forth as part of one integrated code base that enables interactive actions, such as rewards, reviews, payments and novel approaches to data sharing and management, between various platforms in ways not possible in the current structure of the Internet. The present technology pertains to an improved process for maintaining a user's privacy when other people take a picture of a video of a user without their permission. The disclosed process involves how the system blurs out the image of the user and how the user can authorize an unblurring of their image.

BACKGROUND

One popular approach to adding particular functionality to a mobile device such as an Apple® iPhone® is through downloading an application or an "app" from an "app store." An app store is any digital storefront (such as from Apple®, for example) intended to allow users to search and review software titles or other media offered for sale and which are to be downloaded electronically to the user device. FIG. 1A illustrates the general concept of the computing systems in a network 100 used to manage the development and distribution of traditional applications. Developers upload applications 104, 106, 108 to the app store 102 such that users can thereafter download and use the applications on their mobile devices 110, 112, 114. In the network 100 shown, the app store 102 can be operated by any company such as Apple®, Google®, or any other entity. For example, developer 1 may program a first application 104 and upload the first application 104 over the Internet 116 to the app store 102 to enable users to electronically purchase and download the application. A first device 110 operated by user 1 downloads the first application 104 over the Internet 116. Developer 2 develops and uploads a second application 106 to the app store 102. The second application 106 can be downloading by a second user to a second user device 112. A third developer develops a third application 108 that is uploaded over the Internet 116 to the app store 102 and downloaded by the third user to a third user device 114. The app store 102 itself provides a secure, uniform experience that automates the electronic purchase, decryption and installation of software applications or other digital media.

The app store 102 typically organizes the applications 104, 106, 108 it offers based on: the function(s) provided by the app (including games, multimedia or productivity), the device for which the app was designed, and the operating system on which the app will run. In the case of Apple®, there is a complicated set of steps to enable a developer to upload (ingest) an app to the app store 102. For example, the developer must create an iTunes® account, configure their X-Code project for distribution, archive a copy of the application, run validation tests, upload the application, and then submit a version of the application for review. Once the application is approved, the developer is essentially on their own. The application 104, 106, 108 in the app store 102 operates as a stand-alone application which is offered for download from the app store 102, but no additional services or functionality is provided by the app store 102. Thus, typical app stores 102 are managed by their owners and often require submissions of prospective apps to go through such an approval process. The proposed apps 104, 106, 108 are inspected for compliance with certain guidelines (i.e., quality control and censorship), including the requirement that a commission be collected on each sale of a paid app. Some app stores 102 provide feedback to developers, such as a number of installations and report on issues that might arise, such as latency issues, causes of a crash, etc. However, such services are limited and most functions and capabilities are the responsibility of the developer of the application 104, 106, 108.

In some cases, an application programming interface (API) might be provided through such companies as Stripe® and the like to enable functionality such as payments. For example, applications can incorporate software code to provide access to Apple Pay® APIs as an option within their application 104, 106, 108. However, such APIs are limited and focus only on a few basic features.

In circumstances where a function is offered via a company, such as Stripe®, in order to enable or implement the functionality, API calls must be made to a separate entity. For example, FIG. 1A shows a user device 114 that has downloaded an application 108 that uses a Stripe® payment process available from a Stripe server 118. An API 120 will make calls to the Stripe server 118, which will respond with data to achieve the payment. In this environment 100, there are a number of different computer systems that have been involved in his entire process. First, the developers utilize their own computer systems to develop the respective applications 104, 106, 108. A separate computer system operates the app store 102. Yet again a separate payment server 118 might be offered by Stripe® or some other service provider. Additionally, each user device 110, 112, 114 is a separate computing device in the system. There is no mechanism for these devices or applications to communicate in an efficient manner as the devices and applications are in separate silos and in some cases managed by separate companies. While users can browse through different app categories in the app store 102, view information about each app (such as reviews or ratings), and acquire the app (including app purchase, if necessary), there is little other functionality offered by the app store 102 other than a platform for downloading respective apps 104, 106, 108. The selected app is offered as an automatic download, after which the app installs on the user device 110, 112, 114.

App stores 102 typically provide a way for users to give reviews and ratings. The reviews are useful for other users, developers, and app store owners. The reviews and ratings, however, are in a simplified form and of limited use. Users can select the best apps based on ratings. Developers get feedback on what features are praised or disliked. App store owners can detect bad apps and malicious developers by automatically analyzing the reviews with data mining techniques. Other than providing some limited services such as reviews and the distribution platform, the app store 102 typically provides very little to a respective app developer.

FIG. 1B illustrates a cloud computing or web hosting environment 130. In the cloud computing environment 130, a number of different cloud clients such as laptops 132, mobile devices 134 or desktop computers or servers 136 can interact via the Internet 116 with the cloud computing environment 138. The cloud clients 132, 134, 136 can access the cloud 138 via a web browser, mobile applications, a thin client, a terminal emulator, or other approaches. The cloud environment can be structured with various different types of service models to provide computing resources to cloud clients 132, 134, 136.

One example service model is shown in FIG. 1B, which includes various services or applications made available to the cloud clients 132, 134, 136. Software as a service (SaaS 140) provides the capability to the customer to use the provider's applications running in the cloud computing environment 138. The applications are accessible from various client devices 132, 134, 136 through a thin client interface such as a web browser. In this scenario, the consumer does not manage or control the underlying cloud infrastructure including networks, servers, operating systems, storage or even individual application capabilities. Cloud providers manage the infrastructure and platforms, run the applications, and may use virtual machines at runtime to clone the applications to meet changing work demands. The applications are typically run independently of each other.

The cloud computing environment 138 can also include another service approach called a Platform as a Service (PaaS 142) component. In a PaaS 142 environment, consumer-created or acquired applications are created using programming languages, libraries, services and tools supported by the provider. The consumer in this case can have control over the deployed applications and possibly configuration settings in the application hosting environment. The PaaS 142 can provide an execution runtime, database, a Web server and development tools for customers, but they all remain within their own separate physical or virtual environment.

Another service provided in the cloud computing environment 138 can be an Infrastructure as a Service (IaaS 144) component, which refers to online services that provide high level application programming interfaces (APIs) used to abstract low-level details of underlying network infrastructure by physical compute resources, location, data partitioning, scaling, security, backup and so forth. A hypervisor can run virtual machines as guests. The IaaS 144 can operate where the consumer is able to deploy and run arbitrary software, which can include operating systems and applications. In this scenario, the consumer does not manage or control the underlying cloud computing environment 138 but has control over operating systems, storage and deployment and offers limited control of selected networking components. The IaaS 144 can provide virtual machines, servers, storage, load balancers and network capabilities to consumers but in this approach one consumer does not have access to another consumer's applications.

In each of these service scenarios, the various applications, operating systems and so forth are isolated from one another for respective consumers. For example, a compute environment 152 associated with the device 132 is shown as being separate from a compute environment 154 associated with device 134 and compute environment 156 associated with device 136. Each consumer environment is established separately and the various service approaches 140, 142, 144 do not provide interactions between the applications. Other services 146, 148, 150 can be represented as well within the cloud computing environment 138, but again, the cloud computing environment 138 is generally arranged to provide separate applications with the computing resources needed to operate.

The cloud computing environment 138 can also represent a public or external cloud, which can be delivered over the public Internet 116 and can be offered by a paid subscription or free of charge. Hybrid clouds involve the composition of the public cloud computing environment 138 and a private environment that can be represented by the server 136, which might be on the premises of a company and which in some cases may serve the company needs but have the ability to burst or expand into the public cloud 138 for additional compute resources as needed on demand.

In each of these cloud environments 138, the respective consumer applications can be segregated or siloed in their own virtual or physical environments 152, 154, 156 in a similar manner to private or internal computing environments that might be on a company premises but which is simply moved into a broader and more efficient cloud computing environment 138. The various applications and web hosting or other processing that occur are still subject to data security and compliance requirements such that the processing occurs in secure, separated environments 152, 154, 156 at least virtually and in some cases physically.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
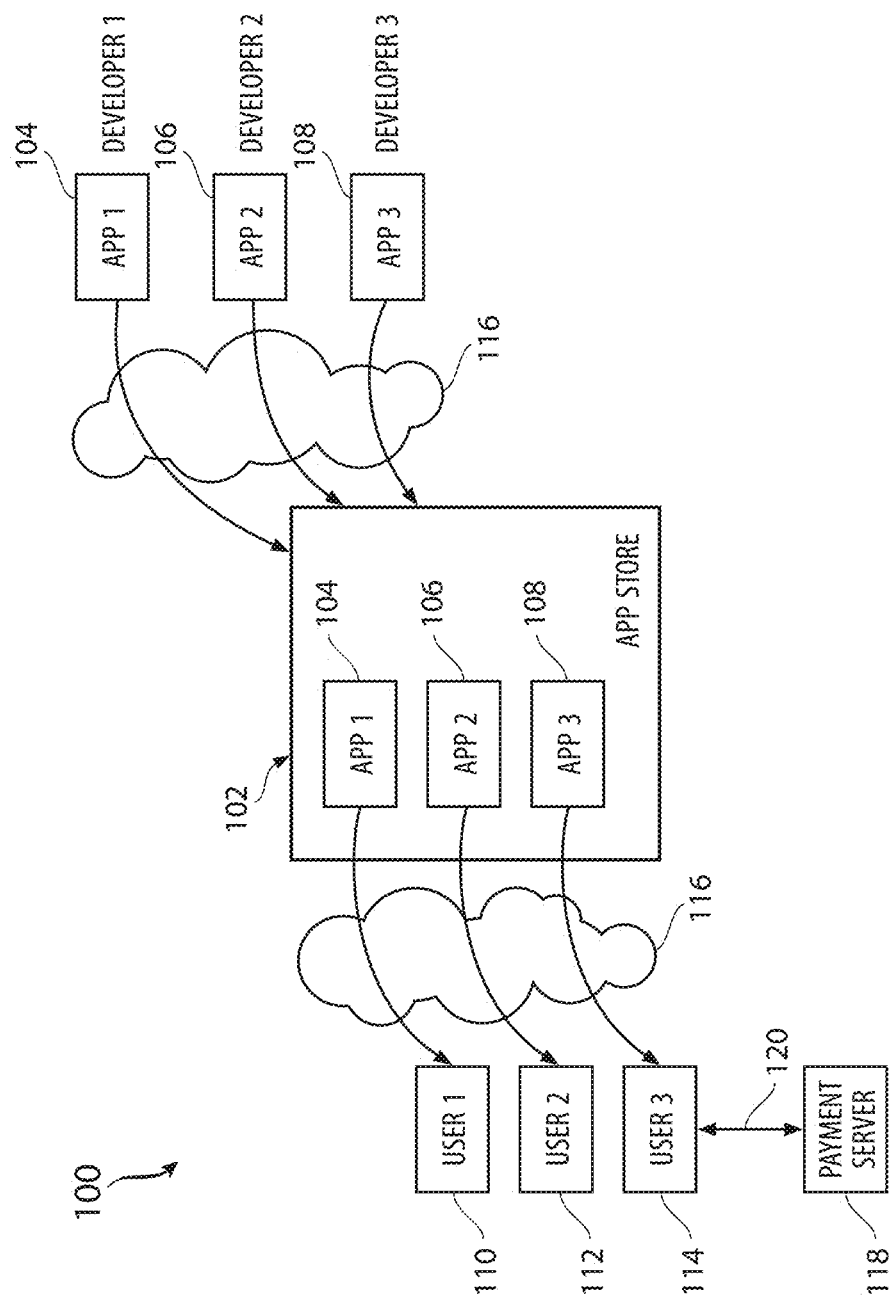
FIG. 1A illustrates a prior art app store for processing and distributing applications.
Figure 1B:
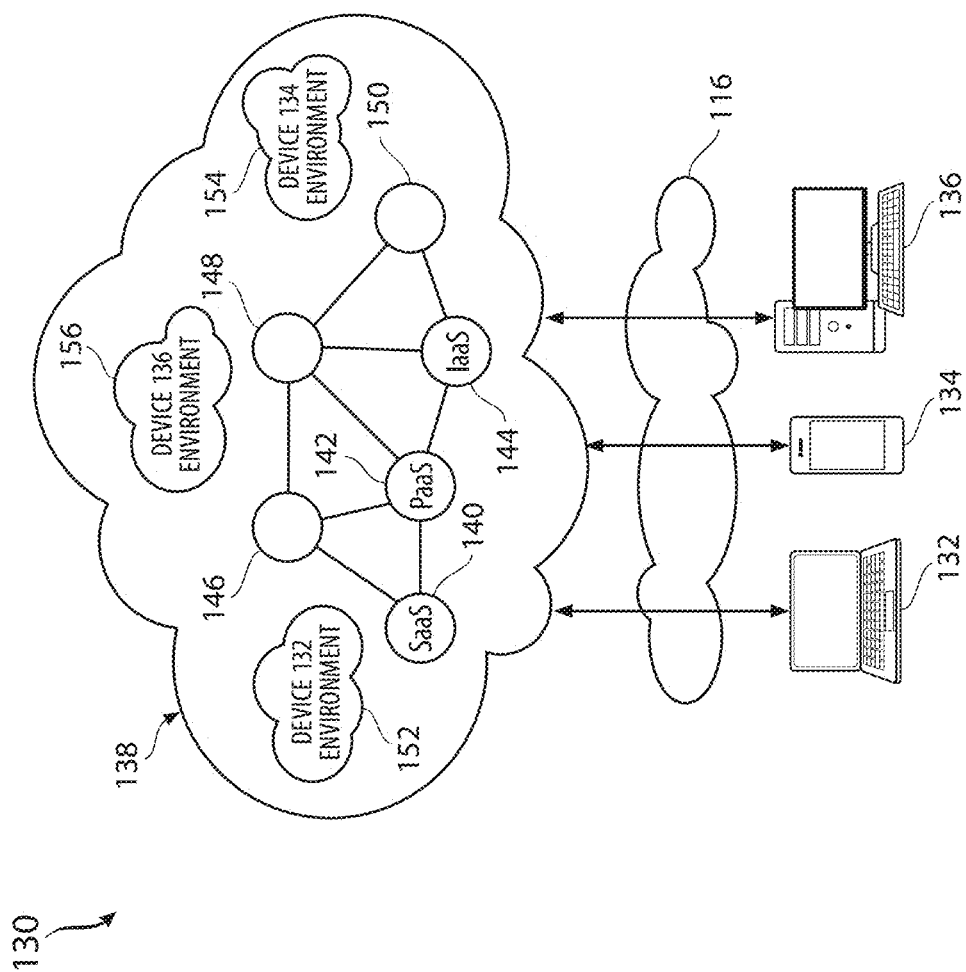
FIG. 1B illustrates a prior art cloud computing environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

As noted above, both the approach of the distribution of applications via the app store 102 and the use of a cloud computing environment 138 hinder the interoperability of applications. The present structure and use of applications result in a separation of applications from other applications for various reasons. What is needed in the art is an entirely new structure to replace the traditional app store 102 and cloud computing environment 138 and that provides users and developers a much greater degree of interaction and interoperability between respective applications 104, 106, 108. In this context, the term "application" is no longer used in this disclosure because the functions and operations available from the disclose environment differ from the traditional approach. Accordingly, the terms "application" and "app" are replaced with the term "platform". Therefore, rather than talking about a social media app, or a ride-based application such as Uber® or Lyft®, this disclosure describes platforms. Platforms in this context include functionality that might have some similar or comparable operations to applications of any type and which are available from the app store 102. However, the platforms disclosed herein will have additional or novel functions because each respective platform is integrated into a rewards-based, universal, integrated code base. The rewards-based, universal, integrated code base is a single code base that encompasses all of the developed platforms plus one of more different modules that provide new functions across the different platforms. The platforms and modules are also built into the same single code base rather than being distributed in separate or siloed applications or websites, which do not provide for horizontal interactivity amongst the applications or websites as is presented herein. Only authorized user devices (mobile devices, tablets, desktop computers, laptops, servers, point of sale devices, cars, watches, Internet of Things appliances, and so forth), are allowed through a communication module and via an encrypted communication channel into the rewards-based, universal, integrated code base for access to the platforms, modules and general functionality. In sum, a number of additional capabilities and services across different platforms becomes possible by integrating all the platforms and service modules into the same rewards-based, universal, integrated code base. By way of example, by configuring platforms within with the rewards-based, universal, integrated code base, users can access and manipulate platforms in completely new ways, user data can be shared and managed in novel ways across platforms and with other data, rewards for interactions with and use of platforms can be provided in novel ways and payments become more simplified. Many new capabilities are disclosed herein by the use of the rewards-based, universal, integrated code base rather than separating applications into their own silo or managing user applications and data in the traditional cloud computing environment.

This disclosure introduces the new system and provides details about its structure and operations. In one aspect, the "system" includes a plurality of network-based servers, data storage devices, user devices that are each authorized to access the code base, platforms that are comparable to applications but provide functions that are built into the rewards-based, universal, integrated code base, modules for communicating with external devices like the authorized user devices, external websites whether authorized or unauthorized, merchant point-of-sale systems and merchant servers, or other external entities. This disclosure will provide details about the underlying rewards-based, universal, integrated code base, a data management module that provides details regarding new techniques for managing and sharing data across platforms in the rewards-based, universal, integrated code base, as well as other platforms and modules. Generally, platforms can be comparable to applications in the app store but are integrated into the rewards-based, universal, integrated code base described herein and thus gain new functionality not currently possible. Modules generally are described herein as providing new functions across the various platforms. For example, a review module, a payments module, or a rewards module can provide new services across all the platforms built into the rewards-based, universal, integrated code base. Again, because all the platforms are built into the same rewards-based, universal, integrated code base rather than being siloed separately, new interactions become enabled that will be described herein. In some aspects, the system can be called a new "ecosystem," as the various functions, platforms and authorized websites are all integrated into one system for additional interactive functions.

The present disclosure focuses on a new approach to protecting the privacy of individuals who may have their picture taken. The broadest aspect of this concept is independent of the rewards-based, universal, integrated code base and can operate on any network including where applications are downloaded onto the devices. The process includes blurring pictures or the faces of people taken by a device and then sending a request to those people for authorization to unblur their faces. The devices can be authorized user devices as described herein that are authorized to interact with the rewards-based, universal, integrated code base or may be regular or traditional devices that implement the disclosed functionality. The rewards-based, universal, integrated code base and its data management concepts are introduced next, followed be an introduction to the image privacy concept which is the main subject of the present case.

Rewards-Based, Universal, Integrated Code Base

As noted above, the proposed structure to address the issues raised is called a rewards-based, universal, integrated code base in which a single code base includes all of the various functions that previously were allocated or made available to apps, or even across websites. In this case, rather than a developer writing X-Code and uploading it for approval to the app-store 102, the concepts or desired functionality would be provided to the entity managing the system. The desired code would be added directly to the entire rewards-based, universal, integrated code base. In this regard, the "app" would exist directly on the code base of new system (corresponding to the old version or application). The new platform would be built into the rewards-based, universal, integrated code base, which would enable interoperability of any piece of data associated with the new platform with any other piece of data of any other platform or user within the system.

In one aspect, the system can include a plurality of network-based computer servers, a plurality of devices, and a rewards-based, universal, integrated code base operating across the plurality of network-based computer servers and the plurality of devices. The rewards-based, universal, integrated code base can include one or more components or modules that enable its operation and provide various functions not previously contemplated or possible in the current structure of the Internet and the application environment. Various modules will be introduced and any embodiment of this disclosure can include the servers, memory devices, authorized user devices, and the integrated code base with any one or more of the modules and/or platforms described herein. Generally, a platform is comparable to an application in the old traditional approach. Developers can provide code or ask that code be developed to provide a social media platform, ride management platform, editing platform and so forth. Generally, modules described herein provide services and capabilities offered across the use of the platforms, such as reviews, rewards for interacting with or using platforms, payments on platforms and so forth. Several possible modules will be introduced next.

An entry point module can be configured as part of the system to receive new merchants or user participants into the rewards-based, universal, integrated code base in which each respective new merchant agrees to a payment and data sharing framework in which a rebate is provided to a buyer of a product or service from the respective new merchant and a referral payment is made to a referring member who referred the buyer to the respective new merchant.

A rewards management module can be configured to connect a reader of a comment or message written via use of a platform (that enables messaging of any type and configured within the rewards-based, universal, integrated code base) to a merchant associated with the comment and to provide a referral reward to the writer upon the reader making a purchase from the merchant. For example, a reward can be paid to a writer of a message or a writer of a review if an authorized buyer purchases a product or service from an authorized user (merchant) based on an interaction with the message or review.

Another module can include a universal username management module configured to enable a single sign up for users of the rewards-based, universal, integrated code base such that platforms and/or websites accessed after users sign into the rewards-based, universal, integrated code base are accessible through a single universal username across all the platforms and/or websites within the rewards-based, universal, integrated code base. The universal username does not change for the user but passwords and other authorizations such as for various businesses, employees, social media interactions, and so forth can change and can also be tied to the universal username in a tree-like structure. The universal username is used for everything across the rewards-based, universal, integrated code base.

Yet another module can include a data privacy management module configured, upon a specific user signing up, to provide an encrypted account on the plurality of network-based computer servers to access data that the rewards-based, universal, integrated code base has collected on the specific user across one or more platforms or websites, to yield collected data. The data privacy management module can enable the specific user to delete any or all of the collected data and to inform the specific user regarding an impact of deleting any or all of the collected data on rewards provided to the specific user for interacting with platforms or websites across the rewards-based, universal, integrated code base. Users can also get a preview of expected reward they may earn based on a level of data sharing that they authorize.

In one aspect, existing applications or websites may also communicate with the rewards-based, universal, integrated code base. These can be either authorized (have entered into an agreement for data sharing) or unauthorized. The level of functionality can be limited for external applications or website and the level can also depend on whether the application or website is authorized or not. Full functionality as disclosed herein, however, in one aspect is only available to platforms programmed into the rewards-based, universal, integrated code base. It is contemplated that a user device would be a key component to enabling a secure encrypted communication from the user device to the rewards-based, universal, integrated code base and then to communication with external applications or websites with limited functionality. As noted, the rewards-based, universal, integrated code base would enable, because of its single code base that encompasses all internal platforms (relative to external applications and websites), interoperability and the full functionality currently not available inasmuch as applications, as they presently exist, operate independently of one another and have no mechanism of sharing data such as rewards, photos, comments, payments, and so forth.

Thus, in one scenario, a social media application like Facebook® or a merchant application like Walmart® could have an interface to the rewards-based, universal, integrated code base, but the user, through their special user device, would access the rewards-based, universal, integrated code base for social media interactions or to purchase products but may never directly engage with Walmart® or Facebook®. The functionality of these sites or applications would be made available through the rewards-based, universal, integrated code base, which adds new capabilities including a rewards-based interaction. Some additional functionality could be provided to unauthorized or authorized sites or applications such as overlay graphical and selectable objects that the user may select to obtain some benefits offered by the rewards-based, universal, integrated code base. When an authorized device accesses an external application or website, the device can interact directly with the application or website via, for example, a browser, but because the authorized device accesses the site through the rewards-based, universal, integrated code base, overlay options are presented in addition to the underlying site interface.

The communication flow between an authorized user device and the system including any platforms (applications) that might be accessed and used by the authorized user device is different from the flow of data in communication links in the traditional approach. Since the combined platforms are all operating on the same code base, the authorized user device only needs to communicate with the system and with no other acts, websites, or other entities. Developers and other entities would obtain authorization to be integrated into the rewards-based, universal, integrated code base and thus interact with the individual authorized user devices through the system.

In one example, the capabilities offered by the rewards-based, universal, integrated code base include aggregating platforms, combining platforms, grouping platforms, a simplified payment process across platforms, rewards provided to individuals across the platform and for a variety of different interactions, such as for providing comments, reviews, and likes. By providing the rewards-based, universal, integrated code base, the approach disclosed herein introduces an entirely new concept for how users will interact with the computing environment. In the old process, a user would open an application, perform a function or buy a product, and close the application only to open up another application. The applications had no mechanism of interacting with each other and were separated in terms of their program base and how they were stored on a user device. The new rewards-based, universal, integrated code base enables users to seamlessly move from one platform to another and introduces an interoperability amongst platforms that currently does not exist. Thus, the concept of opening and closing individual applications for accessing separate individual websites no longer applies. Conceptually, every platform, every website, every merchant, that joins the rewards-based, universal, integrated code base will receive and accept a level of interoperability simply not possible in the current structure of the Internet. In one sense, all the platforms are always open or always on and thus access, combining, manipulation or data usage will differ across the different platforms.

Any merchant or entity that joins the rewards-based, universal, integrated code base will be provided with the capability of enabling users to easily switch platforms, make payments on platforms, provide and receive rewards for user interactions related to that merchant or entity, have their data aggregated with other data or other platforms as desired by the user, and so forth. In other words, merchant or entities that enter into the rewards-based, universal, integrated code base will be given greater functionality that developers who upload apps to the app store have no ability to obtain.

A method example can include one or more of the following steps in any order. The method can include receiving, via entry point module configured to receive new merchant participants into a rewards-based, universal, integrated code base, data regarding a new platform to be configured in the rewards-based, universal, integrated code base and adding, based on the data, the new platform to the rewards-based, universal, integrated code base. The rewards-based, universal, integrated code base can include, after the adding, the new platform and previously added platforms. The method can further include enabling the new platform to exchange information with each of the previously added platforms. Each respective new entity agrees to an information exchange framework for a respective platform associated with the respective new entity. The method includes providing, via the rewards-based, universal, integrated code base, one or more of rewards for a user device interacting with the new platform or the previously added platforms, an ability for an authorized user device to make payments in the new platform or the previously added platforms, an ability to aggregate one or more of the new platform or the previously added platforms, an ability to combine one or more of the new platform or the previously added platforms, and an ability switch between one or more of the new platform or the previously added platforms. Merchants can have the ability to enter into a group of merchants which can provide shared benefits and additional functionality to consumers as well.

Data Management in the Rewards-Based, Universal, Integrated Code Base

Another aspect of this disclosure relates to a data management module that provides novel ways in which data can be shared within the rewards-based, universal, integrated code base. Data (videos, images, text, files, documents, etc.) can be uploaded once to the memory storage devices associated with the servers operating the rewards-based, universal, integrated code base. That data becomes easily available across the various platforms and functions available to a user. For example, once the data is uploaded, it becomes available to social media processes, texting/messaging/emailing processes, authorized websites and platforms, and so forth. The capability of that data being accessible across the rewards-based, universal, integrated code base is a novel feature disclosed herein.

All users, merchants, or participants in the rewards-based, universal, integrated code base can give all or limited access to their data to anyone or everyone. Users can also give independent access to their data as well. The selection of how much access to give can impact a user's rewards and information about the "cost" of limiting access can be provided to the user. For example, the more data a user shares, the more rewards the user can receive. The user through a user portal can control and manage a privacy level for their data. However, increased privacy can result in less rewards being provided to the user.

Because users are not opening an application or accessing a website in the normal fashion, and because the platforms within the rewards-based, universal, integrated code base as well as the data management module are all integrated, user data, such as images or videos, can be integrated, moved, or deployed to individual platforms from a central storage location.

The data management module configured in the rewards-based, universal, integrated code base can be used to manage data and how it can be shared from a central location or data storage to any one or more of the user platforms, sites and so forth. An example method performed by the data management module can include receiving, at a plurality of network-based computer servers operating the rewards-based, universal, integrated code base, data from an authorized user device of a user, the user having a top level username for use in the rewards-based, universal, integrated code base. The user can provide the data, such as an image, text file, document or video or other data, from their authorized user device to the system. Once the data is posted or uploaded to the rewards-based, universal, integrated code base, it can be easily used on a platform, a hosted web site, in an email, a message, a social media site, etc. Users can, for example, upload a document or edit a document and via a drop-down menu or a command, can promulgate the new document or changes to an existing document across one or more platforms in the rewards-based, universal, integrated code base. Users no longer have to drag and drop documents and they do not need to go to a platform or site, open it, and make edits in the normal fashion.

The authorized user device is authorized to access and use the rewards-based, universal, integrated code base. The method can include storing, in a data storage memory device associated with the plurality of network-based computer servers and based on the top level username, the data for the user and receiving a command from the user to perform an action on the data. The action can be related to using the data on a platform associated with the user, the platform operating as part of the rewards-based, universal, integrated code base. The platform ownership can be assigned to the top level username of the user. The method can then include performing, based on the command and exclusively in the rewards-based, universal, integrated code base, the action on the data of the user related to the platform. In one example, the action can be to take a new photo (such as of a summer menu) associated with a merchant, such as a restaurant, and to replace an old photo (such as the photo of the spring menu) on a platform or web site of the merchant. Tagging of the photos or document can be used as part of the command. Changes to documents or files can also be dynamically promulgated across multiple platforms (having data related to the document tor file) via a single drop-down menu selection or single command.

Thus, a command can be "replace the spring menu with the summer menu" and the data management module can utilize the command and replace the old photo with the new photo across one or more platforms or sites. Because the platforms and the data management module operate as part of the same single rewards-based, universal, integrated code base, the user no longer has to open up a platform or go to a site and drag and drop or manually replace images. The data can be any type of data which can include text (replace the May 1, 2021 lead story with the May 2, 2021 lead story). Wherever the user has a defined piece of data across different platforms or sites, the piece of data can be replaced by another piece of data through one command.

Privacy Management Module

The concept disclosed herein can apply to protecting the privacy of individuals who might have their picture taken by a device that is not theirs. The operations involved to protect an individual's privacy can be performed by the data/privacy/file storage module disclosed herein. An example method includes receiving, via a first user device operated by a first user, an image of a second user associated with a second user device, wherein the second user has a user profile with a privacy setting indicating that pictures or video taken of the second user by the first device should be blurred and, based on the user profile, blurring the image of the second user taken by the first user device. The method can further include transmitting a request to the second user device to unblur the image. When the second user authorizes, via interacting with the request, that the image can be unblurred, the method includes unblurring the image and, when the second user declines to authorize that the image can be unblurred, the method includes maintaining the blurring of the image.

In another aspect, the rewards-based, universal, integrated code base can further be configured to perform operations including, when the second user authorizes, via interacting with the request, that the image can be unblurred, and when the image is unblurred, paying the second user a fee for unblurring the image.

In one aspect, the process of blurring and unblurring images in a picture or video are independent of the rewards-based, universal, integrated code base disclosed herein. The core of the idea with respect to protecting privacy does not require the functionality that is enabled by platforms being integrated into the rewards-based, universal, integrated code base. In this regard, users may download an application to the respective device and a backend server may coordinate and identify images taken by a respective user device that might include a person who has a privacy setting which would cause a blurring of their face or body within the image taken by the respective user device. Accordingly, the concepts disclosed with respect to the blurring process can exist within the traditional application or Internet framework.

However, one aspect of this disclosure does involve the rewards-based, universal, integrated code base having a privacy management module which operates to coordinate the protection of privacy according to the user profile data for users that have authorize user devices for interacting with the rewards-based, universal, integrated code base. In this regard, a system can include a plurality of network-based computer servers, a plurality of user devices and a rewards-based, universal, integrated code base operating across the plurality of network-based computer servers for use by the plurality of user devices. The rewards-based, universal, integrated code base can be configured to interact with a plurality of authorized user devices and to perform operations including one or more of receiving, from a first user device operated by a first user, an image of a second user having a second user device, wherein the second user has a user profile with a privacy setting indicating that pictures or video taken of the second user by the first device should be blurred. Based on the user profile, the operations can include blurring the image of the second user taken by the first user device and transmitting a request to the second user device to unblur the image. When the second user authorizes, via interacting with the request, that the image can be unblurred, the operations include unblurring the image. When the second user declines to authorize that the image can be unblurred, the operations can include maintaining the blurring of the image.

Another aspect of this disclosure can relate to the user device itself whether it has downloaded an application or whether it is an authorized user device having an access component for interacting with the rewards-based, universal, integrated code base. A mobile device can include a processor, a camera in communication with the processor and a computer-readable storage medium storing instructions which, when executed by the processor, cause the processor to perform operations including receiving, via the camera and as instructed by a first user, an image of a second user having a second user device, wherein the second user has a user profile with a privacy setting indicating that pictures or video taken of the second user by the first device should be blurred and, based on the user profile, causing a blurring of the image of the second user. When the second user authorizes, via interacting with an unblur request, that the image can be unblurred, the operations can include causing an unblurring of the image. When the second user declines to authorize that the image can be unblurred, the operations can include maintaining the blurring of the image.

Description of Example Embodiments

Figure 2A:
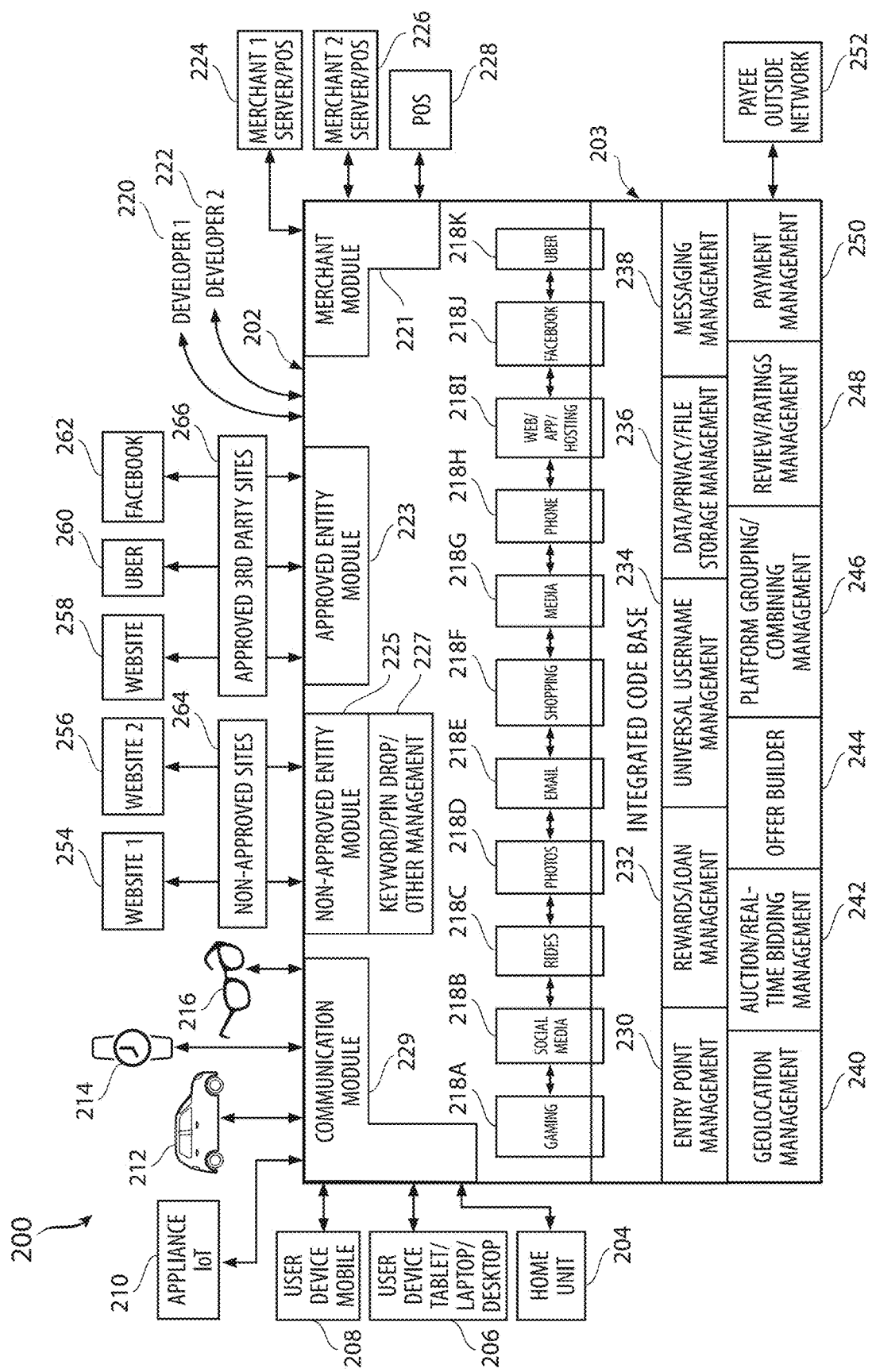
FIG. 2A illustrates a new networking environment including a rewards-based, universal, integrated code base according to an aspect of this disclosure.
Figure 2B:
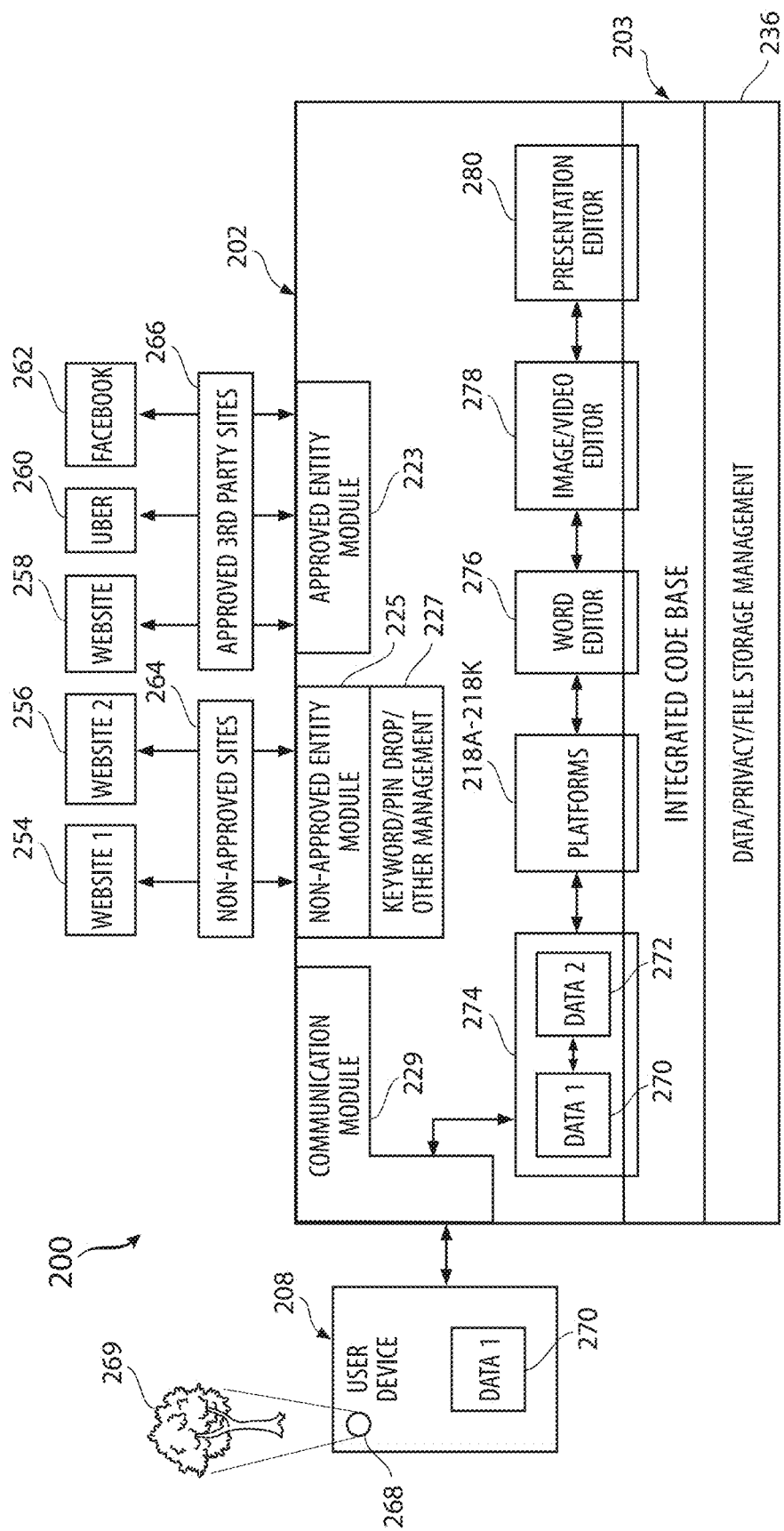
FIG. 2B illustrates data management in the rewards-based, universal, integrated code base code base.

Disclosed herein are systems, methods, and computer-readable media which can include a number of different innovations. In some cases, the innovations disclosed herein can operate in a current network environment, such as the Internet for an app store, on web sites or on user devices in general. In other aspects of this disclosure, platforms with specific functionality might be required to operate in the context of a new networking system as introduced above as the rewards-based, universal, integrated code base. FIGS. 2A and 2B introduce the rewards-based, universal, integrated code base and authorized user devices that interact with the rewards-based, universal, integrated code base, as well as the data management module for managing data in the new environment. Basic computer components shown in FIG. 3 can be applied as part of a plurality of network-based servers, memory or data storage devices, authorized user devices or other computer components used in the context of the rewards-based, universal, integrated code base. Thus, if a particular concept requires the rewards-based, universal, integrated code base, such requirement will be made explicit. The concepts can be operable in any computing environment including the computing environments described herein which, when programmed to perform the operations disclosed herein, become special purpose computer systems.

Figure 3:
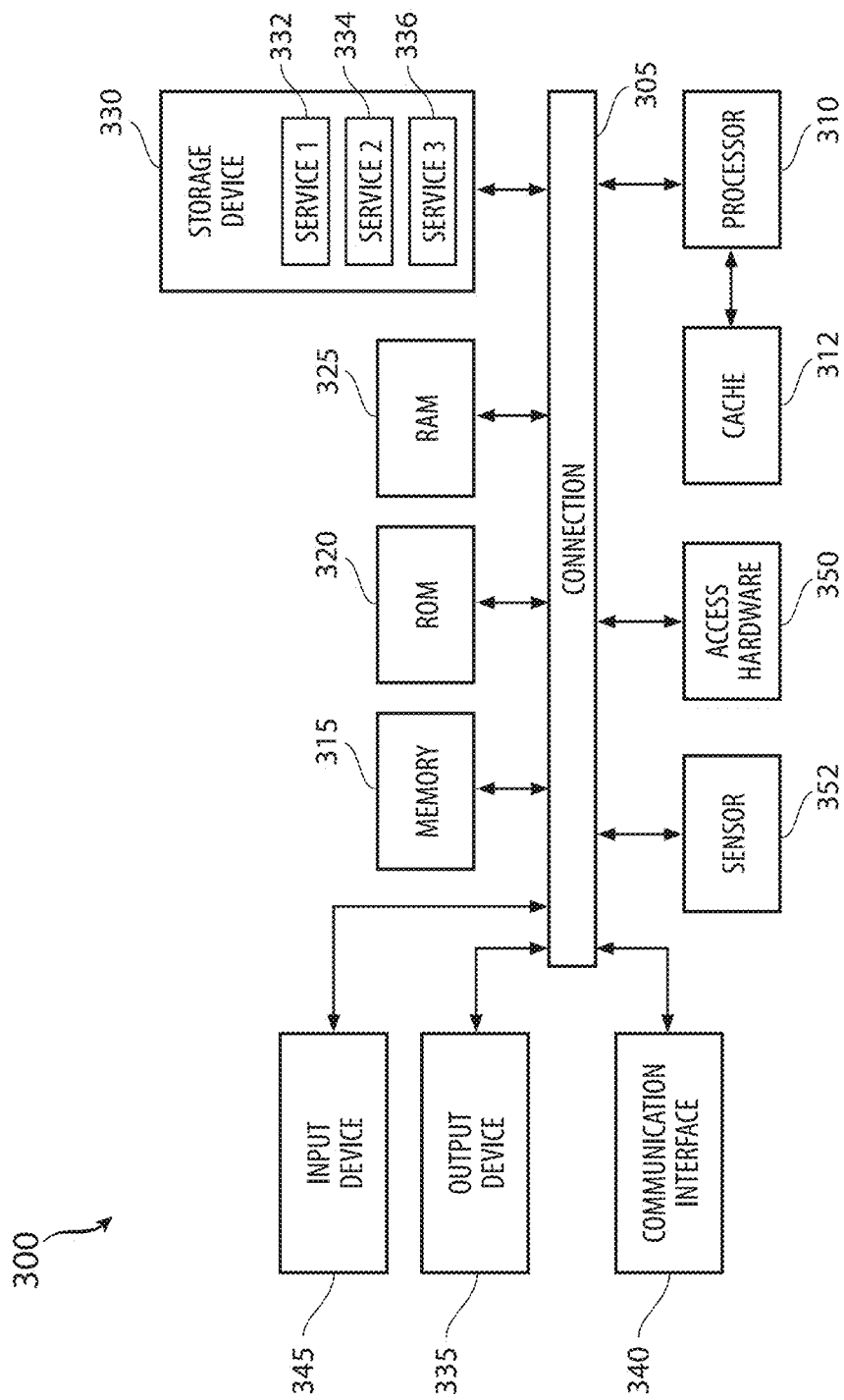
FIG. 3 illustrates an example computing device architecture, in accordance with some examples.

As shown in FIG. 2A, a system 200 can include a plurality of network-based servers (represented as servers 202 and which use one or more of the computer system shown in FIG. 3) that run the rewards-based, universal, integrated code base 203. The rewards-based, universal, integrated code base 203 is a single code base that has certain novel characteristics and features made available through the integration of all the platforms (formerly applications) into the same code base. The new structure is called the rewards-based, universal, integrated code base 203 because, as a single code base, includes at least some of the various functions that previously were allocated or made available to apps, or even across websites. New modules 230, 232, 234, 236, 238, 240, 242, 244, 246, 248, 250 provide interoperative and interactive functions to all of the various platforms 218A-K on the rewards-based, universal, integrated code base 203. What shall be introduced is an entirely new infrastructure for how users interact with the environment and perform the tasks that they desire, while including, by way of example, a rewards-based approach which grants users rewards for doing various tasks (such as rating, providing a review, commenting or messaging) that currently they perform on the traditional Internet or apps without any compensation.

This disclosure describes the new rewards-based, universal, integrated code base 203 operating on the network-based servers 202 as well as various platforms 218A-K (comparable to apps but with different functionality) and modules that provide services across the various platforms. The disclosure will describe the underlying code base, modules and touch on various platforms and can include more specific details as one or more embodiments of a particular platform, authorized user device, or module. Further, user devices 204, 206, 208, 210, 212, 214, 216 are "authorized" to access the platforms on the rewards-based, universal, integrated code base 203 in various ways such as through a hardware secure element or software license or access code. Once authorized, the authorized user devices 204, 206, 208, 210, 212, 214, 216 can be "always on" in that they immediately provide the access to the rewards-based, universal, integrated code base 203 without the user logging in every time.

In the new rewards-based, universal, integrated code base 203, the desired functionality would be provided by the entity managing the rewards-based, universal, integrated code base 203 rather than a developer 220, 222 or merchant 224, 226 writing X-Code for an application and uploading it for approval to the app store. The desired code would be added directly to the entire rewards-based, universal, integrated code base 203 as a new platform. In this regard, the new platform would exist directly on the rewards-based, universal, integrated code base 203. The new platform would be built into the rewards-based, universal, integrated code base 203, which would enable a number of new functions available to the new platform that are not available or possible to obtain for apps in the app store or websites hosted in the traditional manner. For example, the data management module 236 can manage interoperability of any piece of data (stored on a data storage device 315 such as is shown in FIG. 3) associated with the new platform with any other piece of data of any other platform or user within the system. Note in FIG. 2A that the platforms 218A-K are shown as covering functions, such as gaming 218A, social media 218B, ride management 218C, photos 218D, email 218E, shopping 218F, media 218G, phone 218H, web or application hosting 218I or other platforms or functions. Each of these platforms 218A-K is shown as being included as part of the rewards-based, universal, integrated code base 203. The hosting component 218I can be considered as combining, within the rewards-based, universal, integrated code base 203 all of the functionality of a Dropbox®, plus AWS® (Amazon Web Services) and Google Drive® where both the data storage plus the hosting of sites or platforms (applications) are combined to enable the sharing of data stored in one location across different hosted platforms in ways not possible when these different services are divided across different companies.

Other functionality is contemplated as being included within the rewards-based, universal, integrated code base 203 and the platforms shown are only provided by way of example. Other example platforms can be implemented as well as the list is an example list. The plurality of platforms can include one or more of the platforms 218A-K as well as platforms related to video usage, image usage, merchant sales, messaging, map usage, website access, camera usage, payment processes, microphone usage and sensor usage. Indeed, any app existing or contemplated could be added as a platform in the rewards-based, universal, integrated code base 203 which would provide the existing functionality of the application but would also add new functionality within the rewards-based, universal, integrated code base 203.

Access to the rewards-based, universal, integrated code base 203 is controlled. In a traditional scenario, for example, any computer-implemented device can use a browser to type in a universal resource locator (URL) and access a website of a merchant or other entity. Any device can access the app store and download applications as desired. However, the operation of the new rewards-based, universal, integrated code base 203 differs. Only authorized user devices can access the rewards-based, universal, integrated code base 203 and the platforms or functions available therefrom. In one aspect, authorized user devices 204, 206, 208, 210, 212, 214, 216 are terminals to enable a user to access the rewards-based, universal, integrated code base 203. The rewards-based, universal, integrated code base 203 provides a user interface to all the platforms and provides the related functionality. The rewards-based, universal, integrated code base 203 does not download "applications" to the authorized user device 204, 206, 208, 210, 212, 214, 216.

In another aspect, some of all the functionality could be downloaded to an authorized user device 208 and all the interactivity, rewards, payments and so forth could be maintained as well for that platform. For example, a gaming platform 218A or any platform could download code to the authorized user device 208 so that a user could play the game and have some or all of the functionality of the gaming platform 218A available offline.

However, it is preferred that the plurality of network-based servers 202 store all of the source code for the various platforms 218A-K such that the authorized user device 204, 206, 208, 210, 212, 214, 216 only receives the user interface from the plurality of network-based servers 202. In this manner, several advantages are experienced. The number of data calls which will need to be executed from downloaded applications on the user device can be eliminated. Software updates that need to be downloaded to respective user devices can be eliminated in that any necessary updating of the respective platform 218A-K can occur within the rewards-based, universal, integrated code base 203. No updated application code needs to be downloaded to a respective device. In the current Internet structure, for example, each time an operating system needs an update, every single mobile device or other computing device running the operating system will receive a download of an operating system update, which requires an enormous amount of bandwidth over time.

The advantage of keeping the platform code on the rewards-based, universal, integrated code base 203 and not downloading the code to the authorized user devices 204, 206, 208, 210, 212, 214, 216 improve the use of the user devices in a number of different ways. For example, an authorized user device 204, 206, 208, 210, 212, 214, 216 can experience an extended battery life because the authorized user device 204, 206, 208, 210, 212, 214, 216 is only used generally to receive a graphical user interface from the plurality of network-based servers 202. Complex data processing that might be required via a downloaded application as shown in FIG. 1A can be eliminated. Thus, the amount of data processed by the authorized user device 204, 206, 208, 210, 212, 214, 216 and the amount of data transmitted over the Internet or other wireless communication link can be reduced dramatically by only passing a user interface and eliminating other data communications which are currently clogging communication channels. The performance of the respective authorized user device 204, 206, 208, 210, 212, 214, 216 can also be improved in that the main processing power occurs in the plurality of network-based servers 202.

Each time a user accesses the rewards-based, universal, integrated code base 203 via their authorized user device 204, 206, 208, 210, 212, 214, 216, there is no need for an upload of data or a download of any application updates. Any necessary update occurs in the rewards-based, universal, integrated code base 203 already and the user interface that is presented on the authorized user device 204, 206, 208, 210, 212, 214, 216 represents the very latest version of the underlying platform 218A-K.

Authorizing a respective user device 204, 206, 208, 210, 212, 214, 216 to enable access to the rewards-based, universal, integrated code base 203 can occur in a number of different ways. Note that in many instances here, the authorized user device 208 is referenced to represent any of the authorized user devices 204, 206, 208, 210, 212, 214, 216 shown in FIG. 2A.

An authorization component such as a secure key or token can be generated on the respective user device to enable access through a communication module 229 to the rewards-based, universal, integrated code base 203. A top level username could be part of the authorization component as well. The authorized user device 208 may have a hardware component 350 shown in FIG. 3 (such as a secure element that stores a payment token in iPhones®) that provides the authorization to access the rewards-based, universal, integrated code base 203. The top level username, for example, could be stored as a token in a secure element or access hardware 350 as part of an authorization component. The authorization component 350 can be hardware, software, firmware, or other data. Upon seeking a connection, the system 200 can access or check the hardware component 350 and its configuration prior to allowing access. Other devices (iPhones®, Samsung® devices, etc.) cannot be hacked to enable access to the rewards-based, universal, integrated code base 203. In another aspect, a software component might be included in an operating system or a downloaded application to the authorized user device 204, 206, 208, 210, 212, 214, 216 or might be a license key or other secure data that is checked prior to granting access.

The authorized user device 204, 206, 208, 210, 212, 214, 216 can also be configured in an "always on" scenario where the user may choose a top level username and optionally a password and register or log on when the authorized user device 204, 206, 208, 210, 212, 214, 216 is first used. Thereafter, the user does not have to log on every time as the authorized user device 208 might always be accessible automatically until the user manually logs out. Thus, every time the user uses the authorized user device 204, 206, 208, 210, 212, 214, 216, the user automatically has access to the rewards-based, universal, integrated code base 203 without manually entering a username or a password. Biometrics can be used as well to open the authorized user device 204, 206, 208, 210, 212, 214, 216 or unlock the device which can then be automatically connected to the rewards-based, universal, integrated code base 203. Biometric systems can include a finger or face scanner, a voice recognition system, iris scanner and/or a multi-modal input system (finger print plus password, for example) or other biometric input.

In any event, the authorized user device 204, 206, 208, 210, 212, 214, 216, in one aspect, is exclusive to be able to access the rewards-based, universal, integrated code base 203. When the authorized user device 204, 206, 208, 210, 212, 214, 216 connects to the communication module 229, the communication module 229 can verify that the proper hardware 350 is found on the authorized user device 204, 206, 208, 210, 212, 214, 216 or that the proper software, password, token, code or license is provided and grant or deny access. The communication module 229 can be configured to manage communication between any of the plurality of authorized user devices 204, 206, 208, 210, 212, 214, 216.

Note that, in some cases, the authorized user device 208 is discussed as a short-hand example of any one or more of the various types of user devices 204, 206, 208, 210, 212, 214, 216 shown in FIG. 2A.

In another aspect, any authorized user device 208 could receive a license or the technical capability to gain access to the rewards-based, universal, integrated code base 203. No matter what the mechanism is for authorizing a respective user device 208, the principle is that not every device can simply gain access to the rewards-based, universal, integrated code base 203 in the same manner as a device that accesses a website via a browser or downloads an application.

In one aspect, a user needs to sign up for and register to obtain a top level username for access to and use of the capabilities of the rewards-based, universal, integrated code base 203. The top level username can be used for both a user to access the rewards-based, universal, integrated code base 203 as well as for a user to provide or manage one of the platforms 218A-K in the rewards-based, universal, integrated code base 203. From the top level username, other usernames or passwords can be provided in a tree-like structure. Thus, one user might generally gain access through a top level username, and then develop a number of different platforms that each can have an associated username or password that is connected to the top level username. Employees or managers associated with a platform 218A-K or a business 224, 226, 228 could receive passwords or other data connected (like branches to a tree) to the top level username for performing operations or actions for the user with the top level username. Rewards can be associated with the top level username and any subservient, connected usernames as well.

The authorized user device can be a home unit 204, a tablet, desktop or laptop 206, a mobile user device 208, an appliance Internet-of-Things device 210, a smart vehicle 212, a watch 214, a pair of smartglasses 216 or other device that will interact with the rewards-based, universal, integrated code base 203. The home unit 204 can be, for example, a device having similar functionality to Google Home® from Google® or Alexa® from Amazon® or Siri® from Apple® in which a user typically interacts with the device 204 via speech commands. As noted, the authorized user device 208 (representing all the user devices) can have a hardware or firmware component 350 that enables access to the rewards-based, universal, integrated code base 203 or a software solution, keyword, password, token, or other mechanism can be implemented to enable authorized use. In one example, communication between the authorized user device 208 and the rewards-based, universal, integrated code base 203 can be encrypted and only users who have authorized user devices 208 would be able to access the rewards-based, universal, integrated code base 203. In one aspect, each user agrees to provide data sharing and processing of their information and interactions within the rewards-based, universal, integrated code base 203 to enable the rewards to be provided for them and/or others as well as other data sharing capabilities. Such an agreement is not used in regular apps or when users utilize a browser to access websites in the same context.

The amount of code on the authorized user device 208 is contemplated as being minimal. Although this is not a requirement of the structure disclosed herein, in one preferred aspect, the authorized user device 208 does not store computer code in the same manner as existing mobile devices will store downloaded apps. For example, mobile devices 110, 112, 114 typically have downloaded applications 104, 106, 108 stored thereon with the respective functionality of those applications. See FIG. 1A. While this is a possibility in the present disclosure where perhaps a substantial amount of code related to the various platforms of the rewards-based, universal, integrated code base 203 might be downloaded onto respective user device 208, it is contemplated that the user interface and ability of the user to interact with the rewards-based, universal, integrated code base 203 will be substantially or purely based on user interface features being served from the rewards-based, universal, integrated code base 203 operating on the plurality of servers 202. In this regard, the authorized user device 208 might have minimal programming and all platforms and functionality would be provided from the rewards-based, universal, integrated code base 203 through the communication module 229.

One embodiment disclosed herein can be an authorized user device 204, 206, 208, 210, 212, 214, 216 that can be configured with an authorization component that enables access to the plurality of servers 202 and the rewards-based, universal, integrated code base 203. An authorized user device can include (as is shown in FIG. 3) a processor 310, an authorization component or access hardware 350 and a computer-readable storage device 315, the computer-readable storage device storing instructions which, when executed by the processor 310, cause the processor 310 to perform operations including accessing, based on the authorization component 350 and via a communications module 229, a plurality of network-based computer servers 202 that operate a rewards-based, universal, integrated code base 203. The rewards-based, universal, integrated code base can include a plurality of integrated platforms 218A-J (which can be third-party or operated or owned by the same entity operating the rewards-based, universal, integrated code base 203) and enables at least one or more of rewards, payments and data sharing between the plurality of integrated platforms 218A-J. The operations can further include interacting with at least one of the plurality of integrated platforms 218A-J via a downloaded user interface in which the plurality of network-based computer servers 202 does not download application code to the authorized user device 208 and participating, based on the use of the authorized user device 208 having the authorization component 350, in at least one of receiving rewards, making payments and sharing data amongst other users in the rewards-based, universal, integrated code base 203.

The authorization component 350 can include a hardware component, a firmware component or a software component. The authorization component further can include or store the top level username associated with the authorized user device as well as other related usernames and passcodes related in a variety of different ways, such as a tree structure.

In one aspect, the overall system 200 can include a plurality of network-based computer servers 202, a plurality of authorized user devices 204, 206, 208, 210, 212, 214, 216 and a rewards-based, universal, integrated code base 203 operating across the plurality of network-based computer servers and the plurality of authorized user devices 204, 206, 208, 210, 212, 214, 216. The rewards-based, universal, integrated code base 203 can include one or more components, platforms and/or modules that enable its operation. An entry point module/management 230 can be configured as part of the system to receive new merchant participants (see Merchant 1 224, Merchant 2 226) into the rewards-based, universal, integrated code base 203 in which each respective new merchant agrees to a payment framework in which a rebate is provided to a buyer of a product or service from the respective new merchant and a referral payment is made to a referring member who referred the buyer to the respective new merchant. This is part of the rewards component of the system, which is discussed next. Rewards can be provided across all interactions within the platforms 218A-K in the system 200. For example, users may view plain text from a website or a message that causes or leads the user to purchase a product or service, which can trigger a rewards to the author of the text. Interactions with images, videos or social media postings and instant messages can all trigger rewards if acted upon by readers.

A rewards management module 232 can be configured to connect a reader of a comment or message made by a writer in a platform configured within the rewards-based, universal, integrated code base 203 to a merchant associated with the comment and to provide a referral reward to the writer upon the reader making a purchase from the merchant. The overall system is "rewards-based" because the various platforms have integrated function through the modules disclosed herein. Rewards for users and businesses can be provided for any kind of interaction within the ecosystem 200. As platforms 218A-K (i.e., merchant/business platforms as well as others) are integrated into the rewards-based, universal, integrated code base 203, new rewards sharing, giving, spending and receiving can be enabled across the platforms 219A-K and users in ways not possible under the current Internet structure. Merchants 224, 226 participating in the rewards-based, universal, integrated code base 203 agree to the universal spending of rewards, receiving payment at least in part using rewards, and the sharing of data according to the privacy protocols on their platform or site 218A-K.

For example, a first user might send a message referencing Disneyland in passing. Another second user might read that message and then book tickets to Disneyland. As the system is set up with the rewards management module 232, the system can track the message (i.e., the words used) of the first user and the later purchase by the second user (related to the words in the message) and the first user can obtain a reward for mentioning Disneyland in the message if it results to a direct purchase.

Another module can include a universal username management module 234 configured to enable a single sign up for users of the rewards-based, universal, integrated code base 203 such that platforms and/or websites accessed after users sign into the rewards-based, universal, integrated code base 203 are accessible through a single password (which can be called a top level password) across all the platforms and/or websites within the rewards-based, universal, integrated code base 203. The universal username management module 234 can also manage additional, related passwords, usernames, codes and so forth for users that branch off from the top level password in a tree-like structure. Thus, a user can generate or obtain other passwords for related activities within the system 200, such as for various platforms they may have. The passwords related to the top level username can be given to employees, managers or other individuals associated with the user's platforms. The universal top level username does not change for the user but passwords and other authorizations such as for various businesses, employees, social media interactions, and so forth can change and can also be tied to the universal username in a tree-like structure. The universal username is used for everything across the rewards-based, universal, integrated code base. Authorized hardware will always have users and platform initially and constantly logged in unless users and platforms choose to log out.

Yet another module can include a data/privacy/file storage management module 236 configured, upon a specific user signing up, to provide an encrypted account on the plurality of network-based computer servers 202 to access data that the rewards-based, universal, integrated code base 203 has collected on the specific user across one or more platforms or websites, to yield collected data. The data/privacy/file storage management module 236 enables the specific user to delete any or all of the collected data and to inform the specific user regarding an impact of deleting any or all of the collected data would have on rewards provided to the specific user for interacting with platforms or websites across the rewards-based, universal, integrated code base 203. The claims in the present case focus on the privacy aspect of the data/privacy/file storage management module 236 and particularly how users can set up a user profile with privacy settings that relate to how the user can have their image blurred when taken by other user devices separate from their own user device. The process of requesting a blurred image to be unblurred is outlined below.

Furthermore, the user can be asked in advance permission to supply such data and be given approximations of what rewards they could earn if they allow usage of their data. This can be done through algorithms and other means such as general information familiar to the user like age, gender, shopping history, amount of referred users they have, etc. This can also be done at different levels. For example, a user might provide permission to share a small amount of data and be given the approximation of rewards for sharing that amount of data. A sliding scale or range could be offered to the user such that the user could balance the level of data sharing to the expected rewards associated with each respective level of data sharing.

In the rewards-based, universal, integrated code base 203, each respective user will know, based on algorithmic patterns and with data presented to the user, what opting into certain data collections could earn them in estimated rewards. The data management aspect of this module 236 is discussed more fully below as well with respect to how data is stored in one location and made available across the ecosystem 200 in new ways that are not possible now without opening and closing platforms or websites.

In one aspect, existing external data sources or websites 254, 256, 258, 260, 262 may also communicate with users at least in part through the rewards-based, universal, integrated code base 203. Accessing such external platforms is structured differently from internally managed platforms 218A-K or internally hosted websites 218I. It is contemplated that the authorized user device 208 (representing all user devices 204, 206, 208, 210, 212, 214, 216) would be a key component to enabling a secure encrypted communication from the authorized user device 208 to the rewards-based, universal, integrated code base 203 either for internally hosted platforms and/or websites 218A-K or for extra functionality made available for interactions with external websites 254, 256, 258, 260, 262 or other platforms/applications external to the rewards-based, universal, integrated code base 203.

External websites or applications 254, 256, 258, 260, 262 generally fall into two categories. Website 1 254 and website 2 256 can be standard websites that have no relationship or agreement with the rewards-based, universal, integrated code base 203 (or entity operating the rewards-based, universal, integrated code base 203). In this regard, they are deemed non-approved sites 264. Users of authorized user devices 208 can access regular websites 254, 256 in the normal fashion using a browser on their respective user device 208. However, since the regular websites 254, 256 do not have a data-sharing and payment or rewards agreement in place, a non-approved entity module 225 does provide some additional overlay and additional capabilities available to authorized user devices 208, but not the complete rewards based or enhanced functionality that other external sites 258, 260, 262 and the internal platforms and sites 218A-K enjoy.

In one example, a keyword on website 1 254 might be "Disneyland." While presenting to the user device 208 that graphical images for website 1 254, the non-approved entity module 225 might present or overlay a graphical notification indicating that there is additional data or rewards-based opportunity available to the user that can be accessed if the user clicks on the graphical notification. The non-approved entity module 225 can provide additional overlay functionality for the authorized user device 208, through the rewards-based, universal, integrated code base 203, when the authorized user device 208 interacts with the unauthorized third-party entity 254, 256. When a user goes to a non-approved site 254, 256, and types in the address bar of a browser, the rewards-based, universal, integrated code base 203 is running the search function and knows the site where the user is going. The authorized user device 208 accesses the rewards-based, universal, integrated code base 203 and then goes from the rewards-based, universal, integrated code base 203 to the non-approved sites 254, 256. In this manner, the user device 208 can access any web address, but goes through the rewards-based, universal, integrated code base 203, which then analyzes the content on the respective website 254, 256, and can layer on top of the existing functionality new links, images, text, advertisements, and so forth of the existing website 254, 256. The additional functionality on top of or adjacent to the existing website therefore becomes available. The user experience on their authorized user device 208 can be normal—the user can enter in a URL into a browser and simply go to the desired website in the normal fashion. However, since the user is logged into the rewards-based, universal, integrated code base 203, the user will be given or offered additional functionality as described herein in connection with each website 254, 256. The rewards-based, universal, integrated code base 203 does not interfere with any existing content of the website 254, 256 but provides a notice that there can be additional offers or rewards related to what is available through the rewards-based, universal, integrated code base 203.

The additional overlay functionality is provided on a user interface of the authorized user device 208 as the device interacts with the unauthorized third-party entity 254, 256. The additional overlay functionality can include at least one of a graphical notification associated with an object on the user interface and presented by the unauthorized third-party entity 254, 256. The notification can also be audible, tactile, haptic or provided in any other fashion on the authorized user device 208. The notification, if interacted with by the user or responded to by the user, present at least one capability offered by the rewards-based, universal, integrated code base 203.

The overlay functionality essentially provides advertising behind a written word that can be found anywhere within the ecosystem 200. The written word can be in a message, a website (approved 266 or not approved 264), an advertisement, a news article, or anywhere else a user might be able to see or read words. The approach here can also be applicable to images or videos as well. For example, the word Chevrolet or Pizza (a trademarked word or a generic word, it does not matter), might be viewable to a user and a linkover is shown. If the word lights up or there is a visual indicator that there are advertisements or data behind that word, a user can click on the graphical indicator. In one example, the various platforms 218A-K that might relate to that word and/or that might be within a certain distance (such as 1-5 miles, which can be set) can be presented to the user upon user interaction with the linkover. This can occur on any word presented to the user in the ecosystem as the system knows or has evaluated all of the text presented to the authorized user device 208 on the user interface. If a written word in any context (webpage, message, social media post, etc.) is configured a link already, then the user will see and be able to click that link as displayed but will also get notification that there is an overlay link available as well that provides rewards-based benefits as described herein.

In some cases, no reward is provided for a purchase made through accessing a linkover. However, in other cases, the writer or posting entity that provided the text can get a reward when a user interacts with the graphical representation and then makes a purchase because that person initiated the search for the product or service through the linkover related to a particular word. Authorized applications or sites 254, 256 do not obtain rewards as they have no agreement with the system 200.

Further, a keyword/pin drop/other management module 227 can also provide other capabilities for the user in addition to the standard interactions on the website 1 254 and the website 2 256. Users can create groups or social media experiences by dropping pins on a website 254, 256 even if it is unauthorized or non-approved 264.

In one example related to the pin drop process, users can add pins which can be dropped for ads that users may want to act on later. For example, a user may see a restaurant they want to visit but not until a future date or time. The user can drop a pin on the advertisement through a graphical object (such as a virtual "pin") on the ad which indicates that they have marked that ad. Pins can be dropped on other graphical features besides just ads as well. The user can then later "check in" when they go to the restaurant and when they go to pay their check with their authorized hardware device, the rewards-based, universal, integrated code base 203 checks to see if they "checked in" and apply rewards, rebates, etc. that are available. Where rebates or rewards have a time limit, the system can remind the user to make the purchase within the reward time limit, such as a free desert is available through people eating at a restaurant through Thursday of this week. The system can also notify them in advance about them dropping the pin so the user does not miss their reservation or do not miss out on the time-based reward. This can also be done for other goods and services as well through the rewards-based, universal, integrated code base 203. The reminders can also be for geographically-based rewards such as rewards for certain restaurants at certain locations which can also be related to the location of the user as identified via their user device 208.

External websites 258, 260, 262 have entered into a data sharing and rewards management agreement with the entity operating the rewards-based, universal, integrated code base 203. The interactions of the user via the authorized user device 208 provide, via the approved entity module 223, a partial or full functionality available within the rewards-based, universal, integrated code base 203. The approved entity module 223 can be configured to manage communication between a plurality of authorized third-party sites 258, 260, 262. The approved third-party sites 266 can interact with the rewards-based, universal, integrated code base 203 through a communication mechanism or communication link to enable the external websites 258, 260, 262 to provide at least some of the functionality or a substantial part of the rewards-based interactive functionality of the rewards-based, universal, integrated code base 203.

In one example, an application like Facebook® 263 or Uber® 260 could have a communication interface to the rewards-based, universal, integrated code base 203, but the user, through their special authorized user device 208, would access the rewards-based, universal, integrated code base 203 for social media interactions or to obtain a ride but would never directly engage with Uber® 260 or Facebook® 262 as their functionality would be made available through the rewards-based, universal, integrated code base 203 and through the approved entity module 223 which adds new capabilities including a rewards-based interaction to these external sites 260, 262. Thus, a user accessing a URL associated with Uber® 260 or Facebook® 262 might access a platform or site hosted 218I on the rewards-based, universal, integrated code base 203 but that has some data feed or functionality provided by Uber® 260 or Facebook® 262.

In one scenario, a social media application like Facebook® or a merchant application like Walmart® could have an interface (such as the approved entity module 223) to the rewards-based, universal, integrated code base 203, but the user, through their special authorized user device 208, would access the rewards-based, universal, integrated code base 203 for social media interactions or to purchase products but may never directly engage with Walmart® or Facebook®

262. The functionality of these sites or applications would be made available through the rewards-based, universal, integrated code base 203, which adds new capabilities including a rewards-based interaction.

In another aspect, companies that run external websites 258, 260, 262 cannot obtain the full functionality of the platforms 218A-K because they are not integrated into the rewards-based, universal, integrated code base 203. The sites 258, 260, 262 might, for example, be granted a percentage of a sale from an advertisement on their site if they advertise or encourage users to join the rewards-based, universal, integrated code base 203 ecosystem. Other limited functionality might be provided through a communication link and the approved entity module 223 as well with respect to rewards, advertising, and so forth. However, to gain the full possible functionality, such companies might also need to include a platform on the rewards-based, universal, integrated code base 203. For example, a Facebook® platform 218J can be added to the rewards-based, universal, integrated code base 203. An Uber® platform 218K might also be added to the rewards-based, universal, integrated code base 203. Users accessing the rewards-based, universal, integrated code base 203 can obtain the full functionality by integrating with the platform 218A-K or might also interact with the respective sites 258, 260, 262 as well but only be granted limited functionality.

In some cases, a platform 218A-K on the rewards-based, universal, integrated code base 203 might communicate via the approved entity module 223 with an associated site 262 for access to data such as permissions, user data, profiles, product inventory, and so forth, but the primary functionality needed to grant all of the capabilities of the rewards-based, universal, integrated code base 203 might be internal.

Thus, the communication flow between the authorized user device 208 and the system 200 including any platforms 218A-K that might be accessed and used by the authorized user device 208 is different from the flow of data in communication links in the traditional approach. Again, since the combined platforms all operating on the same rewards-based, universal, integrated code base 203, the authorized user device 208 only needs to communicate with the system 200 and with no other apps, websites, or other entities. Developers 220, 222 and other entities would obtain authorization to exist on the rewards-based, universal, integrated code base 203 and thus interact with the individual users through the system 200.

Various modules 230, 232, 234, 236, 238, 240, 242, 244, 246, 248, 250 are configured within the rewards-based, universal, integrated code base 203 to enable and implement the special processing that becomes capable within the framework. An entry point management module 230 processes new platforms 218A-K that merchants or other entities desire to operate in the rewards-based, universal, integrated code base 203. In the conventional app store model, there is an ingesting process in which an application is checked and approved to entry into the app store. The process of the entry point management module 230 is different in that it operates to bring in code or can be used to develop code upon request that is integrated into the rewards-based, universal, integrated code base 203 in a completely different way than just providing a platform to run separate and individual applications.

A rewards management module 232 enables rewards to be provided to individuals across the platform and for a variety of different interactions across different platforms 218A-K, and/or approved sites 258, 260, 262 such as for providing comments, reviews, purchasing items, viewing a site, referring new people to the system 200, sending messages, and so forth.

A universal username management module 234 can manage the top level user username and associated passwords. In one example, a tree structure is used with a new user in the system having what is called a top level username to initiate entry into the system 200. Thereafter, other passwords, codes, usernames, etc. can be used for other purposes and can be tied to the unchanging top level username. For example, one user might join or register for the system 200 and receive or purchase their authorized user device 208 which enables full participation in the system 200. Thereafter, the user might become a developer 220 and provide code or ask for a platform to be developed within the rewards-based, universal, integrated code base 203. The user will have a top level username that is comparable to a tree trunk that supports numerous branches. Other passwords or codes can be connected as branches from the top level username for other platforms or data within the rewards-based, universal, integrated code base 203. The top level username does not change but passwords or other identification data connected as a branch to the top level username (tree trunk) can change. Employees or managers associated with a platform owned by a user having a top level username can be granted passwords associated with their jobs and which give them permissions to perform certain functions for the platform.

The universal username management module 234 can be configured to enable the owner of the top level username to assign permissions and passwords associated with the top level username to others. For example, an owner of a ride management platform 218C can have a top level username of johndoe and can assign permissions or passwords to employees or general managers associated with operating the ride management platform 218C. In this regard, downward passwords or permissions associated with the top level username can be granted to perform various functions associated with the ride management platform 218C. Passwords or permissions can change but the top level username does not change.

A data/privacy/file storage management module 236 can manage the user data and privacy settings within the rewards-based, universal, integrated code base 203. Once the data is uploaded, the data becomes available to social media processes 218B, texting/messaging/emailing processes 218E, authorized websites and platforms 218I, and so forth. The capability of that data being accessible across the rewards-based, universal, integrated code base 203 is a novel feature disclosed herein. Users can control how much of their data is shared or analyzed for various reasons. The more data that is shared, however, the greater the rewards are to the user. Thus, the management of data privacy, the level of privacy provided, and the associated coordination with a rewards/ratings management module 248 are important features. One aspect of the data/privacy/file storage management module 236 which is developed more fully herein below is how users can manage the blurring and unblurring of their face or body when an image of them is taken in a picture or video by another user device without their authorization.

A messaging management module 238 is used to manage messaging within rewards-based, universal, integrated code base 203. For example, a platform such as the email platform 218E can represent any messaging or communications within the rewards-based, universal, integrated code base 203. Users may use words in a message that can trigger or cause a link to be provided which can enable a purchase to be made and a reward to be provided. The messaging management module 238 can analyze messages and implement the rewards-based interactions made available through the rewards-based, universal, integrated code base 203. In one example, the comment or message made by a user can include one or more of a blog post, a review of a product or media, a message from a first user to a second user, a social networking post, a rating, or a reaction associated with a posting. The data can also be simply text in a stored file created by a user. These communications can be managed within the rewards-based, universal, integrated code base 203 in an integrated way to provide rewards for the person making the comment. For example, if a user comments on Disneyland in a blog post, social media posting, or even a message or email, if a user who reads the communication in any format then goes to Disneyland or makes a purchase of products or services related to Disneyland, the person initiating that communication will get a reward.

A geolocation management module 240 can track and utilize the geolocation of any one or more of the authorized user devices 204, 206, 208, 210, 212, 214, 216. In this regard, in some cases a reward or some other operation within the rewards-based, universal, integrated code base 203 might be enhanced or implemented based on the location of the authorized user device 204, 206, 208, 210, 212, 214, 216. The geolocation management module 240 will receive that location, which can be provided through the communication module 229 in communication with the respective authorized user device 204, 206, 208, 210, 212, 214, 216, and share that location across other modules that might need or utilize the geolocation of the authorized user device 204, 206, 208, 210, 212, 214, 216.

An auction/real-time bidding management module 242 enables merchants 224, 226 to provide real-time auctions or bidding to users of the system via devices such as the authorized user device 208. This capability, rather than just being built into an app or on a website as in the old system, is offered by the rewards-based, universal, integrated code base 203 to all of the merchant-based platforms 218A-K and/or approved third-party sites 258, 260, 262. An offer builder module 244 provides functionality related to building offers that can be provided to users by merchants 224, 226 or other platforms 218A-K in the rewards-based, universal, integrated code base 203. For example, the geolocation management module 240 might indicate that the authorized user device 208 is near a merchant 224 location. The offer builder module 244 can provide an offer for a reduced price for a meal at the merchant 224 (assume it's a restaurant) and provide that offer to the authorized user device 208. In another aspect the offer builder module 244 can create real-time, flash, scheduled, and/or custom offers at any time and offer to any of the users of the rewards-based, universal, integrated code base 203.

In one example of how the offer builder module 244 might work, enhanced rewards can be generated for merchants. A merchant may choose to create enhanced rewards offers to entice users to purchase their goods and services. A merchant may decide because business is slow on a certain day(s) or time(s) to add value to the rewards used towards purchases between those parameters such as for a day or time. A user during the enhanced rewards period might earn $2 in rewards for every $1 spent. Rewards can in essence be increased from the universal $1 value to any higher value the merchant wants based on the criteria they set.

A platform grouping/combining management module 246 can enable aggregating platforms or combining platforms in ways not possible or even contemplated in the current structure of application and website use. Users can create combinations of platforms as well as select timings of when a combined platform user interface should be presented. Thus, for example, a user can ask for their Facebook feed, favorite blog and news feed be combined into a single feed at 7 AM for reading and reviewing before going to work.

The grouping/combining management module 246 carries out two different functions and can be separated into two modules each performing one of the functions of grouping or combining. One function relates to combining platforms which is a user functionality in which users choose two or more different platforms to combine into a single news feed data feed or user interface. Users choose which platforms to combine and the rewards-based, universal, integrated code base 203 combines the data from the various platforms into a single data feed for the user to consume.

The platform grouping/combining management module 246 enables the integration of these various different platforms of the same type (social media) or of different types without the need of the user opening one application for news, checking their news feed, and then closing that application and opening another application for social media viewing. Information in those feeds could be sorted by subject, topic, geolocation, username and the like. Because the platforms 218A-K are integrated into the rewards-based, universal, integrated code base 203, it becomes possible to aggregate or combine them in new ways as controlled by the user.

The other function is the grouping concept which involves businesses joining or voluntarily creating a group of merchants or platforms that can then share rewards based on referrals or an order in which users visit platforms in the group and make purchases. Grouping can also be called joining in that merchants join or create groups which can be done through a merchant interface and which can be based on, for example, a similarity or complementary goods or services relative to other merchants in the group.

Grouping, via the platform grouping/combining management module 246, platforms may be done for the purpose of coordinating rewards or purchases amongst different merchants. For example, one merchant might sell movie tickets or on-line access to media and another merchant might sell popcorn. Merchants can be "grouped" that have complementary or related products or services. In this manner, rewards can be shared amongst such related merchants via a grouping operation. A result of the grouping operation can be a presentation of grouped merchants on authorized user devices 208 that encourages or informs the users of grouped/related business and that can thereby encourage the user to rent a movie from one merchant and purchase popcorn from another. Rewards can flow between the grouped merchants and the user as well in new ways not currently implemented.

In one example of grouping, a topic such as dogs can be the basis upon which a group is made. A dog groomer, dog sitter, and dog walker can operate different companies but because they are complementary or relate to one topic, they can elect to be grouped together as a "mini-mall". Each of these different companies can have a platform on the rewards-based, universal, integrated code base 203 and can find each other for the purpose of selecting or seeking to group together. Groups can be organized in different ways. For example, a group focused around a topic of dogs can include six entities which can be people, businesses, or other entities. All of the parties elect or choose to be part of the group. In one example, four of the six might only be a part of that group but the remaining two might be also a part of another group such as for animals in general or other topics which might relate to their business such as a business selling grooming products.

In one aspect, when businesses combine their business platforms, via the grouping function, into virtual malls, users can enter through any one of the grouped platforms and participate and shop amongst any platform in the group. In one context, users are encouraged to patronize the platforms in the group and buy products from multiple platforms or all the businesses platforms in that virtual mall. In one aspect, a universal shopping cart can be provided across the entire rewards-based, universal, integrated code base 203 or be modified to only be available in the virtual mall of a group of businesses. In another aspect, a universal shopping cart can be provided with incentives for purchases across the group of businesses, such as a discount where products are purchased from more than one business of the group. In a universal shopping card model, the user gets one receipt and makes one purchasing process based on numerous items in the shopping cart that can be from different platforms.

In another aspect, users can get one itinerary and a referring business platforms from within the virtual mall can get rewards if the user buys something from the next business platform after leaving the first business platform in the virtual mall. Thus, if a user is at a dog grooming platform and then next goes to a dog walking platform and orders dog walking assistance, the dog grooming platform can receive a reward as the business platform that is the most recent before a user makes a purchase within the virtual mall of grouped platforms. This can be one benefit of being part of a group. Group discounts, group advertising, and other group benefits can be provided as well once platforms organize in this manner. Businesses in a group that are determined to "refer" a user to another one of the businesses in the group will receive a reward based on the purchase, which encourages sales amongst the group. Thus, the grouping enables rewards and referral rewards for members of the group all in the context of the rewards-based, universal, integrated code base 203.

A review/ratings management module 248 enables the management of user reviews and ratings across the rewards-based, universal, integrated code base 203. Any user, any platform, any merchant, or any other entity can be reviewed, rated or commented on in the rewards-based, universal, integrated code base 203. In one example, unlike current applications, users in the rewards-based, universal, integrated code base 203 may only be allowed to review products or services they have actually purchased. In another aspect, all platforms 218A-K and merchants 224, 226 can be reviewed and the reviews may be seen by anyone throughout the rewards-based, universal, integrated code base 203. Words in any review can also lead to rewards for the reviewer as well as noted herein based on a reader of the review making a purchase of a related product or service.

A payment management module 250 enables a simplified payment process across platforms. In one example, currency is used within the rewards-based, universal, integrated code base 203 such that people can earn rewards and make payments within the rewards-based, universal, integrated code base 203. In another aspect, a user might provide a credit card or other payment mechanism that can include cryptocurrencies, any fiat currency, or other payment mechanism and can use that payment mechanism in whole or in part to make payments within the rewards-based, universal, integrated code base 203. For example, the user might pay with the system currency for a part of what is owed to buy a product but pay the rest using a credit card or debit card on file. The payment management module 250 can manage all such payments as well as other functionality related to payment processes within the rewards-based, universal, integrated code base 203.

In one aspect, the payment management module 250 can enable a universal shopping cart across platforms. Since all the platforms share the same rewards-based, universal, integrated code base 203, users can easily place items from a first platform into a shopping cart and continue to shop on other platforms. The shopping cart can carry over or retain the various items from different platforms and then the user can make single payment for the various items. Payments and instructions can then be transmitted to the different platforms for delivering the products or services. Further, shopping carts can be developed for and be universal across grouped merchants as discussed above. Thus, the "universality" of shopping carts in this context could be dynamic as merchants enter and leave a particular group. Users could also customize shopping carts to be universal across all their sports equipment purchases or across a certain type of platform.

In another example, while in most cases payments using rewards earned remain within the rewards-based, universal, integrated code base 203 environment, outside entities such as a charity, merchant or other entity might need a payment to be made. Rewards can be based on a fiat currency, a token associated with the rewards-based, universal, integrated code base 203, a cryptocurrency, and so forth. Merchants 224, 226 can in one aspect agree to be paid in rewards at least in part earned by use of the system 200. In one example, a user might be able to designate that some of the rewards that they earn should go to a charitable organization. A payee outside network 252 can represent such an outside entity that gets paid from the payment management module 250 as managed by the payment management module 250. The payment management module 250 could handle transitions or conversions of an internal currency for the system 200 and a fiat currency like the dollar that is received by the payee outside network 252.

Merchants 224, 226 can interact with the rewards-based, universal, integrated code base 203 through the use of a merchant module 221. The servers and/or point of sale (POS) devices associated with respective merchants 224, 226 are each "authorized" in that they have hardware 350 or software components that enable them access to the rewards-based, universal, integrated code base 203 and all its functionality. The merchant module 221 can enable inventories to be coordinated, offers to be provided, and access to and coordination with the various functional modules described herein that enable the features in the rewards-based, universal, integrated code base 203. The merchants 224, 226 may connect via a merchant server or point of sale (POS) system and such systems would be "authorized" as described herein. A POS device 228 may also be "authorized" and connected via the merchant module 221 to the rewards-based, universal, integrated code base 203. Again, in this regard, the authorized POS device 228 might have a hardware component 350 that enables it to access the rewards-based, universal, integrated code base 203 or it may have a software or licensed authorization to access the rewards-based, universal, integrated code base 203. Typically, a merchant owner will have a top level username connected with the respective merchant 224, 226 and/or POS 228.

Note that the payment management module 250 can enable users to receive rewards for their various activities within the rewards-based, universal, integrated code base 203 but that merchants 224, 226, when they get paid, will receive fiat, cryptocurrency, or other standard payments for goods and services sold from platforms 218A-K configured in the rewards-based, universal, integrated code base 203. The payee outside network 252 can be used in connection with any merchant 224, 226 to get paid. In one aspect, rewards received by users of the rewards-based, universal, integrated code base 203 can be redeemed or used for purchases within the system 200 but cannot be pulled out as fiat such as the dollar. Users may in one aspect be required to use them within the rewards-based, universal, integrated code base 203 to make purchases from authorized or approved platforms 218A-K. The payment management module 250 can manage the permissions with respect to what rewards have to be used internally and what can be pulled out and transferred to an external payment network 252.

In another example of the rewards-based, universal, integrated code base 203 capabilities can include functionality for restaurants. For example, through the use of the entry point management module 230 and the use of the merchant module 221, a restaurant owner (say merchant 224) might be able to provide an update in a price or in a food and offering. Restaurants often change their menus depending on the season, the day, or for other reasons. One challenge exists is that such changes are not immediately reflected in an online menu that might be available on a websites managed by a third-party. In this case, restaurant owners often have to go into their website or applications and make changes themselves. Where customers might not be viewing the most recent venue items or charges, such a discrepancy can put a restaurant owner in a position of taking a financial hit.

However, by using the rewards-based, universal, integrated code base 203 as disclosed herein, if a restaurant 224 is integrated with the system 200, their website can be hosted via the web hosting platform 218I or may be an approved third-party site 266 such that the externally hosted website 258 can obtain or have available the functionality provided by the system 200. The restaurant website 258 or merchant system 224 can integrate with a point of sale 228 of the restaurant and any changes that are made on the fly to a menu, an image, or other data which might be stored in a memory device 315 of the plurality of servers 202, can be reflected in the restaurant online ordering system automatically. The data/privacy/file storage management module 236 discussed more fully below can manage the data distribution processes. Thus, in FIG. 2A, merchant 1 224 might have a server and/or POS station 228 which can be integrated or have a communication link to the rewards-based, universal, integrated code base 203. In this regard, any menu change (or any change to any data or file) that might be made or entered into any of these computing devices within the plurality of servers 202, can automatically be integrated in or updated for their online ordering within the rewards-based, universal, integrated code base 203 or to the merchant server 224 or at the POS 228.

In another aspect, if a restaurant gets a large amount of orders in a short amount of time for delivery, the amount of orders may be so high that the company stops taking phone orders for delivery. The approach disclosed herein would enable accessing additional delivery services which can be enabled via a restaurant platform and a food delivery platform within the rewards-based, universal, integrated code base 203. Specials, offers and discounts can also be offered automatically and in real-time based on preset condition set by platforms, i.e., restaurants and the like. In one aspect, a grouping of merchants as discussed above can include such features as load balancing where one service can easily communicate with another service to fulfill orders it cannot fulfill. Price sharing and rewards sharing can automatically flow between the groups merchants that help each other in this regard.

By providing the rewards-based, universal, integrated code base 203, the approach disclosed herein introduces an entirely new concept for how users will interact with the computing environment. In the old process of using applications, a user would open an application, perform a function or buy a product, and close the application only to open up another application. Each merchant, such as Nike® or Costco®, would have their own separate application. The applications had no mechanism of interacting with each other and were separated in terms of their program base and how they were stored on a user device 110, 112, 114. The new rewards-based, universal, integrated code base 203 enables users to seamlessly move from one platform to another and introduces an interoperability amongst platforms that simply currently does not exist. Thus, the concept of opening and closing individual applications for accessing separate individual operations or functions no longer applies. The same is true for separate websites. The Nike® website does not have interoperability with the Costco® website. Users have to use their browser to go and access these sites separately. Conceptually and according to this disclosure, every platform, every website, and every merchant that joins the rewards-based, universal, integrated code base 203 will receive and accept an interoperability and data sharing regime that is not possible in the current structure of the Internet.

Any merchant or entity that joins this system 200 will be provided with the capability of enabling users to easily switch to different platforms, make payments on platforms, provide, spend and receive rewards for user interactions related to that merchant or entity, have their data aggregated with other data or other platforms as desired by the user, and so forth. In other words, merchant or entities that enter into the rewards-based, universal, integrated code base 203 will be given functionality that developers who upload apps to the app store have no ability to obtain.

As an example of switching platforms, because platforms are all integrated into the rewards-based, universal, integrated code base 203, users can be on one platform, such as a social media site, and the switch from one platform to another without closing one and opening another. The switching can occur through interacting with a drop-down menu, or entering a command, or interacting with a graphical interface on the authorized user device 208.

In one aspect, the system can include the rewards-based, universal, integrated code base 203 as a network-based plurality of computers functioning to provide the capabilities disclosed herein. In another aspect, a "system" 200 can include both the rewards-based, universal, integrated code base 203 and one or more of the authorized user devices 204, 206, 208, 210, 212, 214, 216 which are used to access the rewards-based, universal, integrated code base 203.

The embodiments related to the system 200 can include any one or more of the modules discussed above in the context of the rewards-based, universal, integrated code base 203. For example, one system can include a plurality of network-based computer servers 202, a plurality of authorized user devices 204, 206, 208, 210, 212, 214, 216 and a rewards-based, universal, integrated code base 203 operating across the plurality of network-based computer servers 202 and/or the plurality of user devices 204, 206, 208, 210, 212, 214, 216. The rewards-based, universal, integrated code base 203 can include one or more of an entry point management module 230 configured to receive new merchant participants 224, 226 into the rewards-based, universal, integrated code base 203 in which each respective new merchant 224, 226 agrees to a payment framework in which a rebate is provided to a buyer of a product or service from the respective new merchant 224, 226 and a referral payment is made to a referring member who referred the buyer to the respective new merchant 224, 226. A rewards/loan management module 232 can be configured to connect a reader of a comment or message made by a writer in a platform configured within the rewards-based, universal, integrated code base 203 to a merchant 224, 226 associated with the comment and to provide a referral reward to the writer upon the reader making a purchase from the merchant 224, 226.

A loan aspect of the rewards/loan management module 232 can enable users to borrow from their future or expected rewards. The user can borrow against the future rewards and make purchases and then their future earned rewards can be used to pay off the loan. In one scenario, users make a payment using the rewards that they have, and if they do not have enough to make a purchase, users borrow more based on their earning potential, like their spending through rewards-based, universal, integrated code base 203 and or the amount their referred users bring in through the rewards-based, universal, integrated code base 203. Users can be offered a loan of rewards to be paid back from their future earned rewards. The loan amount could be a partial or full loan of their remaining balance for the goods or services they are currently buying after they applied their current available rewards.

A universal username management module 234 can be configured to enable a single sign up (top level username) for users of the rewards-based, universal, integrated code base 203 such that platforms 218A-K and/or websites 258, 260, 262 accessed after users sign into the rewards-based, universal, integrated code base 203 are accessible through a single top level username across all the platforms and/or websites within the rewards-based, universal, integrated code base 203.

A data/privacy/file storage management module 236 can be configured, upon a specific user signing up, to provide an encrypted account on the plurality of network-based computer servers 202 to access data that the rewards-based, universal, integrated code base 203 has collected on the specific user across one or more platforms 218A-K or websites 258, 260, 262, to yield collected data. The data/privacy/file storage management module 236 can enable the specific user to delete any or all of the collected data and to inform the specific user regarding an impact of deleting any or all of the collected data would have on rewards provided to the specific user for interacting with platforms 218A-K or websites 258, 260, 262 across the rewards-based, universal, integrated code base 203.

The comment or message mentioned above can include one or more of a blog post, a review of a product or media, a message from a first user to a second user, a social networking post, a rating, or a reaction associated with a posting.

In one aspect, the rewards-based, universal, integrated code base 203 enables a user operating an authorized user device 208 of the plurality of devices 204, 206, 208, 210, 212, 214, 216 to perform one or more of switching platforms, aggregating platforms, providing a review, making a purchase, interacting with a social media platform, and exchanging data between a first platform and a second platform.

Each device of the plurality of devices 204, 206, 208, 210, 212, 214, 216 provides for a secure and encrypted communication channel with the rewards-based, universal, integrated code base 203. Each device of the plurality of devices 204, 206, 208, 210, 212, 214, 216 in one aspect may only provide a user interface served from the rewards-based, universal, integrated code 203 and does not store application code or platform code on the respective authorized user device 208.

In one aspect, the only way to access rewards as managed by the rewards management module 232 and from the rewards-based, universal, integrated code base 203 is by the use of one of the plurality of authorized user devices 204, 206, 208, 210, 212, 214, 216. In other words, there is no mechanism outside of the plurality of authorized user devices 204, 206, 208, 210, 212, 214, 216 in which an unauthorized user device could access the capabilities and reward functionality offered in the rewards-based, universal, integrated code base 203. Unauthorized devices would not be granted access to the rewards-based, universal, integrated code base 203, or to any of its platforms or websites. Other types of authorized devices could also be added by licensing, hardware or software solutions to enable access to the rewards-based, universal, integrated code base 203.

In another aspect, a system can include a plurality of network-based computer servers 202 upon which the rewards-based, universal, integrated code base 203 operates and an entry point management module 230 configured to receive new entity participants into the rewards-based, universal, and the integrated code base 203 in which each respective new entity agrees to an information exchange framework for a respective platform associated with the respective new entity. The rewards-based, universal, integrated code base 203 can include an aggregation of each respective platform 218A-K associated with each respective new entity or third-party entity and which enables at least one or more of rewards, payments and data sharing between each respective platform in the rewards-based, universal, integrated code base 203.

In one aspect, an update by a respective entity to its respective platform operating on the rewards-based, universal, integrated code base 203 is reflected across at least one of a plurality of different surfaces of the respective platform. In one example, the respective entity can include a restaurant and the update can include a menu update and wherein at least one of the plurality of different surfaces (websites, platforms a user can access) can include an on-line ordering form.

FIG. 3 illustrates an example computing system architecture of a system 300, which can be used to process data operations and requests, store data content and/or metadata, and perform other computing operations. The system 300 can be used as one of the plurality of computer servers 202, or could provide information about various components which can be part of an authorized user device 208 (or any of the user devices). In this example, the components of the system 300 are in electrical communication with each other using a connection 305, such as a bus. The system 300 includes a processing unit (CPU or processor) 310 and a connection 305 that couples various system components including a memory 315, such as read only memory (ROM) 320 and random access memory (RAM) 325, to the processor 310. The system 300 can include a cache of high-speed memory connected directly with, in close proximity to, or integrated as part of the processor 310. The memory 315, RAM 325, ROM 320 or any other memory device can represent the computer storage device which stores data or files within the system 200 and which are available for use across one or more of the platforms 218A-K as discussed above.

The system 300 can copy data from the memory 315 and/or the storage device 330 to cache 312 for quick access by the processor 310. In this way, the cache can provide a performance boost that avoids processor 310 delays while waiting for data. These and other modules can control or be configured to control the processor 310 to perform various actions. Other memory 315 may be available for use as well. The memory 315 can include multiple different types of memory with different performance characteristics. The processor 310 can include any general purpose processor and a hardware or software service, such as service 1 332, service 2 334, and service 3 336 stored in storage device 330, configured to control the processor 310 as well as a special-purpose processor where software instructions are incorporated into the actual processor design. The processor 310 may be a completely self-contained computing system, containing multiple cores or processors, a bus, memory controller, cache, etc. A multi-core processor may be symmetric or asymmetric. An access hardware component 350 can store a token, password or other characteristic that is checked to enable access to the plurality of servers 202 and thus the rewards-based, universal, integrated code base 203 and all its capabilities. A sensor 352 can include any type of sensor such as a heat sensor, a light sensor, a gyroscope, a speed sensor, a motion sensor, an accelerometer, a device orientation sensor, a location-based sensor, a microphone, a camera, a biometric sensor, and so forth that can be accessed or used by any application or platform 218A-K or site 258, 260, 262 on the rewards-based, universal, integrated code base 203.

To enable user interaction with the computing system 300, an input device 345 can represent any number of input mechanisms, such as a microphone for speech, a touch-sensitive screen and/or camera for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with the computing system 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 325, read only memory (ROM) 320, and hybrids thereof. The computer-readable medium may include memory or data storage media, such as non-volatile random access memory (NVRAM), electrically erasable programmable read-only memory (EEPROM), FLASH memory, magnetic or optical data storage media, and the like.

The storage device 330 can include services 332, 334, 336 for controlling the processor 310. Other hardware or software modules are contemplated. The storage device 330 can be connected to the connection 305. In one aspect, a hardware module that performs a particular function can include the software component stored in a computer-readable medium in connection with the necessary hardware components, such as the processor 310, connection 305, output device 335, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 4:
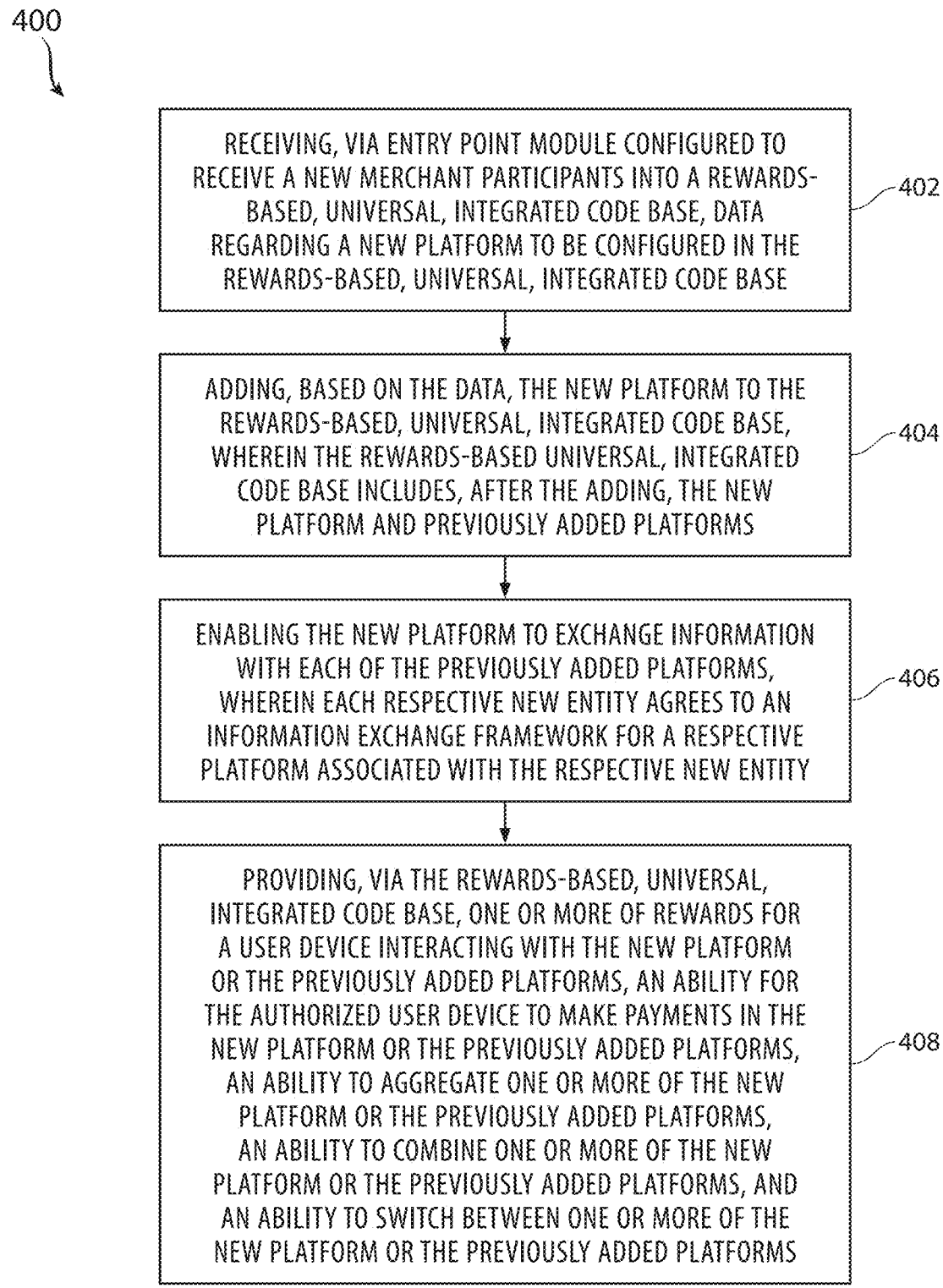
FIG. 4 illustrates a method embodiment related to the overall system operations.

FIG. 4 illustrates an example method 400 related to the operation of the system 200. A method 400 can include receiving, via entry point management module 230 configured to receive new merchant 224 participants into a rewards-based, universal, integrated code base 203, data regarding a new platform to be configured in the rewards-based, universal, integrated code base (402), adding, based on the data, the new platform 218A-K to the rewards-based, universal, integrated code base 203, wherein the rewards-based, universal, integrated code base 203 includes, after the adding, the new platform and previously added platforms (404) and enabling the new platform to exchange information with each of the previously added platforms, wherein each respective new entity agrees to an information exchange framework for a respective platform associated with the respective new entity (406). The method includes providing, via the rewards-based, universal, integrated code base 203, one or more of rewards for an authorized user device interacting with the new platform or the previously added platforms, an ability for the authorized user device 208 to make payments in the new platform or the previously added platforms, an ability to aggregate one or more of the new platform or the previously added platforms, an ability to combine one or more of the new platform or the previously added platforms, and an ability to switch between one or more of the new platform or the previously added platforms (408).

The authorized user device 208 can include a specialized device that is authorized to access a user interface presented on the user device from the rewards-based, universal, integrated code base 203. The authorized user device 208 can provide a secure communication channel to the rewards-based, universal, integrated code base 203.

Figure 5:
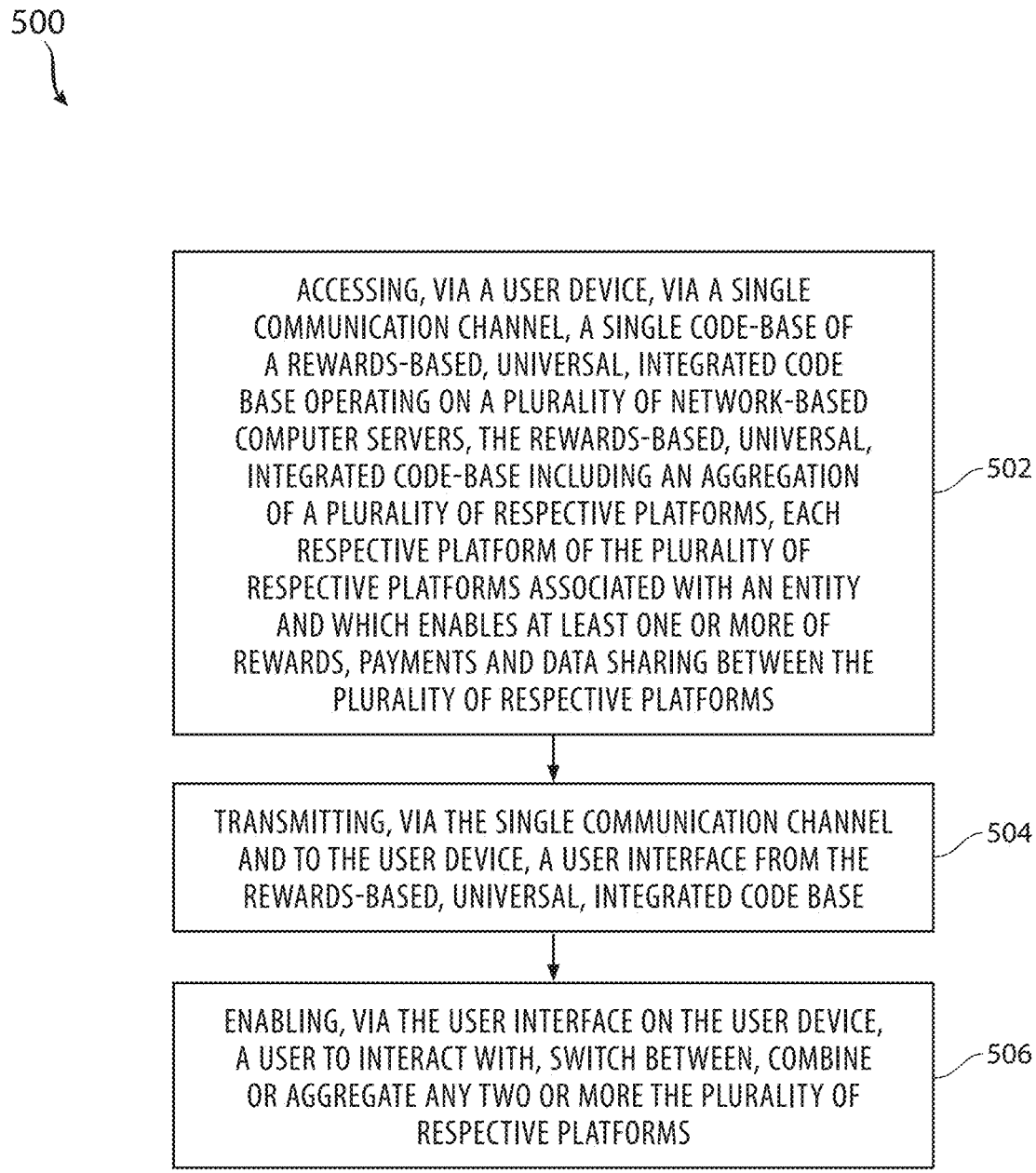
FIG. 5 illustrates another method embodiment.

FIG. 5 illustrates another example method 500. A method 500 can include accessing, via an authorized user device, via a single communication channel, a rewards-based, universal, integrated code base 203 operating on a plurality of network-based computer servers 202, the rewards-based, universal, integrated code base 203 including an aggregation of a plurality of respective platforms, each respective platform of the plurality of respective platforms associated with an entity and which enables at least one or more of rewards, payments and data sharing between the plurality of respective platforms (502) transmitting, via the single communication channel and to the authorized user device, a user interface from the rewards-based, universal, integrated code base 203 (504) and enabling, via the user interface on the authorized user device, a user to interact with, switch between, combine or aggregate any two or more of the plurality of respective platforms (506).

A respective platform can include a merchant and wherein the merchant agrees, as part of being on the rewards-based, universal, integrated code base 203, to a payment framework in which a rebate is provided to a buyer of a product or service from the merchant and a referral payment is made to a referring member who referred the buyer to the merchant. The merchant also agrees to be paid via the rewards earned by users in the ecosystem 200. The plurality of platforms can include at least one or more of a social media platform 218B, a shopping platform 218F, a ride-ordering platform 218C, a media platform 218G and a communication platform 218H.

The rewards-based, universal, integrated code base 203 further can include a rewards management module 232 configured to connect a reader of a comment or message made by a writer in a platform configured within the rewards-based, universal, integrated code base 203 to a merchant 224, 226 associated with the comment and to provide a referral reward to the writer upon the reader making a purchase from the merchant 224, 226. The rewards-based, universal, integrated code base 203 further can include a universal username management module 234 configured to enable a single sign up (an unchanging top level username) for users of the rewards-based, universal, integrated code base 203, such that platforms and/or websites accessed after users sign into the rewards-based, universal, integrated code base 203 are accessible through a single top level username (which can have an associated password or other usernames related in a tree structure) across all the platforms and/or websites within or managed by the rewards-based, universal, integrated code base 203. The rewards-based, universal, integrated code base 203 further can include a data/privacy/file storage management module 236 configured, upon a specific user signing up, to provide an encrypted account on the plurality of network-based computer servers 202 to access data that the rewards-based, universal, integrated code base 203 has collected on the specific user across one or more platforms or websites, to yield collected data. The data/privacy/file storage management module 236 can enable the specific user to delete any or all of the collected data and to inform the specific user regarding an impact of deleting any or all of the collected data would have on rewards provide to the specific user for interacting with platforms or websites across the rewards-based, universal, integrated code base 203.

In another aspect, the system 200 can include a plurality of network-based computer servers 202 upon which a rewards-based, universal, integrated code base 203 operates. The system can include a communication module 229 configured to manage communication between an authorized user device 208 and the rewards-based, universal, integrated code base 203. The system 200 can also include an approved entity module 223 configured to enable rewards-based communications between the authorized user device 208 connected, via the communication module 229, to the rewards-based, universal, integrated code base 203 and an authorized third-party entity 258, 260, 262 communicating with the rewards-based, universal, integrated code base 203 and that agrees to an information and rewards exchange framework provided by the rewards-based, universal, integrated code base 203. The system 200 can also include an non-approved entity module 225 configured to manage communications between the authorized user device 208 connected to the rewards-based, universal, integrated code base 203 and an unauthorized third-party entity 254, 256 that does not agree to an information and rewards exchange framework provided by the rewards-based, universal, integrated code base 203. The system 200 can include a rewards management module 232 configured to enable rewards-based communications between the authorized user device 208 connected, via the communication module 229, to the rewards-based, universal, integrated code base 203 and an authorized third-party platform 218A-K configured within the rewards-based, universal, integrated code base 203, wherein the authorized third-party platform 218A-K agrees to an information and rewards exchange framework provided by the rewards-based, universal, integrated code base 203.

The rewards-based, universal, integrated code base 203 can be a single code base operating on the plurality of network-based computer servers 202. The rewards-based, universal, integrated code base 203 can include the authorized third-party platform 218A-K and can enable at least one or more of rewards 232, payments 250 and data sharing 236 between the authorized third-party platform 218A-K configured within the connected to the rewards-based, universal, integrated code base 203, the authorized third-party entity 258, 260, 262 connected, via the approved entity module 223 to the connected to the rewards-based, universal, integrated code base 203 and the authorized user device 208 connected, via the communication module 229, to the rewards-based, universal, integrated code base 203.

Data Management in the Rewards-Based, Universal, Integrated Code Base

Another aspect of this disclosure relates to a data/privacy/file storage management module 236 and how a unique approach to data management is possible in the rewards-based, universal, integrated code base 203. FIG. 2B illustrates a system 200 that can include a plurality of network-based computer servers 202, a rewards-based, universal, integrated code base 203 operating on the plurality of network-based computer servers 202, a data storage device 274 (which can correspond to memory 315 shown in FIG. 3) operating with the plurality of network-based computer servers 202, and a plurality of platforms 218A-K operating together on the rewards-based, universal, integrated code base 203. Each platform of the plurality of platforms 218A-K operates for a respective entity (such as a business or a user) that agrees to an information exchange framework with other platforms and users of the rewards-based, universal, integrated code base 203.

The data/privacy/file storage management module 236 manages the receipt and use of data 270, 272 stored in the data storage device 274, the data 270, 272 being, in one example, from a respective authorized user device 208 of the rewards-based, universal, integrated code base 203. The data 270, 272 can be any type of data such as files (Word files, Excel files, PowerPoint files, etc.), messages, social media posts, videos, images, audio recordings, and so forth. For example, a video recording of a Zoom video call can be stored and then made available as the data described herein. Any piece of data (data1 270, data2 272) can access at any time any other piece of data, or other platform or user. Conditions can be set by the owner of a respective piece of data. The data1 270 and data2 272 can be created by a user or by a merchant or any entity owning or operating any platform 218A-K.

In FIG. 2B, the authorized user device 208 represents all of the possible authorized user devices 204, 206, 208, 210, 212, 214, 216 in FIG. 2A. In one example, the user, via the authorized user device 208, can take a picture or video 270 of a tree 269 using a camera 268 to yield data1 270. The authorized user device 208 can be used to generate a file 270, and the file 270 can be uploaded to the data storage device 274 on the plurality of networked servers 202 as identified by their top level username or other related password or data. Because all the platforms 218A-K are integrated into the same rewards-based, universal, integrated code base 203, there is new interoperability that is possible with respect to data management.

In one example, data1 270 originates on the authorized user device 208 and can be automatically uploaded to the communication module 229 to the data storage device 274. The data storage device, computer memory and the like 274 can correspond to the memory 315 (including ROM 320 and RAM 325) of FIG. 3. The data storage device 274 operates in connection with or is integrated with the rewards-based, universal, integrated code base 203 which enables the sharing of the data1 270 with other data2 272, or with any of the platforms 218A-K. This integration means that users do not have to open or click on a platform or go to a website to "open up" a recipient environment to receive (drag and drop) an image, file or other data. For example, in a current scenario, the user might be viewing an image or a word document and desire to store that image. A drop-down menu can be accessed in which the user can "save" the document at a certain location such as in a file system or a particular folder. If the user then desires to add that file or image to an application or website, user has to open up the application and drag and drop that file from the particular folder to the destination application or website.

However, in an integrated environment 200 as disclosed herein, the user could use a drop-down menu to "save" the file or move it directly to a platform 218A-K. For example, because the user's interactions in the rewards-based, universal, integrated code base 203 are based on their top level username, a drop-down menu could be populated with options to save the file or move a copy of the file to a particular platform 218A-K associated with the user. Thus, such saving options or other actions associated with the file 270, 272 can be prepopulated in drop-down menus or in other graphical presentations based on the possible platform destinations that are associated with the user in their top level username. The interaction between any document or file managed by the data/privacy/file storage management module 236 and associated platforms/websites can be static or dynamic. A static relationship means that the user may make a change to the document or add the document to a chosen platform based on, for example, a selection in a drop-down menu. Where a document has a dynamic relationship with one or more platforms and/or websites, the user may make a change to the document or set up the document initially with the dynamic relationship such that making changes to the document, or saving the document initially, causes the document as a new document or as a changed document to promulgate automatically to all the related platforms and/or websites. A user could change a text file and those changes can automatically promulgate for example to three different platforms that present the document. The document can be an image that is replaced automatically with a new image across the dynamic group of related platforms and/or websites.

In another aspect, the rewards-based, universal, integrated code base 203 can include platforms for a document editor 276, an image/video editor 278 and a presentation editor 280. These can be comparable to existing applications for generating these different types of documents. Other editors such a spreadsheet editor, a computer aided graphical design platform, and so forth can be provided as well. Because these editors are integrated into the rewards-based, universal, integrated code base 203, users of an authorized user device 208 can access these editors and create documents that can be saved in the data storage device 274. Again, because of the integration of the various editors 276, 278, 280, into the rewards-based, universal, integrated code base 203, and because the user of these various editors accesses the system 200 using their top level username, saving options associated with created documents 270, 272 can be populated with possible destination platforms 218 A-K associated with that user. In one aspect, destination platforms can be part of a defined group as disclosed herein, can be associated with one top level username or be grouped in some other fashion.

In one example, privacy controls or file management controls might be selected by the user which can impact the possible destinations for the data 270, 272. For example, if a user places a high level of privacy on data2 272, then the possible options for accessing or sharing that data might be limited in terms of possible destinations presented in a drop-down menu. This disclosure introduces new concepts with respect to how data of any type can be moved or shared not just from one folder location to another but also across different platforms that are integrated into the rewards-based, universal, integrated code base 203.

The data/privacy/file storage management module 236 performs operations to manage and enable users to share the data in new ways. The operations performed by the data/privacy/file storage management module 236 can include storing, in a data storage memory device 274, the data 270, 272 for the respective user based on a top level username or other identification information. Data/privacy/file storage management module 236 can receive a command from the respective user to perform an action on the data 270, 272, the action being related to using the data on a respective platform 218A-K associated with the respective user and the top level username or other identification. For example, the user might upload a picture 270 which could be, for example, a new fall menu for a restaurant that is currently posting a summer menu. The command from the user might be to replace the summer menu (which can be identified by tag information or metadata associated with the image of the summer menu) with the fall menu. Various optional actions can be populated in a drop-down menu as noted above.

In one aspect, the data/privacy/file storage management module 236 provides an integration of data (any type of data) and is a repository of any data that can then be used across any platform 218A-K or any other data across the rewards-based, universal, integrated code base 203. There is no longer in this case, for example, a separate Dropbox® that stores data but that operates independently of Amazon Web Services®.

The data/privacy/file storage management module 236 then performs, based on the command and exclusively in the rewards-based, universal, integrated code base 203, the action on the data of the respective user on the respective platform 218A-K. The user might have a platform for mobile orders and a hosted website hosted via the web hosting platform 218I, as well as an approved site 258. The command to replace a picture across these various platforms can be carried out by the data/privacy/file storage management module 236 such that the user does not need to drag and drop, or open up an application, or perform some other traditional operation to activate an application or go to a website to change out an image. The command can enable the data/privacy/file storage management module 236 to swap out the pictures with the new picture in an easy fashion.

The data/privacy/file storage management module 236 can make the data available to a social media platform 218B, an email/messaging platform 218E, a media platform 218G or any other platform associated with the code base 203. For example, if a user utilizes the document editor 276, they can revise an existing text document. When the user updates the document, the user can tag the update or can perform other operations. The document might be an article that is posted on a blog platform and a news platform or other platforms as well. A drop-down menu can provide graphical options for the user to make the document and the platforms it is posted on static or dynamic. If the user makes the document and/or platforms dynamic, then the update to the document can be automatically populated across the platforms that use the article/document. The tagging of the document can be used to link the document to articles on the one or more platforms in one example. When the dynamic document is saved, the various platforms that are linked to that document or that are identified as presenting that document, are also automatically and dynamically changed as well. Updating becomes very easy in this context. Users can also promulgate new documents to one or more platforms in a similar manner. Note that this refers to the editing of a document, and having those changes promulgated to the platforms— and not to a user going, for example, to a website or a news platform and editing data already on the platform.

Users can also save documents to platforms. A document can be created or revised and a "save as" or "save to" option can present the user's platform(s) as an option of where to post or save the document or revised document. The data can also represent collected data associated with user interactions with the ecosystem 200.

The data/privacy/file storage management module 236 can perform further operations including receiving and storing tag information for the data, wherein the performing of the action occurs with reference to the tag information for the data. The tag information can include any metadata identifying, classifying, or related to the data. For example, a menu can be tagged as a "summer menu" and a new image provided to the system can be tagged as a "fall menu." Then, when the user uploads the fall menu, the command can be "replace the summer menu with the fall menu" and that replacement action can occur across the platforms where the "fall menu" might be presented as part of a user interface. The platforms might include websites hosted in the rewards-based, universal, integrated code base 203, other platforms (like applications but in the rewards-based, universal, integrated code base 203) or websites 258 hosted external to the rewards-based, universal, integrated code base 203 but that are approved third-party sites 266. Social media, YouTube-like platforms, messaging and so forth can receive or use the data that is within the system. There is no need in this scenario for the user to open up any of the platforms or access any of the web sites to achieve the replacement or updating of the menu. Data that can be promulgated across platforms via a command can include text (update current chapter 3 with the new chapter 3 of the book), video (replace the May $30^{th}$ newscast with the June $1^{st}$ newscast), or other data.

Thus, the data of the respective user can include a picture or a video and performing the action can include replacing the data on a platform or adding the picture or the video (or other data) to the respective platform in the first instance.

Performing, based on the command and exclusively in the rewards-based, universal, integrated code base 203, the action on the data of the respective user on the respective platform further can include moving the data from the data storage memory device 274 to the respective platform without downloading the data from data storage memory device 274 of the rewards-based, universal, integrated code base 203 to a device 204, 206, 208, 210, 212, 214, 216 external to the rewards-based, universal, integrated code base 203. Once the data is stored in the data storage memory device 274 of the system 200, it does not need to be downloaded or uploaded to a different device.

In another aspect, performing, based on the command and exclusively in the rewards-based, universal, integrated code base 203, the action on the data of the respective user on the respective platform further can include moving the data from the data storage memory device 274 to the respective platform without the respective user manually opening or accessing the respective platform. In other words, the user does not have to open a platform or access a website to drag and drop an image or video or other data. The user does not have to open up a social media platform or application, or messaging/emailing application or platform and drop the image or video into a social media post or a message. The user can provide a command directly and attach the data to a social media posting or message/text/email. The interconnectivity of the various platforms and authorized sites enables a data management capability not currently possible in the Internet or an app store context.

In one aspect, the command can cause a file or posting to occur on one or more platforms at once. A company for example, may have several platforms or sites within the rewards-based, universal, integrated code base 203. A file such as an image might need to be updated across the platforms. One command can post the file across all the platforms at once thus making the process more streamlined.

In another aspect, performing, based on the command and exclusively in the rewards-based, universal, integrated code base 203, the action on the data of the respective user on the respective platform further can include moving the data from the data storage memory device 274 to the respective platform without the respective user entering a universal resource locator into a browser (such as on their user device 208) to access the respective platform or interacting with a graphical icon to activate the respective platform.

In yet another aspect, performing, based on the command and exclusively in the rewards-based, universal, integrated code base 203, the action on the data of the respective user on the respective platform further can include utilizing tag information associated with the data to move the data from the data storage memory device 274 to the respective platform without the respective user entering a universal resource locator into a browser to access the respective platform or interacting with a graphical icon to activate or identify the respective platform. In this case, the platform can also cover an "app" integrated into the rewards-based, universal, integrated code base 203, a website hosted on the rewards-based, universal, integrated code base 203 and/or an external third-party site 258, 260, 262 that is authorized 266.

In another aspect, performing, based on the command and exclusively in the rewards-based, universal, integrated code base 203, the action on the data of the respective user on the respective platform further can include moving the data from the data storage memory device 274 to the respective platform, social media post, message/text/email, without the respective user performing any action to identify, open or activate the respective platform in order to perform the action.

In yet another aspect, performing, based on the command and exclusively in the rewards-based, universal, integrated code base 203, the action on the data of the respective user on the respective platform further can include replacing current data in the respective platform with the data of the respective user to yield new data in the respective platform.

In another aspect, receiving a command from the respective user further can include receiving the command from an authorized user device 208 external to the plurality of network-based computer servers 202 operating the rewards-based, universal, integrated code base 203. The authorized user device 208 is granted access to the rewards-based, universal, integrated code base 203 for the respective user to manage the data and the respective platform or platforms. The authorized user device 208 receives a user interface from the system 200 and the authorized user device 208 does not download applications or the data of the respective user when interacting with the rewards-based, universal, integrated code base 203. The respective user will provide the data to the system via the authorized user device 208 and according to the top level username or some other identifying data.

The respective user has in one example multiple platforms operating on the rewards-based, universal, integrated code base 203. In this case, the respective user and the multiple platforms are each associated with the top level username and the action performed on data of the respective user is performed on any one or more of the multiple platforms operating on the rewards-based, universal, integrated code base 203 via the command and without the respective user opening or activating any of the multiple platforms.

Figure 6A:
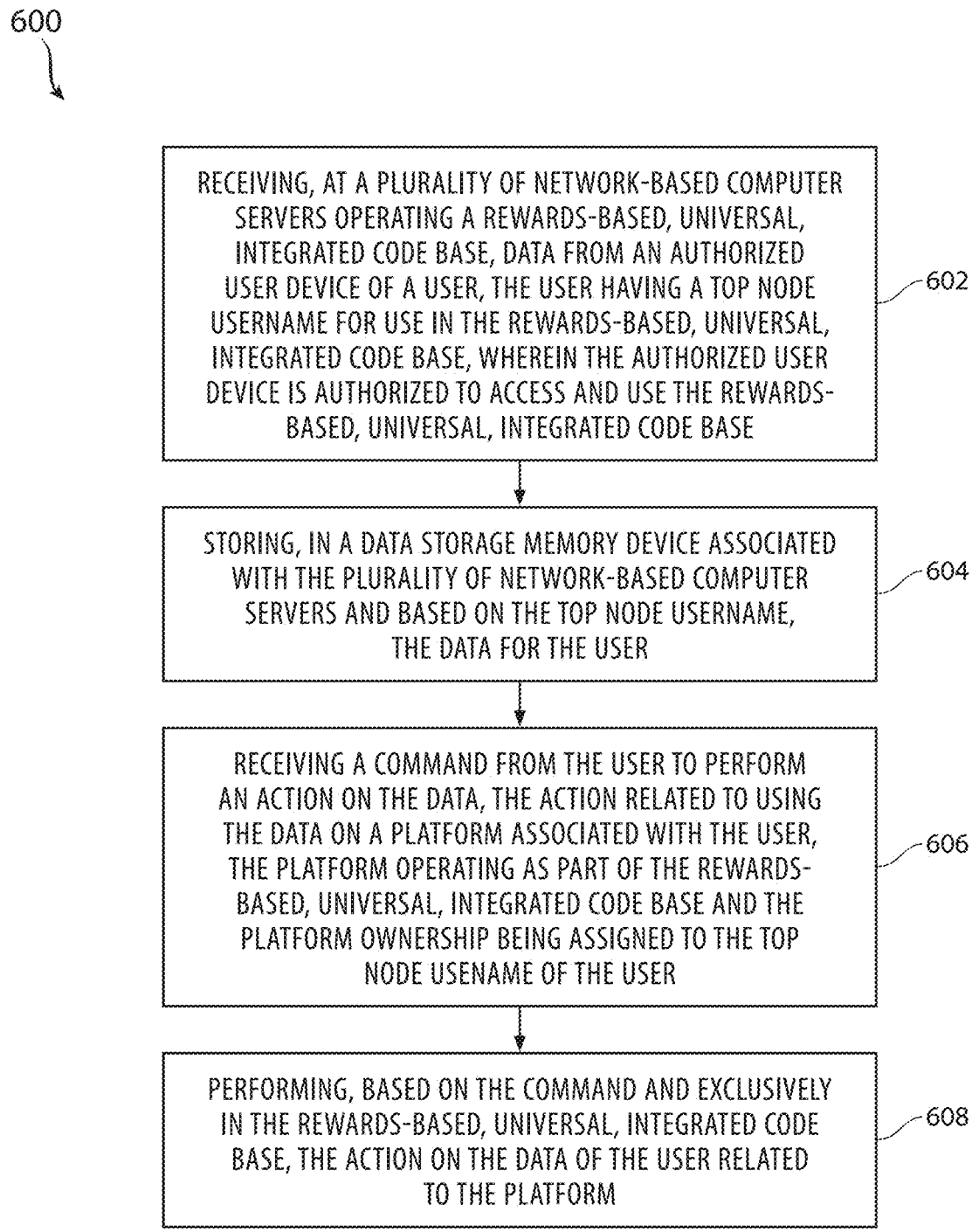
FIG. 6A illustrates another method embodiment related to data management.

FIG. 6A illustrates a method 600 embodiment related to data management in the rewards-based, universal, integrated code base 203. An example method 600 can include receiving, at a plurality of network-based computer servers operating a rewards-based, universal, integrated code base 203, data from an authorized user device of a user, the user having a top level username for use in the rewards-based, universal, integrated code base 203, wherein the authorized user device is authorized to access and use the rewards-based, universal, integrated code base 203 (602). The method can include storing, in a data storage memory device associated with the plurality of network-based computer servers and based on the top level username, the data for the user (604), receiving a command from the user to perform an action on the data, the action related to using the data on a platform associated with the user, the platform operating as part of the rewards-based, universal, integrated code base 203 and the platform ownership being assigned to the top level username of the user (606) and performing, based on the command and exclusively in the rewards-based, universal, integrated code base 203, the action on the data of the user related to the platform (608).

The plurality of platforms operate together on the rewards-based, universal, integrated code base 203 and each platform of the plurality of platforms operate for a respective entity that agrees to an information exchange framework with other platforms and users of the rewards-based, universal, integrated code base 203. Note that not every device can simply gain access to the system 200. An unauthorized user device 110, 112, 114 is not granted access to the rewards-based, universal, integrated code base 203. Such an unauthorized device will not have a proper code, the proper hardware component 350, token, top level username, password or other characteristic that is recognized by the communication module 229 to grant access to the rewards-based, universal, integrated code base 203.

Part of the platform agreement to join the rewards-based, universal, integrated code base 203 can include an agreement that a certain percentage of a sale is paid to the entity operating the rewards-based, universal, integrated code base 203. For example, the percentage of a sale could be 10% of each sale. If a merchant platform sells a pair of shoes for $100, then the merchant 224, 226 will receive $90 and $10 is reserved or paid to the entity operating the rewards-based, universal, integrated code base 203 which can then be divided up for example with a portion of the $10 being provided to the purchasing user as a reward (rebate) which can be redeemed or spent with merchants or platforms associated with the rewards-based, universal, integrated code base 203. Another portion of the $10 can be used to operate the rewards-based, universal, integrated code base 203 and another portion could be provided to a charity or other entity as well. Another portion could be provided to the user of the rewards-based, universal, integrated code base 203 who referred the purchaser (user) to the rewards-based, universal, integrated code base 203.

The plurality of platforms 218A-K can include respective platforms and each respective platform provides one or more of social media processes, video usage, image usage, merchant sales, messaging, map usage, website access, payments, camera usage, microphone usage and sensor usage. Other functionality can of course be included because platforms are generally comparable generally to applications downloadable on devices. Any function in an application can be converted to a platform and integrated into the rewards-based, universal, integrated code base 203. Any application or the functionality of such an application can be incorporated into a platform and integrated into the rewards-based, universal, integrated code base 203 to provide the improved rewards-based interactive ability provided by the application being converted into a "platform" operating in the rewards-based, universal, integrated code base 203.

The method can further include receiving and storing tag information for the data, wherein the performing of the action occurs with reference to the tag information for the data. The data of the user can include any type of data such as a picture or a video. The method can include performing the action that can include adding the picture or the video (or other data) to the platform of the user. The data, where permitted, can also be added to, switched in, or deleted from any other platform if a user has authorization to control data or make data changes in connection with any platform 218A-K.

Performing, based on the command and exclusively in the rewards-based, universal, integrated code base 203, the action on the data of the user on the platform further can include moving the data from the data storage memory device 274 to the platform without downloading the data from data storage memory device of the rewards-based, universal, integrated code base 203 to the authorized user device which is external to the rewards-based, universal, integrated code base 203.

The moving or management of data in the rewards-based, universal, integrated code base 203 is thus different in practice from the traditional downloading and uploading of data or images to apps or web sites.

In one aspect, images or video (or other data such as a file) taken on a mobile authorized user device 208 or any other user device can be automatically uploaded to the rewards-based, universal, integrated code base 203 and thus ready for additional instructions or commands to operate on the data. In another aspect, documents, usable by such as applications as Microsoft® Word®, Excel®, or PowerPoint®, or any other document created on any user device 204, 206, 208, 210, 212, 214, 216 can be processed in a new way. While, in some cases, a local copy of a file, data or document might reside on the authorized user device 208, a copy can also automatically be provided to the rewards-based, universal, integrated code base 203 in preparation for any action that the user might desire to take on the data with respect to moving the data to a platform or site. Data synchronization can occur between the user making changes to data on the local authorized user device 208 and a copy of the data stored in the rewards-based, universal, integrated code base 203. The data never leaves or can always reside within the memory 315, 274 associated with the servers 202 operating the rewards-based, universal, integrated code base 203. The data can always be available, as managed by a privacy management module 236, to the various platforms and users.

Figure 6B:
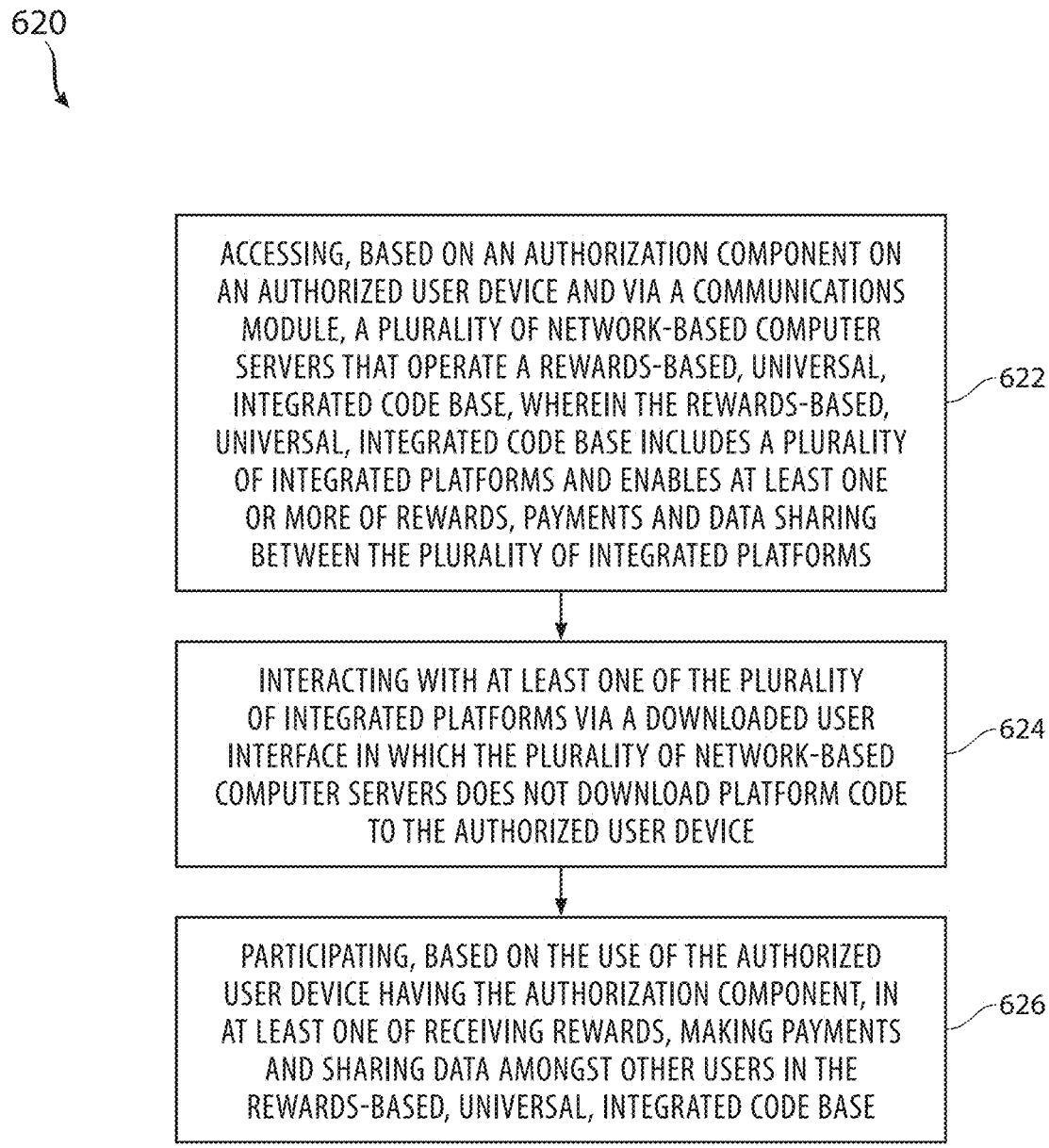
FIG. 6B illustrates another method embodiment related to operations performed by an authorized user device.

FIG. 6B illustrates a method 620 that is performed from the standpoint of the authorized user device 204, 206, 208, 210, 212, 214, 216. The method can include accessing, based on an authorization component on an authorized user device 208 and via a communications module 229, a plurality of network-based computer servers 202 that operate a rewards-based, universal, integrated code base 203, wherein the rewards-based, universal, integrated code base 203 includes a plurality of integrated platforms 218A-K and enables at least one or more of rewards, payments and data sharing between the plurality of integrated platforms 218A-K (622), interacting with at least one of the plurality of integrated platforms 218A-K via a downloaded user interface in which the plurality of network-based computer servers 202 does not download application or platform code to the authorized user device 208 (624) and participating, based on the use of the authorized user device 208 having the authorization component 350, in at least one of receiving rewards, making payments and sharing data amongst other users in the rewards-based, universal, integrated code base 203 (626).

Privacy Management Module

The concept focused on in this case is the operations of the data/privacy/file storage management module 236. As noted above, this case primarily focuses on how users can manage their privacy in a scenario where their image is taken on a user device without their authorization. In many cases, while users are out in public or in any location, the user can be in the foreground or background of an image taken by someone they do not know using the other person's user device 208 which can be a camera or a mobile phone having a camera.

The following discussion introduces a novel approach to enabling a user to protect their privacy in such a scenario. The concepts related to managing privacy can be implemented in a traditional Internet scenario or via the use of applications are downloaded on user devices. Thus, although the rewards-based, universal, integrated code base 203 is a major part of the present disclosure, this concept of blurring out images is not dependent in the broadest sense on platforms operating within the rewards-based, universal, integrated code base 203. A network-based server can coordinate with the various applications downloaded on user devices or via a browser. The network-based service can be used to identify and make decisions regarding when a user's image should be blurred in the context of a picture taken by a device. The rewards-based, universal, integrated code base 203 does provide a natural integrated approach with respect to authorizing user devices 208 that are enabled to interact with the rewards-based, universal, integrated code base 203. Thus, another aspect of this disclosure is the concept of implementing a blurring approach via the data/privacy/file storage management module 236 in the context of both the authorized user device 208 taking the picture and the person who is in the picture having another second authorized user device 208 are both participants in the rewards-based, universal, integrated code base 203.

Figure 7A:
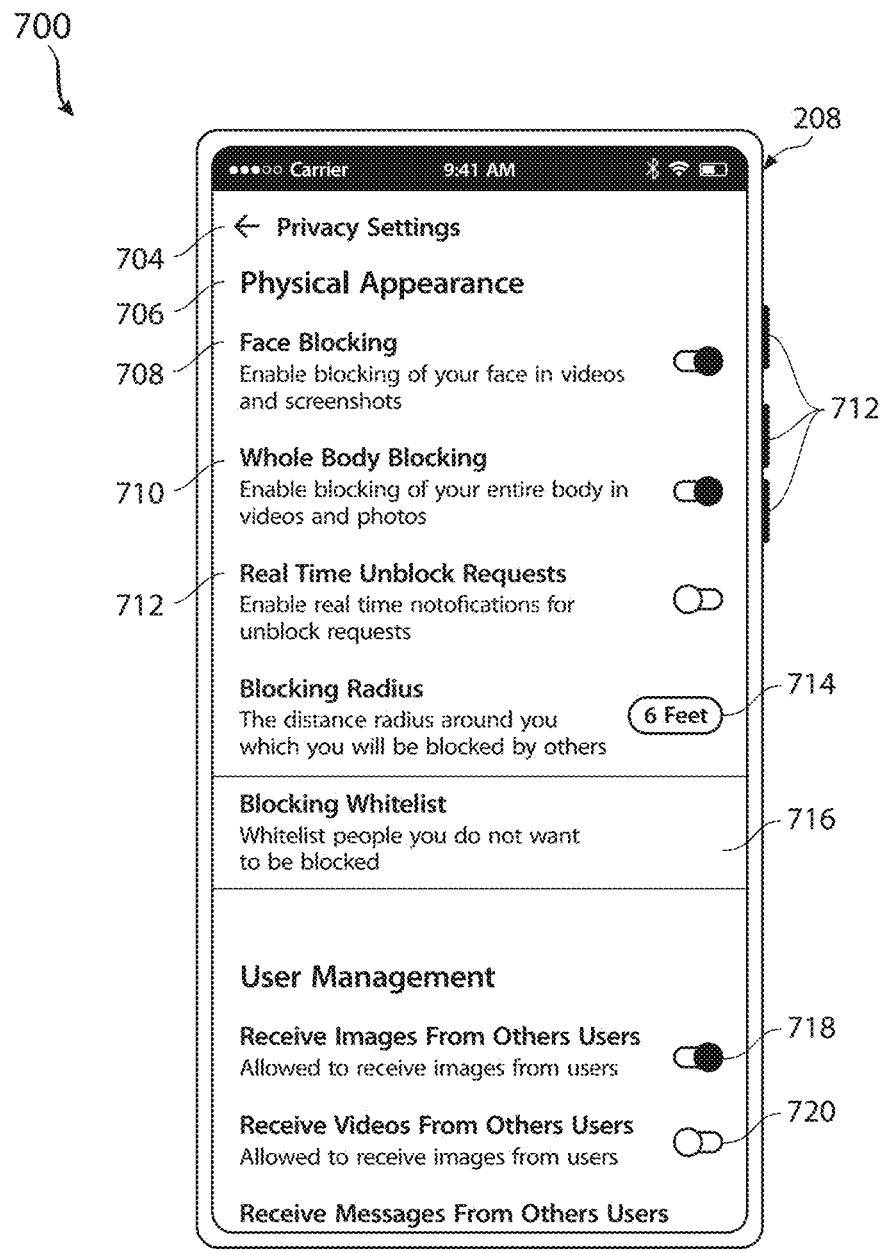
FIGS. 7A-7D illustrate user interfaces for users selecting privacy settings.

FIGS. 7A D illustrate various user interfaces 700 that are operational on a user device 208. FIG. 7A illustrates the options with respect to a series of privacy settings 704 including the option to manage the physical appearance 706 of the user. Buttons 702 are presented on the user device 208 (which can be authorized for use in the rewards-based, universal, integrated code base 203 or not) for performing various functions some of which can include interactions for performing privacy settings. For example, the user can select face blocking 708 as a privacy option. In this scenario, if the system determined that the user's face is in an image taken by another user device, then the user's face can be blurred or blocked in that image when this setting is turned on. The user could also select whole body blocking 710 in which not just their face, but the user's entire body might be blocked or blurred. In one aspect, an analysis of an image can be performed by the data/privacy/file storage management module 236 or some other network-based server or locally on a user device to determine and identify the base area or the entire body of the user who has the privacy setting the blurred out there image. If the settings are set or turned on, then the system, after identifying the user face and/or body, can cause a blurring to occur in connection with the face or the body. A server could sends an instruction to a local user device 208 with an indication of the regions of the image to be blurred or the server might be transmitting via a user interface the image and simply cause the image to be blurred at the server level such that the user on the respective user device 208 sees a blurred image.

Proximity sensors on mobile devices or stationary devices can also be used to obtain data about relative positions of mobile devices which can also be used as a basis for blurring decisions. GPS or location-based data can be used as well. Any technology that might be implemented to determine a more exact location of a mobile device, and thus its location relative to another mobile device, can be implemented. For example, if the proximity between two devices is determined to be below a threshold value (such as 30 feet), then the blurring function can be implemented for a user of a device that is in a picture taken by another user of another device.

In another aspect, the user may select a degree of blurring such that a slight degree of blurring is used where the viewer of the image could see for example clothing color or hair color of the person. A larger amount or degree of blurring could cover the person's face or body more completely and reveal less information.

FIG. 7A further illustrates the option to receive a real-time unblock request 712. In this regard, some of the privacy settings that are available include the option to receive real-time unblock requests or to receive the unblock request at a later time relative to when the other user device 208 actually took the picture. Users can manage when they receive unblock requests associated with their own image. Other options include identifying a blocking radius 714 in which users can determine a radius around which their image which should be blocked. In other words, if the user is within 6 feet of the device taking a picture, then their image should be blocked. In this regard, users can allow the image to be taken and not blocked if they are a further distance away. A blocking white list 716 can be established in which friends or family on the white list would be authorized to take a picture and no unblock request needs to be sent. Users can authorize the unblocking of their image on devices owned by the people on their white list.

Other options related to privacy management include an option to receive images from other users 718 and receive videos from other users 720. These options can enable the user to see the image or video from other users (i.e., taken on other user devices) that might have the person's image within the picture or video. In this regard, these options might enable the user to preview pictures or videos with their image contained therein and then authorize a blurring or a blurring of their image. This can be done also via a graphical touch sensitive user interface in which the user clicks on their own image to produce a menu or selectable object in which they can authorize the unblurring of their face or body.

Figure 7B:
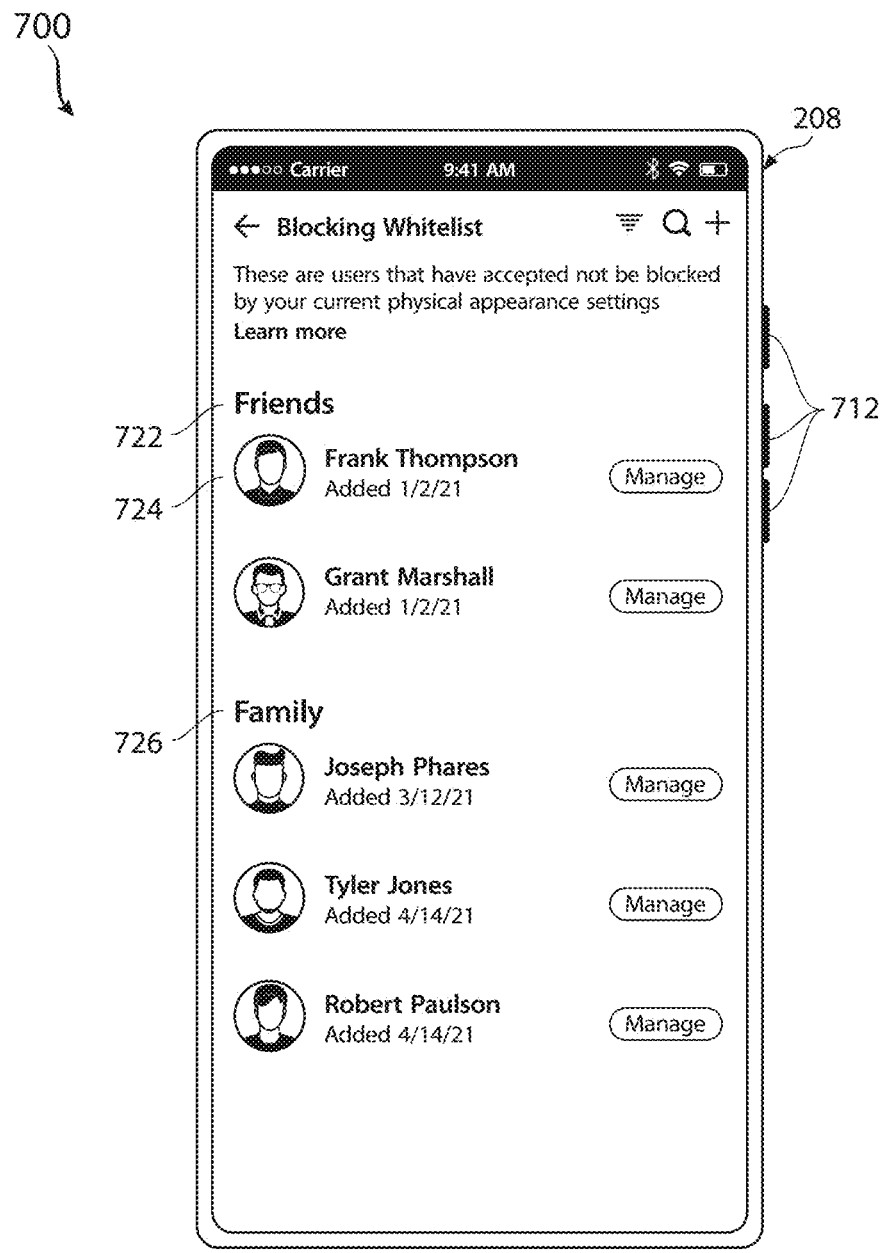

FIG. 7B illustrates a user interface 700 in which the user selected the blocking whitelist option 714. In this user interface 700, friends 722 can be listed which includes an example friend named Frank Thompson 724. Family members 726 can also be listed. Assume in this case that the user selected Frank Thompson 724 for further management of the privacy settings for that person.

Figure 7C:
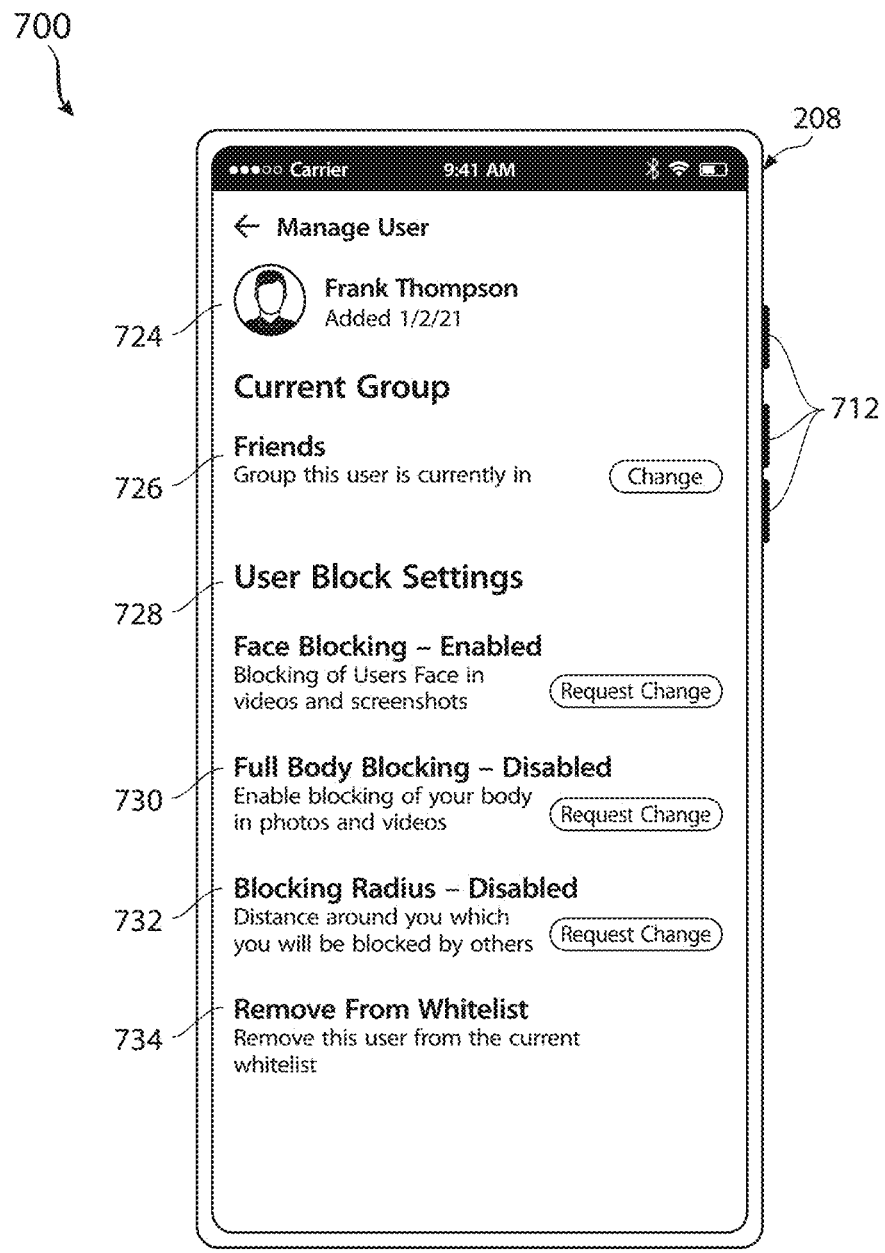
Figure 7D:
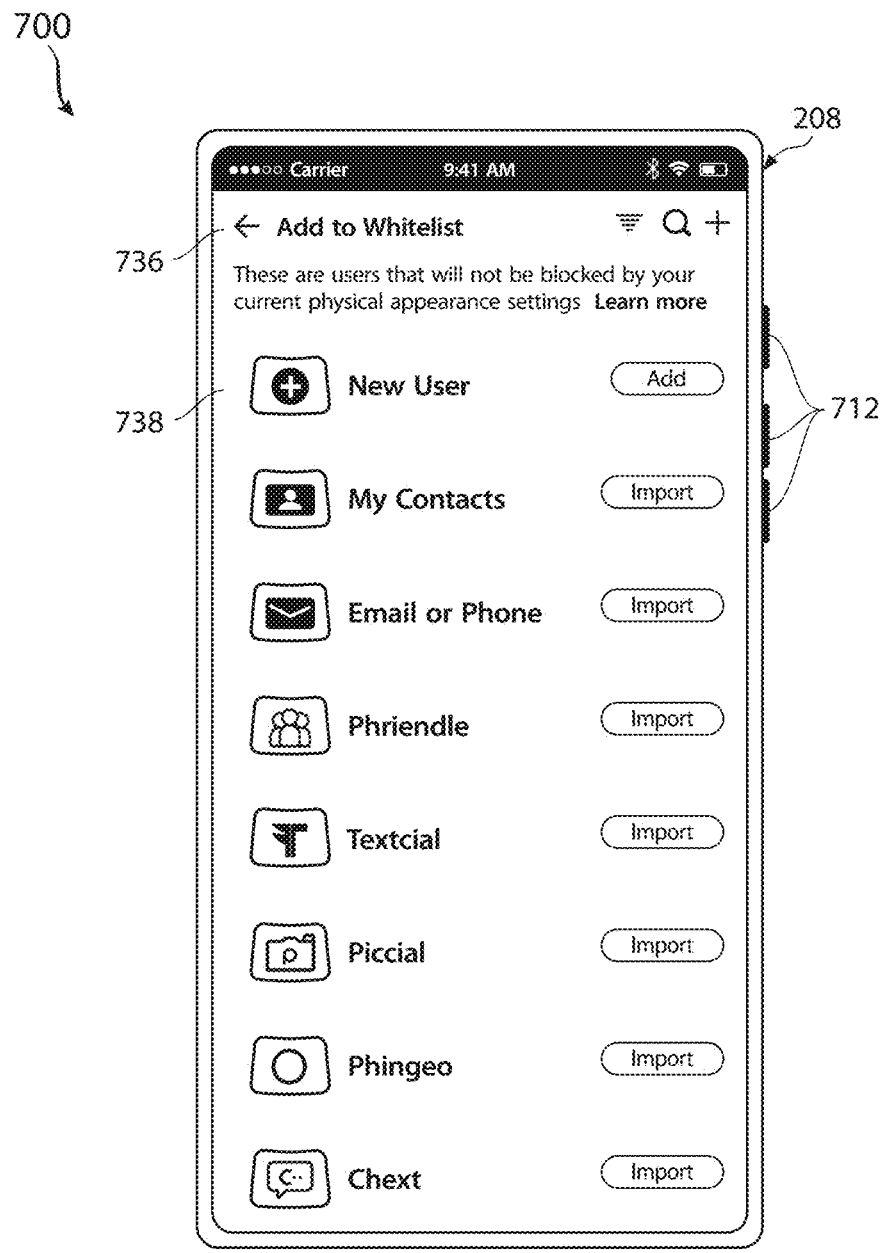

FIG. 7C illustrates a user interface 700 which enables the user to manage the privacy settings for Frank Thompson 724. The user can identify a current group of friends 726 that the subject friend Frank Thompson 724 is associated with. The user can establish blocking settings 728 which can include information about whether full body blocking is enabled or disabled 730, whether a blocking radius is enabled or disabled 732 and whether the user should be removed from the whitelist 734. These options are examples of how granular the privacy settings can become with respect to even a particular user that may or may not be a friend of the user establishing the privacy settings. FIG. 7D illustrates a user interface 700 which is presented when the user selects the "add to whitelist" option 736. In this regard, when the user desires to add other users to their white list, the user interface 700 can be presented to allow the user to add a new user, import users from their contacts list, import an email or a phone number, import data from other platforms or applications which may or may not be part of the rewards-based, universal, integrated code base 203. In this regard, users can interact with other applications or platforms to generate the white list.

FIGS. 8A-8E illustrate a user interface 800 which can operate on a user device 208. Physical buttons 802 can be presented or used as well for performing some of the operations disclosed herein. A picture 804 is presented which includes a number of individuals including a particular individual 806 with his face blurred. As noted herein, this blurring can occur based on an instruction from a server to the user device 208 with an identification of the portion of the image to be blurred. In one aspect, the image itself is blurred in another aspect, an overlay is provided over the image that can blur the identified portion of the image. Such an overlay can then be removed at a later time.

Figure 8A:
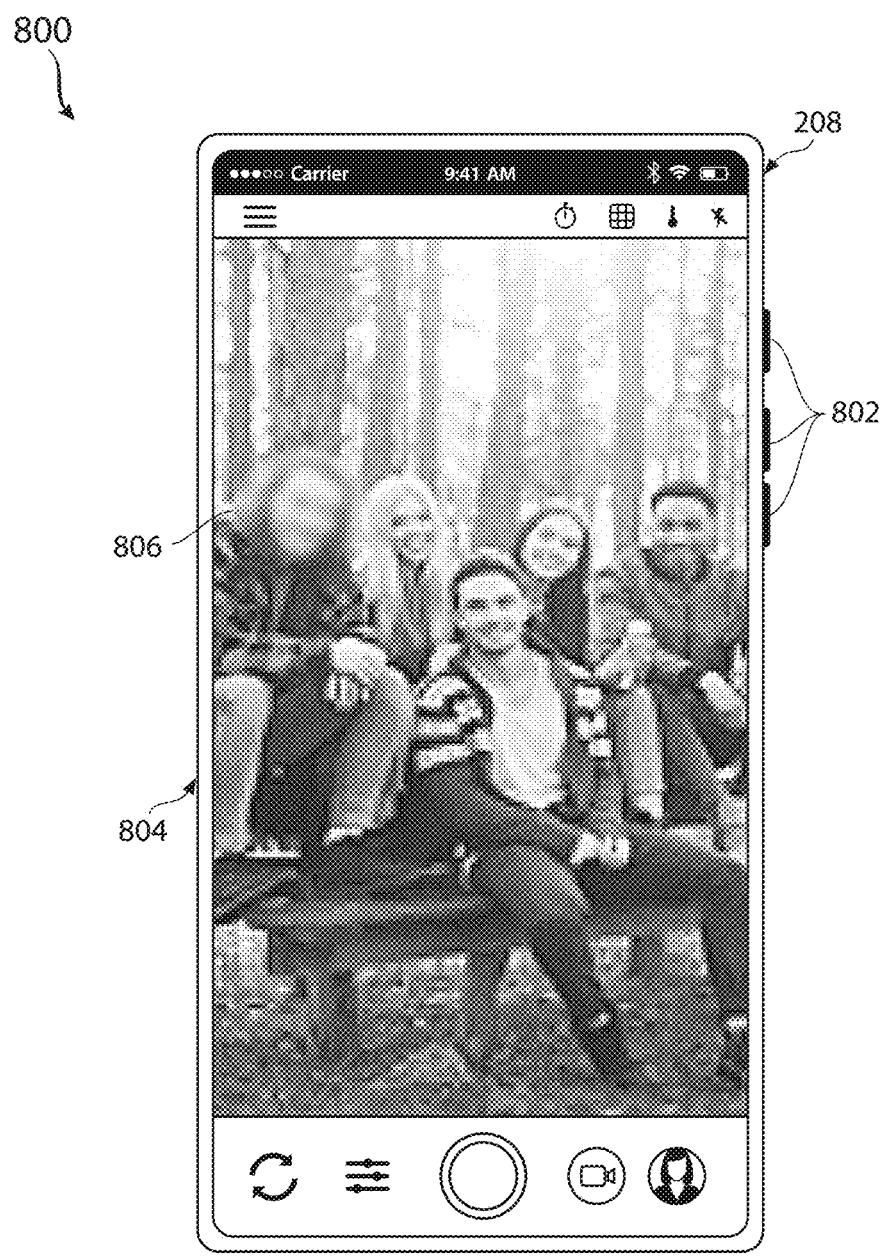
FIGS. 8A-E illustrate example images where a user's face is blurred and then authorized to be unblurred.
Figure 8B:
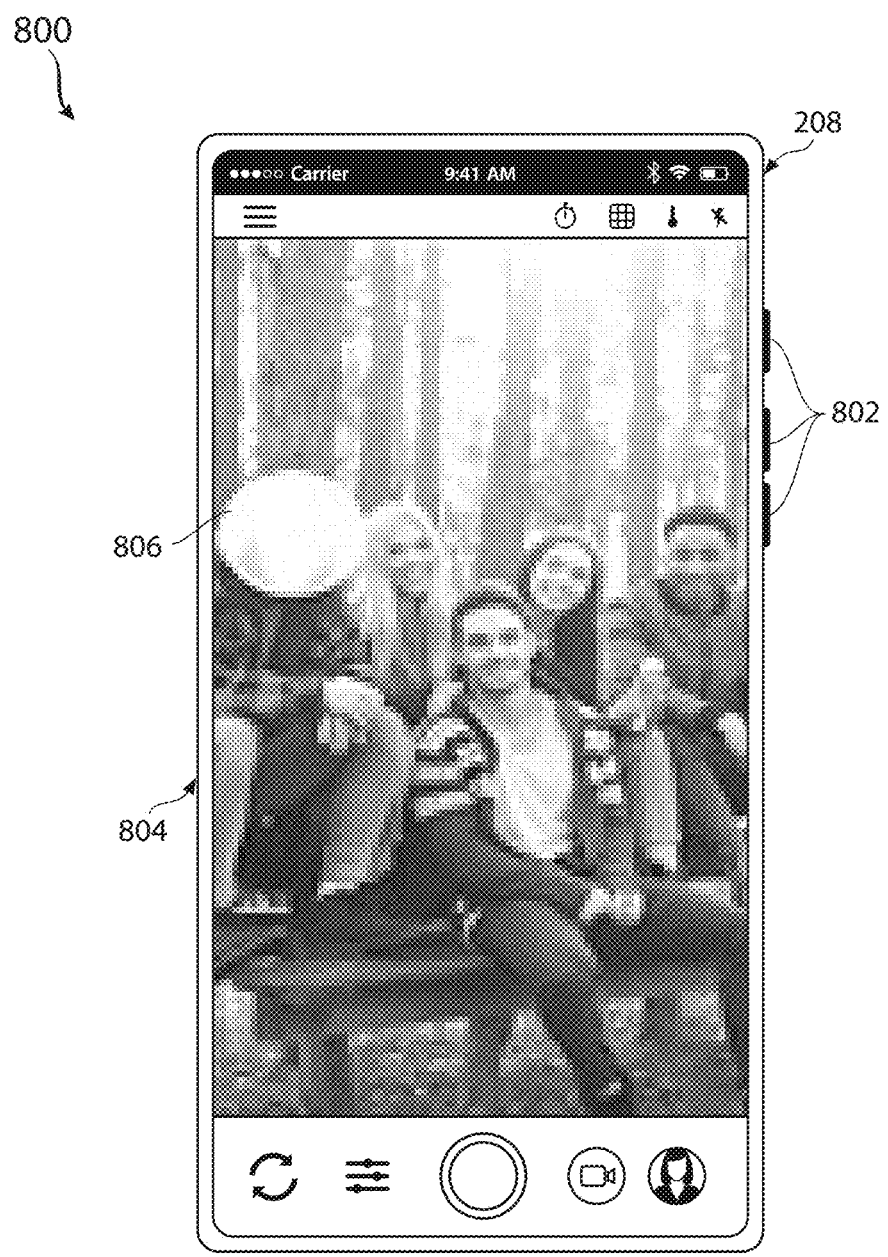
Figure 8C:
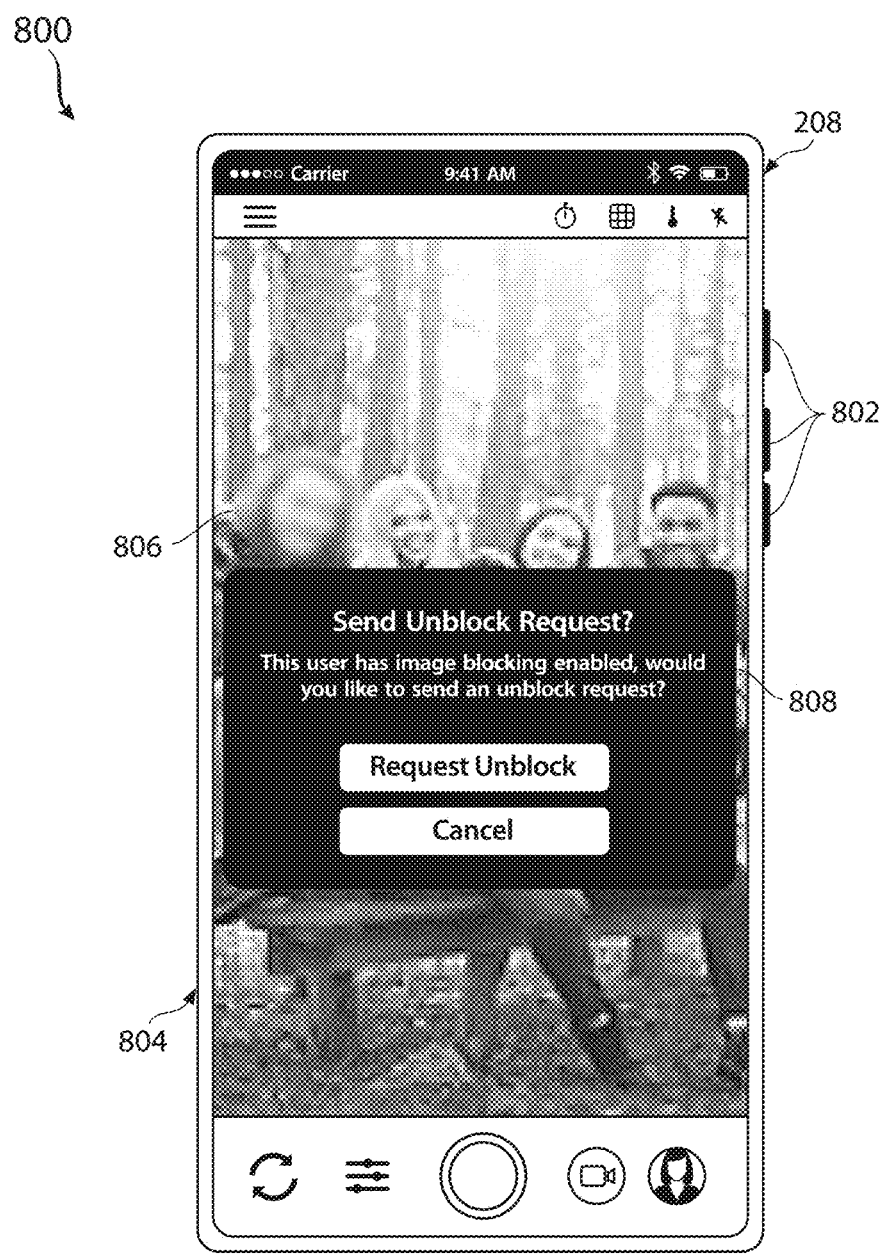

FIG. 8B illustrates an identification of the particular user 806 with a highlighting of his face which is currently blurred. FIG. 8C illustrates a selectable object 808 which can be presented on the user interface 800 on the user device 208 of the person who took the picture 804. The selectable object 808 could be related to a manual interaction in which the user is asked whether they should send an unblock request associated with the particular person 806. The user can manually select to request the unblock or to cancel and thus maintain the blocking. While the unblock request can be manual as shown in this figure, the unblock request can also be established to be sent automatically as picture 804 may include many individuals who have their face or body blurred. The system may identify when a blurred image is provided in a picture and then automatically send unblock requests to the identified individuals. Typically, the blurred images are people known to the system and thus the system has the contact information of the blocked people to make the request to unblock possible to send automatically.

In one aspect, the user may want to manually send unblock requests and the system might present in series, or in a certain order in time, a highlight of a respective person as shown in FIG. 8B and then request whether an unblock request should be sent to that user's device. The system may then step through each blurred user, asking for a separate unblock request to be sent for each respective user. In another aspect, the system may send out automatically a group of unblock request associated with the picture 804.

Thus, while five individuals are shown in the picture 804, the system can automatically send unblock request for any one or more of the individuals in the picture 804 whose faces are blurred. Users can also have priority settings in which people who are famous or who make money off of their likeness are treated differently than the average person.

Figure 8D:
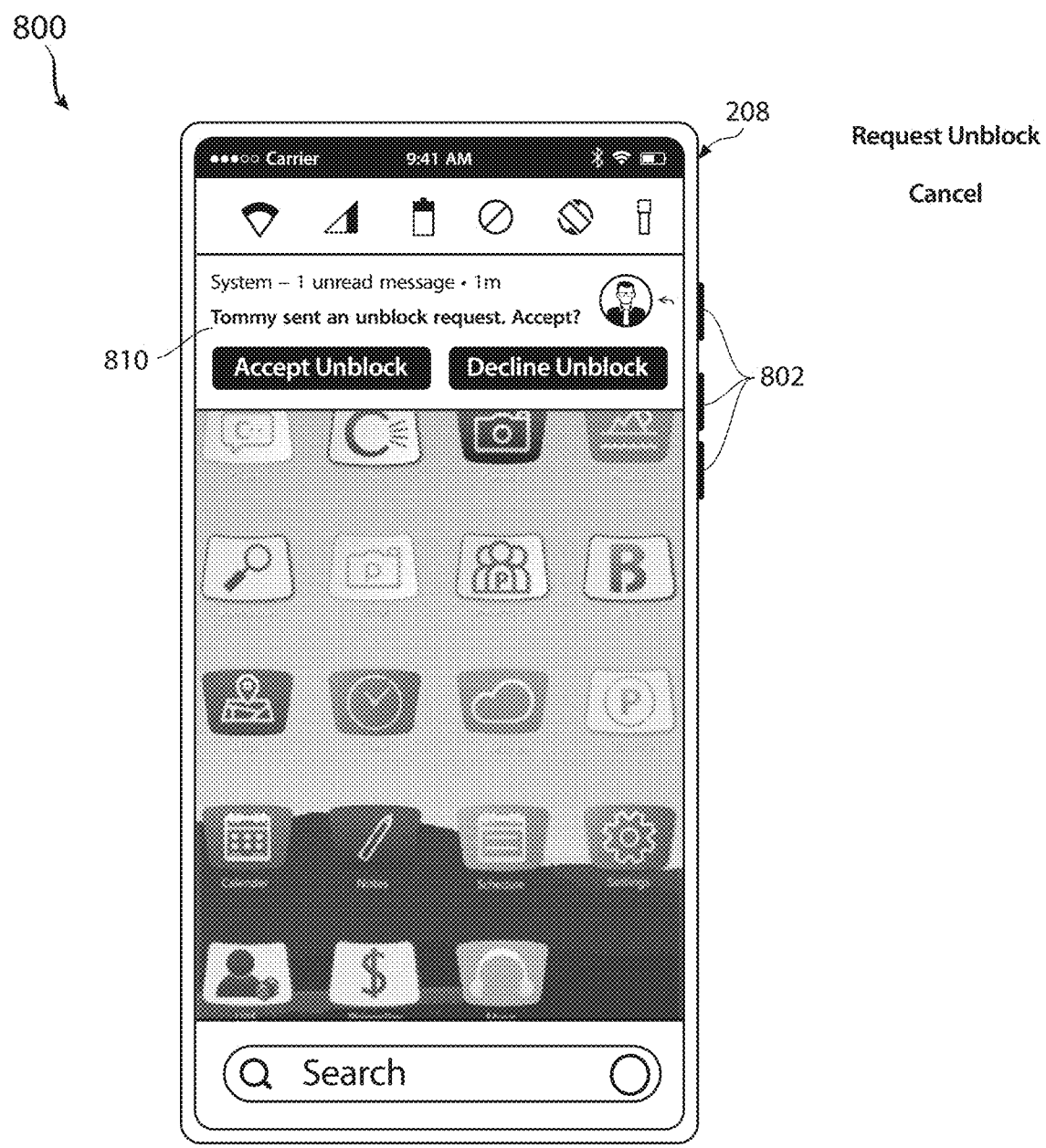
Figure 8E:
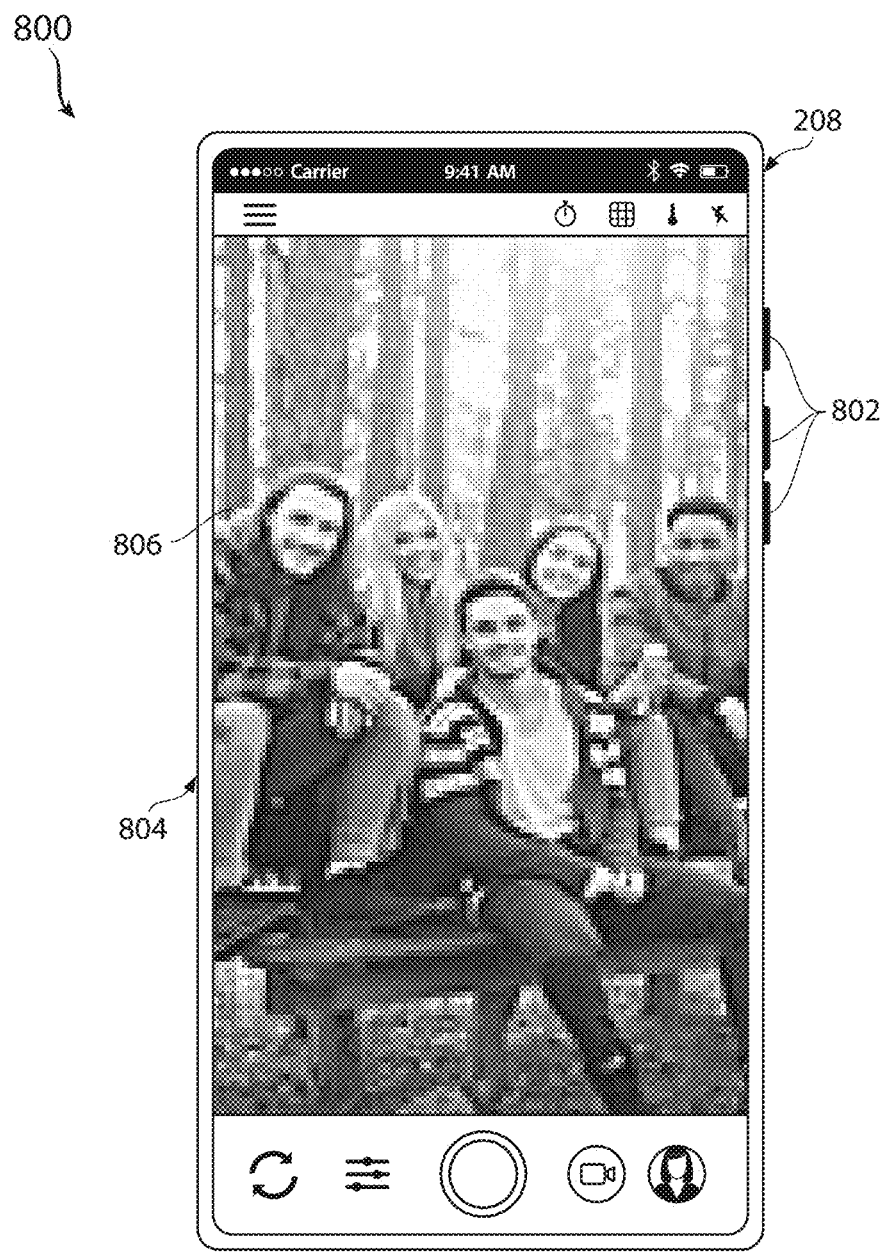

FIG. 8D illustrates a user interface 812 of the respective user 806 who receives a request to unblock their image. Request 810 is presented on the user interface 800 and the user can accept the unblock request or decline the unblock request. When the user accepts the unblock request, the picture 804 will be caused to unblur the respective user's image 806. This can be done by removing an overlay of a blurring object over the person's face or body or may modify the underlying image and return it back to the original state or to the state which includes the details of the person's face or body. In FIG. 8E, assume that the user accepted the unblock request 810 and the respective user 806 is shown in the picture 804 as having their face unblurred. Note too that the user 806 could at a later time request their face to be blurred after approved the unblurring of their face. In this case, the user who took the picture 804 might, at a later time and after having seen the respective person's face unblurred, see the picture 804 and recognize that the respective person's face 806 is now blurred.

Figure 9A:
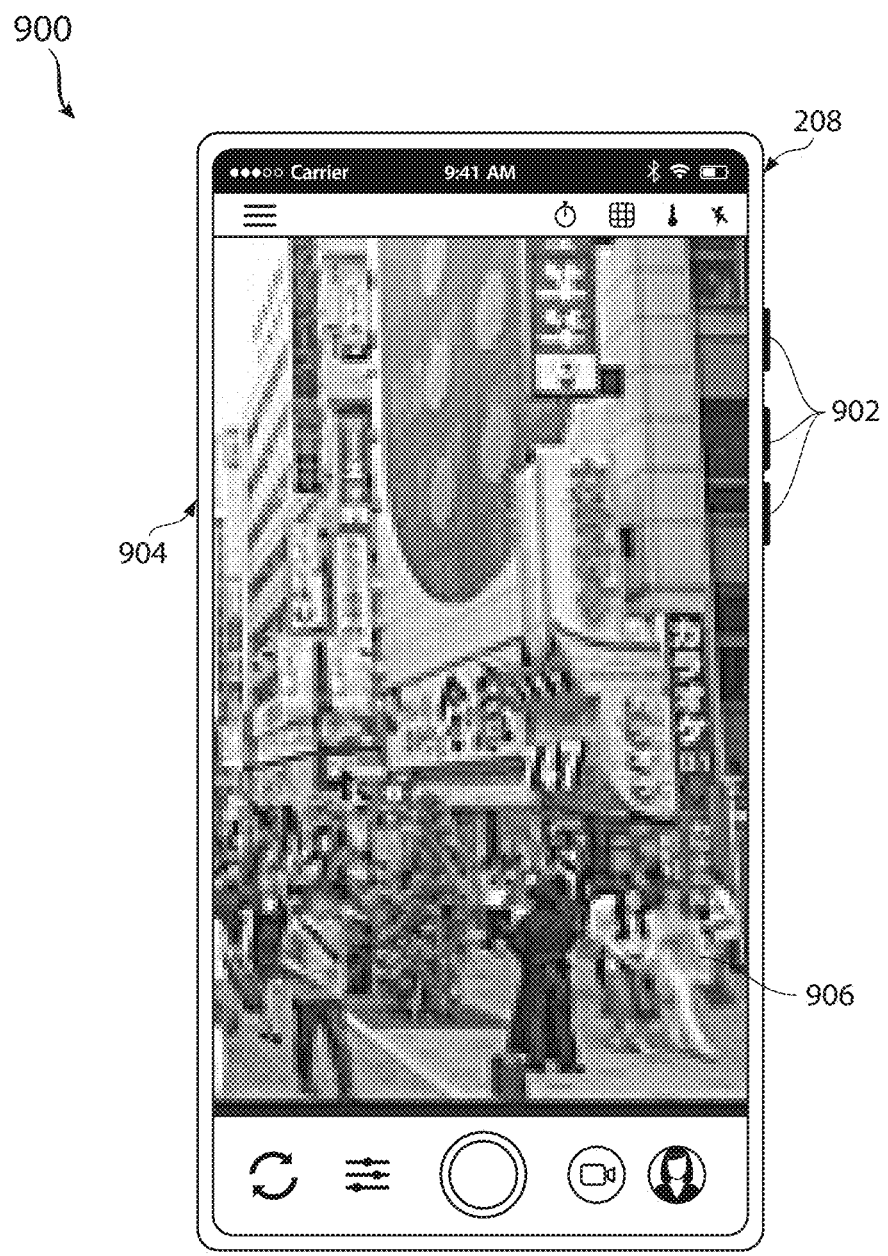
FIG. 9A-D illustrate an example set of images where a body of a user is blurred and then unblurred.

FIG. 9A illustrates a user interface 900 in which the user is taking a video 904 having a respective user 906 that is shown in the video 904. Buttons 902 on the user device 208 can be used to cause actions to be performed on the user device 208. Assume in this case of the user 906 has their user profile data sets to block out or to blur their entire body if it ends up in a picture taken by another user device. Thus, in this case, the user's entire body is blurred out.

Figure 9B:
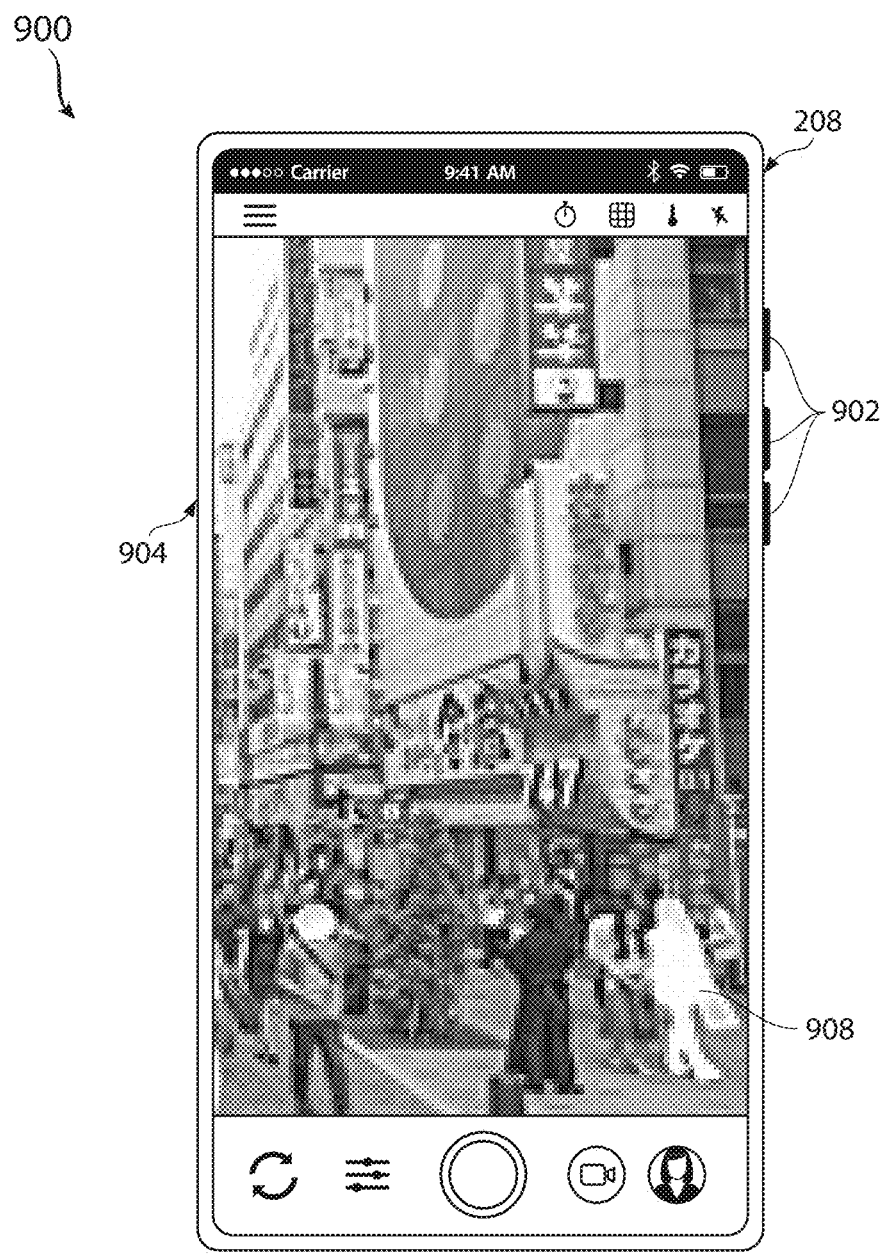
Figure 9C:
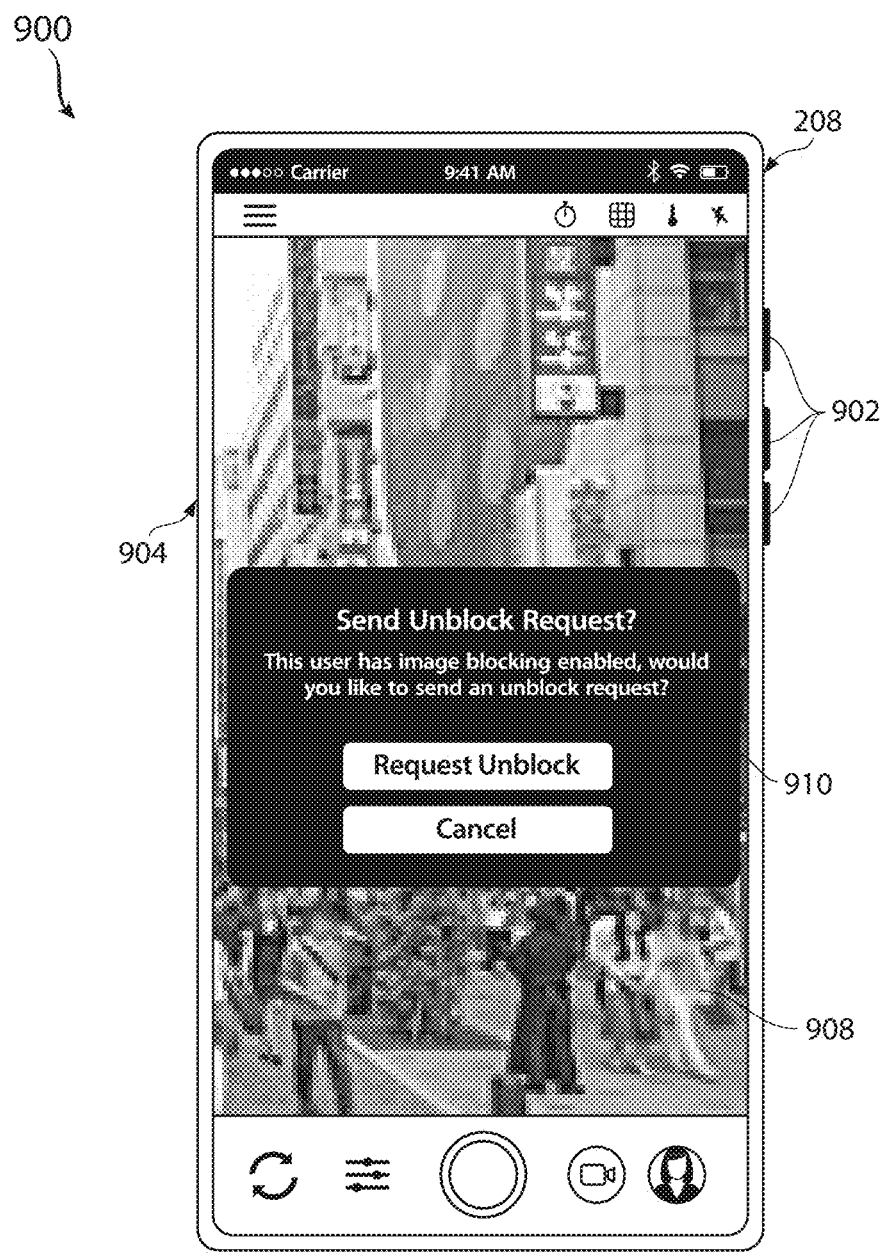
Figure 9D:
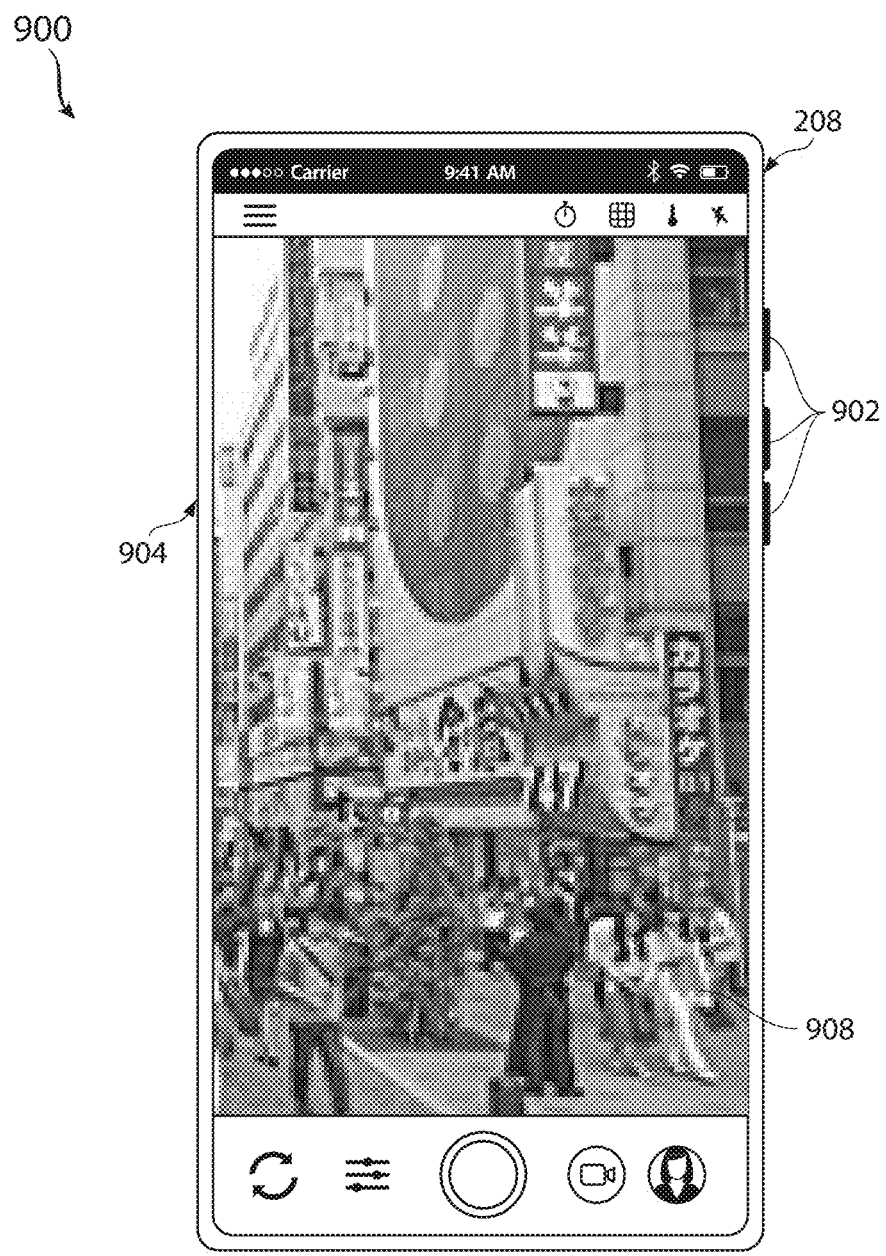

In FIG. 9B, the user's body 908 is highlighted. The highlighting can indicate to the user taking the picture that this is the particular person that will receive an unblock request. FIG. 9C illustrates a send unblock request 910 in which the user can request the unblocking of the particular user 908 or to cancel the request. FIG. 9D illustrates a user interface 900 in which the video 904 has been changed such that the particular user 908 is no longer blurred because they accepted the unblock request in a similar manner as shown in FIG. 8D.

In another aspect, a user who receives an unblock request could cause a replacement image or face to be put in the picture or video in place of theirs. In this case, a generic image, computer-generated image, famous person image, or any other image selected might be chosen. The user might also simply de-identify themselves in the image by changing their own image such that they cannot be recognized. Thus, facial features like hair color, body shape, or eye or nose shape might be altered so that the person who took the picture still sees a person in the background or foreground but the person cannot be used to identify the actual person in the picture as their image has been altered.

Figure 10:
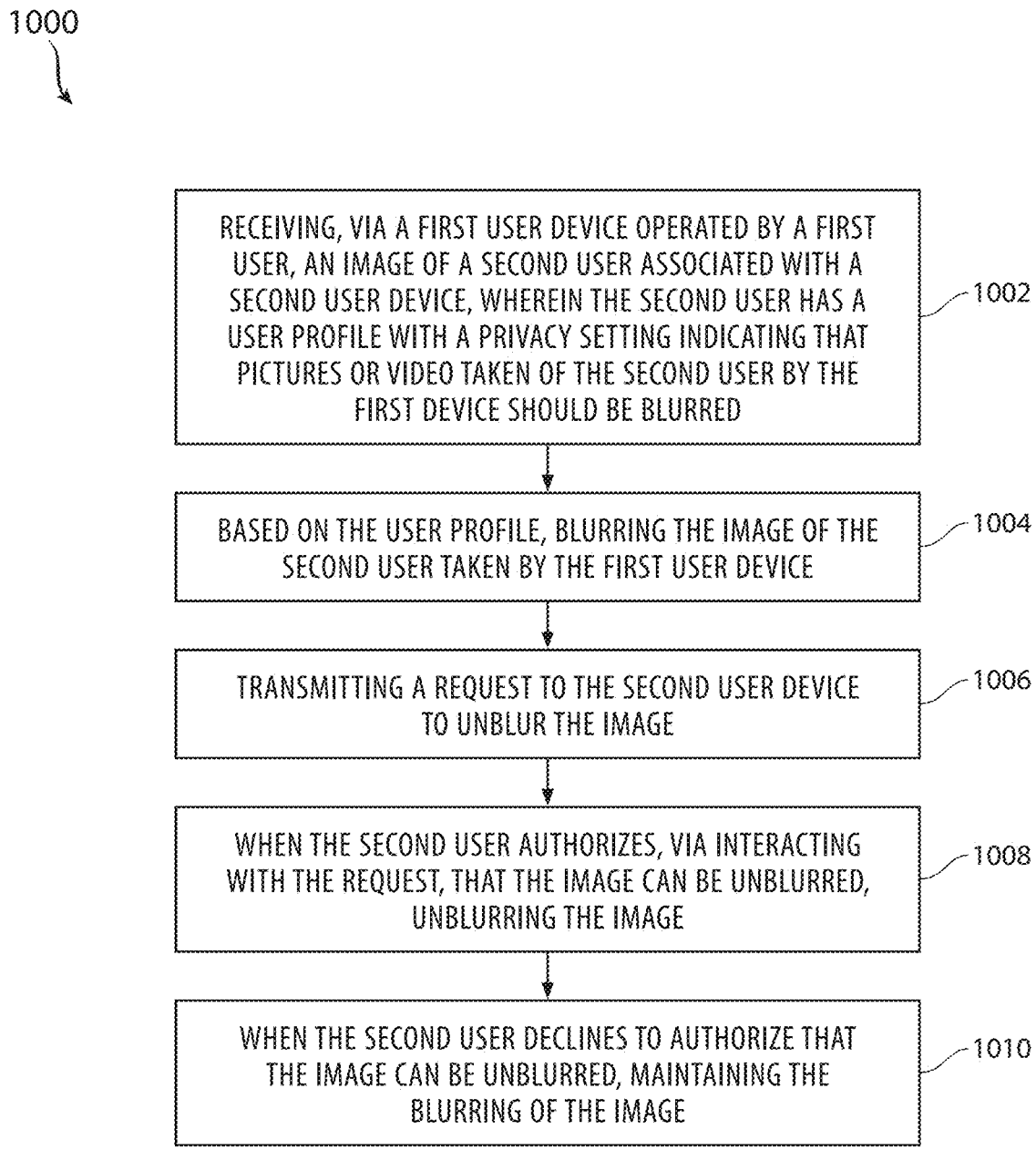
FIG. 10 illustrates a method embodiment.

FIG. 10 illustrates an example method 1000. This method can be practiced on any network server or on the rewards-based, universal, integrated code base 203 as operated by or performed by the data/privacy/file storage management module 236. The method 1000 can include receiving, via a first user device operated by a first user, an image of a second user associated with a second user device, wherein the second user has a user profile with a privacy setting indicating that pictures or video taken of the second user by the first device should be blurred (1002), based on the user profile, blurring the image of the second user taken by the first user device (1004) and transmitting a request to the second user device to unblur the image (1006). When the second user authorizes, via interacting with the request, that the image can be unblurred, the method can include unblurring the image (1008). When the second user declines to authorize that the image can be unblurred, the method can include maintaining the blurring of the image (1010).

The transmitting of the request can be performed automatically by a computer system or manually upon request of the first user. The image can be part of a picture or video taken by a camera on a respective user device 208. The blurring of the image further can include blurring one of a face of the second user or an entire body of the second user. Typically, it is anticipated that a general blurring of the face via a circular overlay object may be used. An outline of the user's body might be used as well that would define the blurring region. However, this disclosure is not limited to blurring just the face or the body. A portion of the body might be blurred such as the top half of the body or just the legs or arms or any other desired granular decision which a user via a user profile might make with respect to how much of their body they would desired to be blurred in pictures taken by other people.

As noted above, the user may also request or establish a setting that their image be altered so that they are not recognizable and in a way that does not damage or substantially change the overall image seen by the person taking the picture.

A timing of when the request is transmitted to the second user device can be governed by the second user. For example, a user may desire to receive all unblur requests once a day at a certain time when they have a moment to go through the various requests. If the user is traveling on vacation and likely the subject of many pictures, the user may set a time at the end of the day in which they can process of the unblur requests that they might receive. Otherwise, the user may receive real-time unblur requests which can occur shortly after a picture or video is taken that includes their image.

When the request to unblur the image is received or interacted with by the second user after the first user has seen the image, then a next time, after the second user authorizes that the image can be unblurred, that the first user views the image, the system can cause the image to be unblurred. As noted above, unblurred the image might involve removing an overlay or may involve changing the image itself. After the second user has authorized that the image can be unblurred and the image is unblurred, the second user can interact with a user interface and cause the image to be blurred again. As noted, the first user then over time may sometimes see the image with the second user's face unblurred, and then later see the face blurred.

In this regard, once an image is blurred or unblurred, the decision does not have to be final. The second user may authorize the blurring of an image of them and then later decide that they want to maintain their privacy. Furthermore, users can block or unblock any or all previous unblocking or blocking permissions they have given including using such parameters as by date, platforms, or other factors. For example, a user could block or unblock all their images from a week of vacation or their trip to a convention or all their images around (i.e., within X radius) a certain geographic location.

Each of the first user device and the second user device may include an authorized user device 208 which has an access component 350 that enables interaction by the authorized user device 208 with one or more platforms 218A-K operating on a rewards-based, universal, integrated code base 203 running on a plurality of network-based computer servers 202. The rewards-based, universal, integrated code base 203 can include an aggregation of each respective platform and which enables at least one or more of rewards, payments and data sharing between each respective platform 218A-K in the rewards-based, universal, integrated code base 203. Each respective entity associated with each respective platform 218A-K agrees to an information exchange framework and payment framework for operating in the rewards-based, universal, integrated code base 203. The rewards-based, universal, integrated code base 203 can include a privacy management module 236 that manages blurring and unblurring of images taken by the authorized user device 208.

In one aspect, a system can include a plurality of network-based computer servers 202, a plurality of user devices 204, 206, 208, 210, 212, 214, 216 and a rewards-based, universal, integrated code base 203 operating across the plurality of network-based computer servers for use by the plurality of user devices. The rewards-based, universal, integrated code base 203 can be configured to interact with a plurality of authorized user devices 208 and to perform operations including receiving, from a first user device operated by a first user, an image of a second user having a second user device, wherein the second user has a user profile with a privacy setting indicating that pictures or video taken of the second user by the first device should be blurred, based on the user profile, blurring the image of the second user taken by the first user device and transmitting a request to the second user device to unblur the image. This can be manual or automatic in terms of the transmitting of requests to unblur an image. When the second user authorizes, via interacting with the request, that the image can be unblurred, the operations can include unblurring the image. When the second user declines to authorize that the image can be unblurred, the operations can include maintaining the blurring of the image.

In another aspect, the blurring concept can be practiced from the standpoint of a mobile device 208. A mobile device can include a processor 310, a camera (which can be an input device 345) in communication with the processor 310 and a computer-readable storage medium 315 storing instructions which, when executed by the processor 310, cause the processor 310 to perform operations including receiving, via the camera and as instructed by a first user, an image of a second user having a second user device, wherein the second user has a user profile with a privacy setting indicating that pictures or video taken of the second user by the first device should be blurred and, based on the user profile, causing a blurring of the image of the second user. When the second user authorizes, via interacting with an unblur request, that the image can be unblurred, the instructions can include causing an unblurring of the image. When the second user declines to authorize that the image can be unblurred, the instructions can include maintaining the blurring of the image.

In yet another aspect, users that are being asked to unblock their image(s) can charge a fee for unblocking themselves. The person who took the picture may have to pay a small fee, which can be paid in rewards, currency, fiat or any other thing of value for the unblocking to occur. The person who took the picture might have motivation to pay the fee so that their picture does not have a blurred face in the background which might reduce the value of the picture to them. Thus, the user interface or a selectable object can be presented to the second user indicating that they can accept X rewards, currency or fiat for unblocking their image. The interface can present the picture or a close-up of their image in the picture so that they can see the context of their image and make their choice on whether or not to unblock. In another aspect, a merchant might be shown in the picture as well and be given the opportunity to pay a small fee for the unblocking of the person's image as it may impact the visual presentation of the merchant store, product or other item associated with a merchant or other entity.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. A computer system programmed with the algorithms disclosed herein or incorporated herein by reference are a special-purpose computer system according to Patent Office Guidance. The computer executable instructions may be, for example, binaries, intermediate format instructions such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. A device can include a computing device, a display, a microphone, and a video camera to carry out the video conferencing features described herein. As such, the device(s), when including these specific input/output components, are not generic computer processors but more specific hardware devices. Any features described as modules or components may be implemented together in an integrated logic device or separately as discrete but interoperable logic devices. If implemented in software, the techniques may be realized at least in part by a computer-readable data storage medium can include program code including instructions that, when executed, performs one or more of the methods, algorithms, and/or operations described above. The computer-readable data storage medium may form part of a computer program product, which may include packaging materials.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. For example, where the rewards-based, universal, integrated code base is mentioned in a claim, it is required as a framework for that concept. However, where the rewards-based, universal, integrated code base is not required, the claimed concept can occur within the standard application/Internet framework where applications are downloaded from an app store or users access websites on the Internet in the traditional manner. Thus, the rewards-based, universal, integrated code base is only required where claimed and any claim that does not include the rewards-based, universal, integrated code base is expressly broad enough to be applicable outside the use of the rewards-based, universal, integrated code base. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, via a first authorized user device operated by a first user, an image of a second user associated with a second authorized user device, wherein the second user has a user profile with a privacy setting indicating that pictures or video taken of the second user by the first device should be blurred, wherein the first authorized user device comprises a first access component and the second authorized user device comprises a second access component, wherein the first access component and the second access component enable interaction by the first authorized user device and the second authorized user device with one or more platforms operating on a rewards-based, universal, integrated code base running on a plurality of network-based computer servers and wherein the rewards-based, universal, integrated code base comprises an aggregation of each respective platform of the one or more platforms and which enables at least one or more of rewards, payments and data sharing between each respective platform in the rewards-based, universal, integrated code base;
   based on the user profile, blurring the image of the second user taken by the first user device;
   transmitting a request to the second user device to unblur the image;
   when the second user authorizes, via interacting with the request, that the image can be unblurred, unblurring the image; and
   when the second user declines to authorize that the image can be unblurred, maintaining the blurring of the image.

2. The method of claim 1, wherein the transmitting of the request is performed automatically by a computer system or manually upon request of the first user.

3. The method of claim 1, wherein the image is part of a picture or a video.

4. The method of claim 1, wherein the blurring of the image further comprises blurring one of a face of the second user or an entire body of the second user.

5. The method of claim 1, wherein a timing of when the request is transmitted to the second authorized user device is governed by the second user.

6. The method of claim 1, wherein when the request to unblur the image is received or interacted with by the second user after the first user has seen the image, and when the second user authorizes that the image can be unblurred, then a next time after the user authorizes that the image can be unblurred that the first user views the image, the image is unblurred.

7. The method of claim 1, wherein, after the second user has authorized that the image can be unblurred and the image is unblurred, the second user can interact with a user interface and cause the image to be blurred again.

8. The method of claim 1, wherein each respective entity associated with each respective platform agrees to an information exchange framework and payment framework for operating in the rewards-based, universal, integrated code base.

9. The method of claim 8, wherein the rewards-based, universal, integrated code base comprises a privacy management module that manages blurring and unblurring of images taken by the first authorized user device.

10. A system comprising:
    a plurality of network-based computer servers;
    a plurality of authorized user devices; and
    a rewards-based, universal, integrated code base operating across the plurality of network-based computer servers for use by the plurality of authorized user devices, wherein each respective authorized user device of the plurality of authorized user devices comprises an access component that enables interaction by the respective authorized user device with one or more platforms operating on the rewards-based, universal, integrated code base, wherein the rewards-based, universal, integrated code base comprises an aggregation of each respective platform of the one or more platforms and which enables at least one or more of rewards, payments and data sharing between each respective platform in the rewards-based, universal, integrated code base and wherein the rewards-based, universal, integrated code base is configured to interact with the plurality of authorized user devices and to perform operations comprising:
       receiving, from a first authorized user device operated by a first user, an image of a second user having a second authorized user device, wherein the second user has a user profile with a privacy setting indicating that pictures or video taken of the second user by the first authorized user device should be blurred;
       based on the user profile, blurring the image of the second user taken by the first authorized user device;
       transmitting a request to the second authorized user device to unblur the image;
       when the second user authorizes, via interacting with the request, that the image can be unblurred, unblurring the image; and
       when the second user declines to authorize that the image can be unblurred, maintaining the blurring of the image.

11. The system of claim 10, wherein the transmitting of the request is performed automatically by a computer system or manually upon request of the first user.

12. The system of claim 10, wherein the image is part of a picture or a video.

13. The system of claim 10, wherein the blurring of the image further comprises blurring one of a face of the second user or an entire body of the second user.

14. The system of claim 10, wherein a timing of when the request is transmitted to the second authorized user device is governed by the second user.

15. The system of claim 10, wherein when the request to unblur the image is received or interacted with by the second user after the first user has seen the image, and when the second user authorizes that the image can be unblurred, then a next time after the user authorizes that the image can be unblurred that the first user views the image, the image is unblurred.

16. The system of claim 10, wherein, after the second user has authorized that the image can be unblurred and the image is unblurred, the second user can interact with a user interface and cause the image to be blurred again.

17. The system of claim 10, wherein each respective entity associated with each respective platform agrees to an information exchange framework and payment framework for operating in the rewards-based, universal, integrated code base.

18. The system of claim 10, wherein the rewards-based, universal, integrated code base comprises a privacy management module that manages blurring and unblurring of images taken by the authorized user device.

19. The system of claim 10, wherein, the rewards-based, universal, integrated code base is further configured to perform operations comprising:
when the second user authorizes, via interacting with the request, that the image can be unblurred, and when the image is unblurred, paying the second user a fee for unblurring the image.

20. An authorized mobile device comprising:
a processor;
a camera in communication with the processor;
an access component that enables interaction by an authorized mobile device with one or more platforms operating on a rewards-based, universal, integrated code base, wherein the rewards-based, universal, integrated code base comprises an aggregation of a plurality of platforms and which enables at least one or more of rewards, payments and data sharing between each respective platform of the plurality of platforms in the rewards-based, universal, integrated code base; and
a non-transitory computer-readable storage medium storing instructions which, when executed by the processor, cause the processor to perform operations comprising receiving, via the camera of the authorized mobile device and as instructed by a first user, an image of a second user associated with a second authorized user device, wherein the second user has a user profile with a privacy setting indicating that pictures or video taken of the second user by the authorized mobile device should be blurred, wherein a module operating on the rewards-based, universal, integrated code base is configured to perform operations comprising:
based on the user profile, causing a blurring of the image of the second user;
when the second user authorizes, via interacting with an unblur request, that the image can be unblurred, causing an unblurring of the image; and
when the second user declines to authorize that the image can be unblurred, maintaining the blurring of the image.

21. The method of claim 1, further comprising:
when the second user authorizes, via interacting with the request, that the image can be unblurred, and when the image is unblurred, paying the second user a fee for unblurring the image.

* * * * *